US008503536B2

(12) United States Patent
Zuo et al.

(10) Patent No.: US 8,503,536 B2
(45) Date of Patent: Aug. 6, 2013

(54) QUANTIZATION ADJUSTMENTS FOR DC SHIFT ARTIFACTS

(75) Inventors: Xiping Zuo, Kirkland, WA (US); Chih-Lung Lin, Redmond, WA (US); Pohsiang Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1889 days.

(21) Appl. No.: 11/400,785

(22) Filed: Apr. 7, 2006

(65) Prior Publication Data

US 2007/0248163 A1 Oct. 25, 2007

(51) Int. Cl.
*H04N 7/12* (2006.01)

(52) U.S. Cl.
USPC .................................. 375/240.2; 375/240.03

(58) Field of Classification Search
USPC .................. 375/240, 240.01, 240.03, 240.12, 375/240.2, 240.27; 382/238, 240; 345/582
See application file for complete search history.

(56) References Cited

U.S. PATENT DOCUMENTS

| 762,026 | A | 6/1904 | Connstein |
|---|---|---|---|
| 4,583,114 | A | 4/1986 | Catros |
| 4,679,079 | A | 7/1987 | Catros et al. |
| 4,774,574 | A | 9/1988 | Daly et al. |
| 4,821,119 | A | 4/1989 | Gharavi |
| 4,862,264 | A | 8/1989 | Wells et al. |
| 4,965,830 | A | 10/1990 | Barham et al. |
| 4,992,889 | A | 2/1991 | Yamagami et al. |
| 5,072,295 | A | 12/1991 | Murakami et al. |
| 5,128,758 | A | 7/1992 | Azadegan et al. |
| 5,136,377 | A | 8/1992 | Johnston et al. |
| 5,144,426 | A | 9/1992 | Tanaka et al. |
| 5,146,324 | A | 9/1992 | Miller et al. |
| 5,179,442 | A | 1/1993 | Azadegan et al. |
| 5,237,410 | A | 8/1993 | Inoue |
| 5,241,395 | A | 8/1993 | Chen |
| 5,253,058 | A | 10/1993 | Gharavi |
| 5,263,088 | A | 11/1993 | Hazu et al. |
| 5,301,242 | A | 4/1994 | Gonzales et al. |
| 5,303,058 | A | 4/1994 | Fukuda et al. |
| 5,317,396 | A | 5/1994 | Fujinami |

(Continued)

FOREIGN PATENT DOCUMENTS

| CA | 1327074 | 2/1994 |
|---|---|---|
| EP | 0932306 | 7/1999 |

(Continued)

OTHER PUBLICATIONS

Bist et al., "Adaptive Quantization for Low Bit Rate Video Coding," *Proc. 1998 Int'l Conf. on Image Processing(ICIP 98)*, pp. 925-928 (1998).

(Continued)

*Primary Examiner* — Allen Wong
(74) *Attorney, Agent, or Firm* — Klarquist Sparkman, LLP

(57) ABSTRACT

A video encoder identifies one or more portions of a video picture that contain DC shift blocks and adjusts quantization (e.g., by selecting a smaller quantization step size) to reduce contouring artifacts when the picture is reconstructed. The encoder can identify the portion(s) of the picture that contain DC shift blocks by identifying one or more gradient slope regions in the picture and analyzing quantization effects on DC coefficients in the gradient slope region(s). The encoder can select a coarser quantization step size for a high-texture picture portion.

20 Claims, 23 Drawing Sheets

U.S. PATENT DOCUMENTS

| | | | |
|---|---|---|---|
| 5,317,672 | A | 5/1994 | Crossman et al. |
| 5,333,212 | A | 7/1994 | Ligtenberg |
| 5,351,310 | A | 9/1994 | Califano et al. |
| 5,374,958 | A | 12/1994 | Yanagihara |
| 5,412,429 | A | 5/1995 | Glover |
| 5,452,104 | A | 9/1995 | Lee |
| 5,461,421 | A | 10/1995 | Moon |
| 5,473,377 | A * | 12/1995 | Kim ..................... 375/240.03 |
| 5,481,553 | A | 1/1996 | Suzuki et al. |
| 5,506,916 | A | 4/1996 | Nishihara et al. |
| 5,510,785 | A | 4/1996 | Segawa et al. |
| 5,537,440 | A | 7/1996 | Eyuboglu et al. |
| 5,537,493 | A | 7/1996 | Wilkinson |
| 5,539,469 | A | 7/1996 | Jung |
| 5,559,557 | A | 9/1996 | Kato |
| 5,565,920 | A | 10/1996 | Lee et al. |
| 5,587,708 | A | 12/1996 | Chiu |
| 5,590,139 | A | 12/1996 | Suzuki et al. |
| 5,606,371 | A | 2/1997 | Klein Gunnewiek et al. |
| 5,623,424 | A | 4/1997 | Azadegan et al. |
| 5,629,779 | A | 5/1997 | Jeon |
| 5,631,644 | A | 5/1997 | Katata et al. |
| 5,654,760 | A | 8/1997 | Ohtsuki |
| 5,657,087 | A | 8/1997 | Jeong et al. |
| 5,663,763 | A | 9/1997 | Yagasaki et al. |
| 5,724,097 | A | 3/1998 | Hibi et al. |
| 5,724,456 | A | 3/1998 | Boyack et al. |
| 5,731,836 | A | 3/1998 | Lee |
| 5,731,837 | A | 3/1998 | Hurst, Jr. |
| 5,739,861 | A | 4/1998 | Music |
| 5,751,358 | A | 5/1998 | Suzuki et al. |
| 5,751,379 | A | 5/1998 | Markandey et al. |
| 5,761,088 | A | 6/1998 | Hulyalkar et al. |
| 5,764,803 | A | 6/1998 | Jacquin et al. |
| 5,781,788 | A | 7/1998 | Woo et al. |
| 5,786,856 | A | 7/1998 | Hall et al. |
| 5,802,213 | A | 9/1998 | Gardos |
| 5,809,178 | A | 9/1998 | Anderson et al. |
| 5,815,097 | A | 9/1998 | Schwartz et al. |
| 5,819,035 | A | 10/1998 | Devaney et al. |
| 5,825,310 | A | 10/1998 | Tsutsui |
| 5,835,145 | A | 11/1998 | Ouyang et al. |
| 5,835,237 | A | 11/1998 | Ebrahimi |
| 5,844,613 | A | 12/1998 | Chaddha |
| 5,850,482 | A | 12/1998 | Meany et al. |
| 5,867,167 | A | 2/1999 | Deering |
| 5,870,435 | A | 2/1999 | Choi et al. |
| 5,877,813 | A | 3/1999 | Lee et al. |
| 5,878,166 | A | 3/1999 | Legall |
| 5,880,775 | A | 3/1999 | Ross |
| 5,883,672 | A | 3/1999 | Suzuki et al. |
| 5,926,791 | A | 7/1999 | Ogata et al. |
| 5,969,764 | A | 10/1999 | Sun et al. |
| 5,970,173 | A | 10/1999 | Lee et al. |
| 5,990,957 | A | 11/1999 | Ryoo |
| 6,044,115 | A | 3/2000 | Horiike et al. |
| 6,049,630 | A | 4/2000 | Wang et al. |
| 6,058,362 | A | 5/2000 | Malvar |
| 6,072,831 | A | 6/2000 | Chen |
| 6,084,636 | A | 7/2000 | Fujiwara et al. |
| 6,088,392 | A | 7/2000 | Rosenberg |
| 6,091,777 | A | 7/2000 | Guetz et al. |
| 6,104,751 | A | 8/2000 | Artieri |
| 6,118,817 | A | 9/2000 | Wang |
| 6,118,903 | A | 9/2000 | Liu |
| 6,125,140 | A | 9/2000 | Wilkinson |
| 6,148,107 | A | 11/2000 | Ducloux et al. |
| 6,148,109 | A | 11/2000 | Boon et al. |
| 6,160,846 | A | 12/2000 | Chiang et al. |
| 6,167,091 | A | 12/2000 | Okada et al. |
| 6,182,034 | B1 | 1/2001 | Malvar |
| 6,212,232 | B1 | 4/2001 | Reed et al. |
| 6,215,905 | B1 * | 4/2001 | Lee et al. ..................... 382/238 |
| 6,223,162 | B1 | 4/2001 | Chen et al. |
| 6,240,135 | B1 | 5/2001 | Kim |
| 6,240,380 | B1 | 5/2001 | Malvar |
| 6,243,497 | B1 | 6/2001 | Chiang et al. |
| 6,249,614 | B1 | 6/2001 | Bocharova et al. |
| 6,256,422 | B1 | 7/2001 | Mitchell et al. |
| 6,256,423 | B1 | 7/2001 | Krishnamurthy |
| 6,263,022 | B1 | 7/2001 | Chen et al. |
| 6,263,024 | B1 | 7/2001 | Matsumoto |
| 6,275,614 | B1 | 8/2001 | Krishnamurthy et al. |
| 6,278,735 | B1 | 8/2001 | Mohsenian |
| 6,292,588 | B1 | 9/2001 | Shen et al. |
| 6,314,208 | B1 | 11/2001 | Konstantinides et al. |
| 6,337,881 | B1 | 1/2002 | Chaddha |
| 6,347,116 | B1 | 2/2002 | Haskell et al. |
| 6,348,945 | B1 | 2/2002 | Hayakawa |
| 6,356,709 | B1 | 3/2002 | Abe et al. |
| 6,359,928 | B1 | 3/2002 | Wang et al. |
| 6,360,017 | B1 | 3/2002 | Chiu et al. |
| 6,370,502 | B1 | 4/2002 | Wu et al. |
| 6,373,894 | B1 | 4/2002 | Florencio et al. |
| 6,385,343 | B1 | 5/2002 | Kuroda et al. |
| 6,389,171 | B1 | 5/2002 | Washington |
| 6,393,155 | B1 | 5/2002 | Bright et al. |
| 6,408,026 | B1 | 6/2002 | Tao |
| 6,418,166 | B1 | 7/2002 | Wu et al. |
| 6,438,167 | B1 | 8/2002 | Shimizu et al. |
| 6,456,744 | B1 | 9/2002 | Lafe |
| 6,463,100 | B1 | 10/2002 | Cho et al. |
| 6,466,620 | B1 | 10/2002 | Lee |
| 6,473,534 | B1 | 10/2002 | Merhav et al. |
| 6,490,319 | B1 | 12/2002 | Yang |
| 6,493,385 | B1 | 12/2002 | Sekiguchi et al. |
| 6,519,284 | B1 | 2/2003 | Pesquet-Popescu et al. |
| 6,526,096 | B2 | 2/2003 | Lainema et al. |
| 6,546,049 | B1 | 4/2003 | Lee |
| 6,571,019 | B1 | 5/2003 | Kim et al. |
| 6,593,925 | B1 | 7/2003 | Hakura et al. |
| 6,600,836 | B1 | 7/2003 | Thyagarajan et al. |
| 6,647,152 | B2 | 11/2003 | Willis et al. |
| 6,654,417 | B1 | 11/2003 | Hui |
| 6,678,422 | B1 | 1/2004 | Sharma et al. |
| 6,687,294 | B2 | 2/2004 | Yan et al. |
| 6,693,645 | B2 | 2/2004 | Bourges-Sevenier |
| 6,704,718 | B2 | 3/2004 | Burges et al. |
| 6,721,359 | B1 | 4/2004 | Bist et al. |
| 6,728,317 | B1 | 4/2004 | Demos |
| 6,731,811 | B1 | 5/2004 | Rose |
| 6,738,423 | B1 | 5/2004 | Lainema et al. |
| 6,747,660 | B1 | 6/2004 | Olano et al. |
| 6,759,999 | B1 | 7/2004 | Doyen |
| 6,760,482 | B1 | 7/2004 | Taubman |
| 6,765,962 | B1 | 7/2004 | Lee et al. |
| 6,771,830 | B2 | 8/2004 | Goldstein et al. |
| 6,785,331 | B1 | 8/2004 | Jozawa et al. |
| 6,788,740 | B1 | 9/2004 | Van der Schaar et al. |
| 6,792,157 | B1 | 9/2004 | Koshi et al. |
| 6,795,584 | B2 | 9/2004 | Karczewicz et al. |
| 6,801,572 | B2 | 10/2004 | Yamada et al. |
| 6,807,317 | B2 | 10/2004 | Mathew et al. |
| 6,810,083 | B2 | 10/2004 | Chen et al. |
| 6,831,947 | B2 | 12/2004 | Ribas Corbera |
| 6,862,320 | B1 * | 3/2005 | Isu et al. ..................... 375/240.27 |
| 6,865,291 | B1 | 3/2005 | Zador |
| 6,873,654 | B1 | 3/2005 | Rackett |
| 6,876,703 | B2 | 4/2005 | Ismaeil et al. |
| 6,882,753 | B2 | 4/2005 | Chen et al. |
| 6,907,142 | B2 | 6/2005 | Kalevo et al. |
| 6,909,745 | B1 | 6/2005 | Puri et al. |
| 6,947,045 | B1 | 9/2005 | Ostermann et al. |
| 6,975,680 | B2 | 12/2005 | Demos |
| 6,977,659 | B2 | 12/2005 | Dumitras et al. |
| 6,990,242 | B2 | 1/2006 | Malvar |
| 7,016,546 | B2 | 3/2006 | Fukuhara et al. |
| 7,020,204 | B2 | 3/2006 | Auvray et al. |
| 7,027,506 | B2 | 4/2006 | Lee et al. |
| 7,027,507 | B2 | 4/2006 | Wu |
| 7,035,473 | B1 | 4/2006 | Zeng et al. |
| 7,042,941 | B1 | 5/2006 | Laksono et al. |
| 7,058,127 | B2 | 6/2006 | Lu et al. |
| 7,099,389 | B1 | 8/2006 | Yu et al. |
| 7,110,455 | B2 | 9/2006 | Wu et al. |
| 7,162,096 | B1 | 1/2007 | Horowitz |
| 7,200,277 | B2 | 4/2007 | Joshi et al. |

| Patent/Pub No. | Date | Name |
|---|---|---|
| 7,280,700 B2 | 10/2007 | Tourapis et al. |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,356,085 B2 | 4/2008 | Gavrilescu et al. |
| 7,463,780 B2 * | 12/2008 | Fukuhara et al. ............. 382/240 |
| 7,471,830 B2 | 12/2008 | Lim et al. |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1 | 2/2002 | Jayant et al. |
| 2002/0024999 A1 | 2/2002 | Yamaguchi et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1 | 9/2002 | Shimada et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Srinivasan et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 * | 2/2004 | Alcorn et al. ................ 345/582 |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268990 A1 | 11/2006 | Lin et al. |
| 2006/0268991 A1 | 11/2006 | Segall et al. |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0008394 A1 | 1/2008 | Segall |
| 2008/0031346 A1 | 2/2008 | Segall |
| 2008/0068446 A1 | 3/2008 | Barkley et al. |
| 2008/0080615 A1 | 4/2008 | Tourapis et al. |
| 2008/0089410 A1 | 4/2008 | Lu et al. |
| 2008/0101465 A1 | 5/2008 | Chono et al. |
| 2008/0144951 A1 | 6/2008 | Zhang |
| 2008/0187042 A1 | 8/2008 | Jasinschi |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2008/0304562 A1 | 12/2008 | Chang et al. |
| 2009/0207919 A1 | 8/2009 | Yin et al. |
| 2009/0213930 A1 | 8/2009 | Ye et al. |
| 2009/0245587 A1 | 10/2009 | Holcomb et al. |
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 1465349 | 10/2004 |
| EP | 1871113 | 12/2007 |
| GB | 897363 | 5/1962 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2001-358948 | 12/2001 |
| JP | 2002-058029 | 2/2002 |
| JP | 2003061090 | 2/2003 |
| JP | 2003-230142 | 8/2003 |
| JP | 2004-023288 | 1/2004 |
| JP | 2004-247889 | 9/2004 |
| JP | 6-296275 | 10/2004 |
| JP | 2005-260467 | 9/2005 |
| JP | 2007-281949 | 10/2007 |
| KR | 132895 | 10/1998 |
| RU | 2119269 | 9/1998 |
| RU | 2119727 | 9/1998 |
| RU | 2127962 | 3/1999 |
| WO | WO 93/09636 | 5/1993 |
| WO | WO 97/21302 | 6/1997 |
| WO | WO 99/25121 | 5/1999 |
| WO | WO 99/48300 | 9/1999 |
| WO | WO 00/21207 | 4/2000 |
| WO | WO 00/72599 | 11/2000 |
| WO | WO02/07438 | 1/2002 |
| WO | WO 02/080575 | 10/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Farvardin et al., "Optimum quantizer performance for a class of non-Gaussian memoryless sources," *IEEE Trans. Inform. Theory*, vol. IT-30, No. 3, pp. 485-497 (May 1984).

Flierl et al., "A Video Codec Incorporating Block-Based Multi-Hypothesis Motion-Compensated Prediction," in *Proceedings of the SPIE Conference on Visual Communications and image Processing*, Perth, Australia, vol. 4067, pp. 238-249 (Jun. 2000).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," *Proc. SPIE*, vol. 3980, pp. 85-96 (2000).

Garrigues et al., "Atom position coding in a matching pursuit based video coder," *Lecture Notes in Computer Science*, 4 pp. (2005).

Gish et al., "Asymptotically efficient quantizing," *IEEE Trans. Inform. Theory*, vol. IT-14, No. 5 (Sep. 1968).

Golston et al., "Video codecs tutorial: Trade-offs with H.264, VC-1 and other advanced codecs," *Video/Imaging Design Line*, Mar. 2006, 9 pages.

"H.264 & IPTV Over DSL—Enabling New Telco Revenue Opportunities," *White Paper, Intel/Envivio*, May 15, 2004, available at http://www.envivio.com/images/products/H264whitepaper.pdf.

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).

"ISO/IEC 13818-2. Generic coding of moving pictures and associated audio information," MPEG (Moving Pictures Expert Group), International Organization for Standardization, MPEG2 Video (1994).

ISO/IEC, "Information Technology—Coding of Audio-Visual Objects: Visual, ISO/IEC 14496-2, Committee Draft," 330 pp. (1998).

ITU-T, "ITU-T Recommendation H.261: Video Codec for Audiovisual Services at p x 64 kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

Kim et al., "Still image coding based on vector quantization and fractal approximation," *IEEE Transactions on Image Processing*, vol. 5, No. 4, pp. 587-597 (1996).

Lam et al., "A mathematical analysis of the DCT coefficient distributions for images," *IEEE Trans. Image Proc.*, vol. IP-9, No. 10, pp. 1661-1666 (Oct. 2000).

Legall, "MPEG: A Video Compression Standard for Multimedia Application," *Communications of the ACM*, vol. 34, No. 4, pp. 47-58 (Apr. 1991).

Legall, "The MPEG Video Compression Algorithm," *Signal Processing: Image Communication 4*, vol. 4, No. 2, pp. 129-140 (Apr. 1992).

Legall et al., "Transmission of HDTV signals under 140 Mbit/s using a subband decomposition and Discrete Cosine Transform coding," in *Signal Processing of HDTV*, Elsevier, Amsterdam, pp. 287-293 (1988).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 14 pp. (Document dated Apr. 2006) [Downloaded from the World Wide Web on Jun. 22, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Mallat, "A theory for multiresolution signal decomposition: the wavelet representation," *IEEE Trans. Pattern Anal. and Machine Intell.*, vol. PAMI-11, No. 7, pp. 674-692 (Jul. 1989).

Masala et al., "Perceptually Optimized MPEG Compression of Synthetic Video Sequences," Proc. ICIP, pp. 1-601-I-604, *IEEE* (2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst.*, Video Technology, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reisinger et al., "Distribution of two-dimensional DCT coefficients for images," *IEEE Trans. on Commun.*, vol. COM-31, No. 6, pp. 835-839 (Jun. 1983).

Shen et al., "Rate-Distortion Optimization for Fast Hierarchical B-Picture Transcoding," *IEEE*, 2006, pp. 5279-5282.

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "The H.264/AVC Advanced Video Coding Standard: Overview and Introduction to the Fidelity Range Extensions," 21 pp. (Aug. 2004).

Tsang et al., "Fuzzy Based Rate Control for Real-Time MPEG Video," *IEEE Transactions on Fuzzy Systems*, pp. 504-516 (1998).

Wien, "Variable Block-Size Transforms for Hybrid Video Coding," Dissertation, 182 pp. (Feb. 2004).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Yuen et al., "A survey of hybrid MC/DPCM/DCT video coding distortions," *Signal Processing*, vol. 70, pp. 247-278 (1998).

Zaid et al., "Wavelet Image Coding with Adaptive Thresholding," 4 pp. (2002).

Zhang et al., "Adaptive Field/Frame Selection for High Compression Coding," *SPIE Conf. on Image and Video Communications and Processing*, 13 pp. (Jan. 2003).

Augustine et al., "Region of Interest Editing of MPEG-2 Video Streams in the Compressed Domain," 2004 *IEEE Int'l Conf. on Multimedia and Expo: ICME'04*, vol. 1, Issue 27-30, pp. 559-562 (Jun. 2004).

Chang et al., "Adaptive Wavelet Thresholding for Image Denoising and Compression," *IEEE Trans on Image Processing*, vol. 9, No. 9, pp. 1532-1546 (Sep. 2000).

Chrysafis et al., "Context-based Adaptive Image Coding," *Proc. of the 30th Asilomar Conf. on Signals, Systems, and Computers*, 5 pp. (Nov. 1996).

De Simone, et al., "A comparative study of JPEG 2000, AVC/H.264, and HD Photo," *SPIE Optics and Photonics, Applications of Digital Image Processing XXX*, 12 pp. (Aug. 2007).

Gavrilescu et al., "Embedded Multiple Description Scalar Quantizers," *IEE Electronics Letters*, vol. 39, No. 13, 12 pp. (Jun. 2003).

Golner et al., "Region Based Variable Quantization for JPEG Image Compression," *IEEE Symp. On Circuits and Systems*, pp. 604-607 (Aug. 2000).

Hannuksela et al., "Sub-picture: ROI coding and unequal error protection," *Proc. 2002 Int'l Conf. on Image Processing*, vol. 3, Issue 24-28, pp. 537-540 (Jun. 2002).

International Search Report and Written Opinion dated Sep. 14, 2007, for International Patent Application No. PCT/US2007/008944, 7 pp.

Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).

Lei et al., "Rate Adaptation Transcoding for Precoded Video Streams," 13 pp. (month unknown, 2000).

Lin et al, "Low-complexity face-assisted coding scheme for low bit rate video telephony," *IEICE Trans. Inf. & Sys.*, vol. E86-D, No. 1, pp. 101-108 (Jan. 2003).

Lin et al, "Low-complexity face-assisted video coding," *Proc. 2000 Int'l Conf. on Image Processing*, vol. 2, pp. 207-210 (Sep. 2000).

Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).

Notice on the First Office Action dated Apr. 21, 2010, from Chinese Patent Application No. 200780012030.2, 7 pp.

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Schallauer et al., "PRESTO—Preservation Technologies for European Broadcast Archives, D5.4—High Quality Compression for Film and Video," 80 pp. (Sep. 18, 2002).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," *IEEE Trans. on Image Processing*, vol. 6, No. 8, pp. 1164-1175 (Aug. 1997).

Xiong et al., "Wavelet Packet Image Coding Using Space-Frequency Quantization," *IEEE Transactions on Image Processing*, vol. 7, No. 6, pp. 892-898 (Jun. 1998).

Atzori et al., "Adaptive Anistropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Clarke, "Image and Video Compression: A Survey," *Wiley InterScience Journal Abstract*, 2 pp. [Downloaded from the World Wide Web on Jan. 25, 2006].

Diplom-Ingenieur et al., "Variable Block-Size Transforms for Hybrid Video Coding," Dissertation (2004).

Limb, "A Picture-Coding Algorithm for the Merli Scan," *IEEE Transactions on Communications*, pp. 300-305 (Apr. 1973).

Martinez-Fonte, et al., "An Empirical Study on Corner Detection to Extract Buildings in Very High Resolution Satellite Images," *IEEE-ProRisc*, Veldhoven, The Netherlands, pp. 288-293 (Nov. 2004).

Marshall, "The Discrete Cosine Transform," 4 pp. (document dated Oct. 4, 2001) [downloaded from the World Wide Web on Mar. 30, 2006].

Mitra et al., "Two-Stage Color Palettization for Error Diffusion," *Proceedings of SPIE vol. 4662Human Vision and Electronic Imaging VII*, Bernice E. Rogowitz, Thrasyvoulos N. Pappas, Editors, pp. 207-217, (Jun. 2002).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster and Katsaggelos, "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Sony Electronics Inc., "Sony® Vizaro™ DVD Encoder System DVA-V700," 4 pp. (2001).

Sullivan and Wiegand, "Rate-Distortion Optimization for Video Compression," *IEEE Signal Processing Magazine*, pp. 74-90 (Nov. 1998).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Yang et al., "Rate Control for Videophone Using Local Perceptual Cues," *IEEE Transactions on Circuits and Systems for Video Tech.*, vol. 15, No. 4, pp. 496-507 (Apr. 2005).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

* cited by examiner

Software 980 implementing video encoder
with described techniques and tools

```
#define TEXTURELOWTH   30
#define TEXTUREMAX     100
#define MINFLATTH      14
define MAXFLATTH      28 const UInt g_iFlatThTable[TEXTUREMAX-TEXTURELOWTH]={
    16, 16, 16, 16, 18, 18, 18, 18, 18, 18,
    20, 20, 20, 20, 20, 20, 20, 20, 20, 20,
    22, 22, 22, 22, 22, 22, 22, 22, 22, 22,
    24, 24, 24, 24, 24, 24, 24, 24, 24, 24,
    24, 24, 24, 24, 24, 24, 24, 24, 24, 24,
    26, 26, 26, 26, 26, 26, 26, 26, 26, 26,
    26, 26, 26, 26, 26, 26, 26, 26, 26, 26
};

unsigned integer decideAdaptiveFlatThreshold(unsigned integer g0)
{
    Integer new_adaptive_threshold;
    if (g0 < TEXTURELOWTH) new_adaptive_threshold=MINFLATTH;
    else
            if (g0 >= TEXTUREMAX)
                    new_adaptive_threshold=MAXFLATTH;
            else
                    new_adaptive_threshold=g_iFlatThTable[g0-TEXTURELOWTH];

if (not scene change key frames)
            new_adaptive_threshold = last_adaptive_threshold +
    max(-4, min(4, new_adaptive_threshold-last_adaptive_threshold));

return new_adaptive_threshold;
}
```

Figure 21
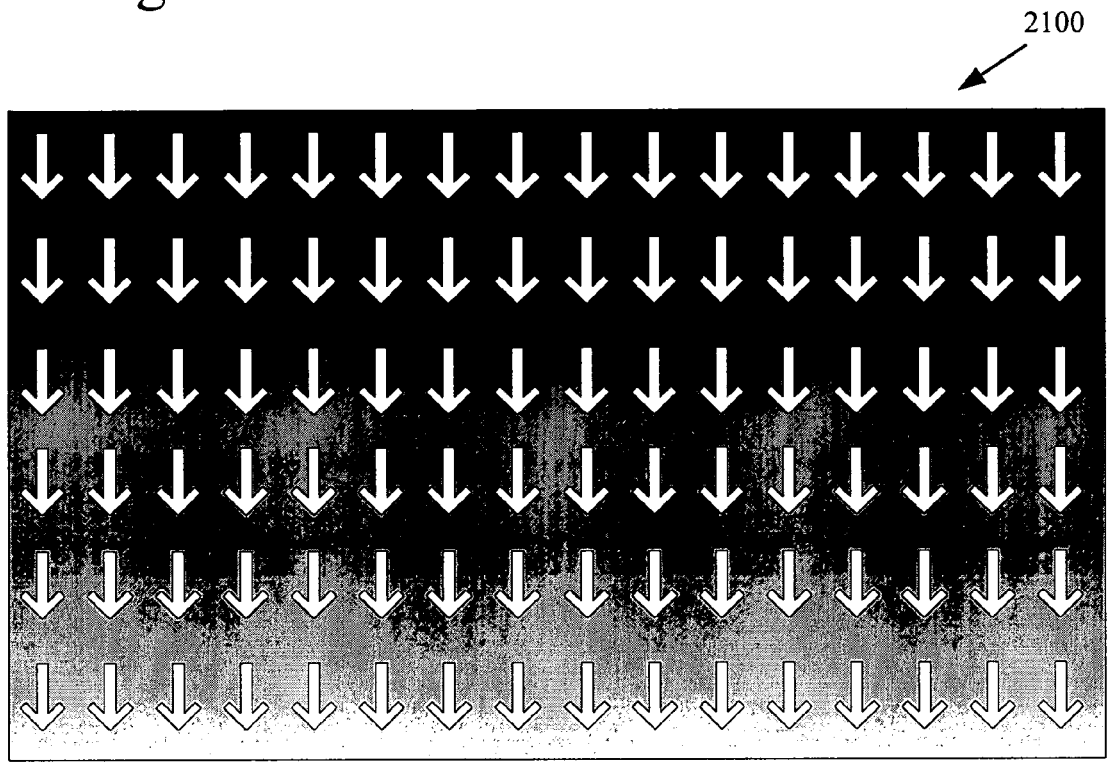
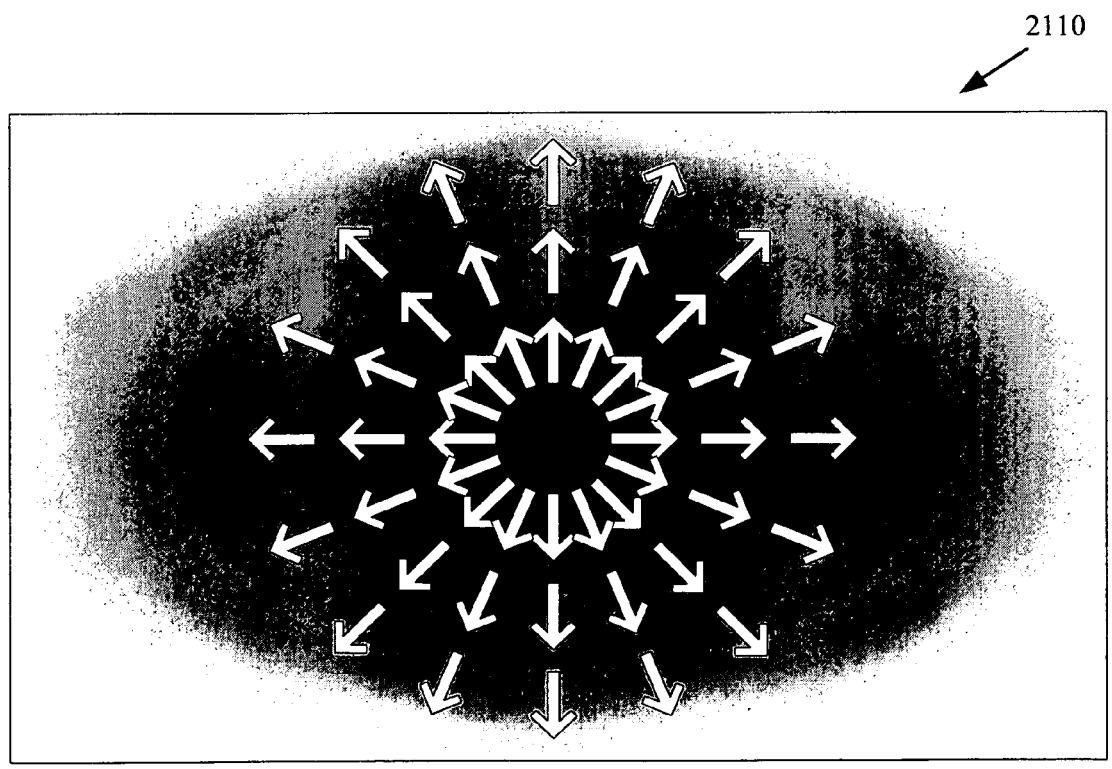

■ : DC value = 68

▥ : DC value = 70

$$K_H = [k_{ij}] \text{ where } 0 \leq i, j \leq 15, k_{ij} = \begin{cases} 1 & \text{if } i < 8 \\ -1 & \text{if } i \geq 8 \end{cases}.$$

$$K_V = [k_{ij}] \text{ where } 0 \leq i, j \leq 15, k_{ij} = \begin{cases} 1 & \text{if } j < 8 \\ -1 & \text{if } j \geq 8 \end{cases}.$$

Figure 27

```
ComputeGradientDirection (IN region, OUT gradientDirection)
      if (region is NOT smooth) {
            gradientDirection = -2; //texture or edge region
            return;
      } gx = sum of all elements of K_H ⊗ block
      gy = sum of all elements of K_V ⊗ block
      if ( abs(gx) < 32 && abs(GradY) < 32 ) {
            gradientDirection = -1; // flat region
            return;
      }
      θ = tan⁻¹(gy / gx);
      Offset = 0;
      if (gx < 0 ) {
            Offset = 3.14159;
      }
      Else if (gy < 0 ) {
            Offset = 2 * 3.14159;
      }
      θ = θ + Offset;
      gradientDirection = ( (Int) (θ * 2598 ) ) >> 6;
End_ComputeGradientDirection
```

QUANTIZATION ADJUSTMENTS FOR DC SHIFT ARTIFACTS

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality of media information, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Resolution generally refers to the number of samples over some duration of time (for audio) or space (for images or individual video pictures). Images with higher resolution tend to look crisper than other images and contain more discernable useful details. Frame rate is a common term for temporal resolution for video. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width × Height) | Frame Rate (in frames per second) | Bit Rate (in millions of bits per second) |
| --- | --- | --- | --- |
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for storing and sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Compression can be lossless, in which quality of the video does not suffer but decreases in bit rate are limited by the complexity of the video. Or, compression can be lossy, in which quality of the video suffers but decreases in bit rate are more dramatic. Decompression (also called decoding) reconstructs a version of the original information from the compressed form. A "codec" is an encoder/decoder system.

In general, video compression techniques include "intra" compression and "inter" or predictive compression. For video frames, intra compression techniques compress individual frames, typically called I-frames or key frames. Inter compression techniques compress frames with reference to preceding and/or following frames, and inter-compressed frames are typically called predicted frames, P-frames, or B-frames.

II. Inter and Intra Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

A. Intra Compression

FIG. 1 illustrates block-based intra compression 100 of a block 105 of samples in a key frame in the WMV8 encoder. A block is a set of samples, for example, an 8×8 arrangement of samples. The WMV8 encoder splits a key video frame into 8×8 blocks and applies an 8×8 Discrete Cosine Transform ["DCT"] 110 to individual blocks such as the block 105. A DCT is a type of frequency transform that converts the 8×8 block of samples (spatial information) into an 8×8 block of DCT coefficients 115, which are frequency information. The DCT operation itself is lossless or nearly lossless. Compared to the original sample values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. Quantization is lossy. Since low frequency DCT coefficients tend to have higher values, quantization typically results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding left column or top row of the neighboring 8×8 block. This is an example of AC coefficient prediction. FIG. 1 shows the left column 127 of AC coefficients encoded as a differential 147 from the left column 137 of the neighboring (in reality, to the left) block 135. The differential coding increases the chance that the differential coefficients have zero values. The remaining AC coefficients are from the block 125 of quantized DCT coefficients.

The encoder scans 150 the 8×8 block 145 of quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Inter Compression

Inter compression in the WMV8 encoder uses block-based motion compensated prediction coding followed by transform coding of the residual error. FIGS. 2 and 3 illustrate the block-based inter compression for a predicted frame in the WMV8 encoder. In particular, FIG. 2 illustrates motion estimation for a predicted frame 210 and FIG. 3 illustrates compression of a prediction residual for a motion-compensated block of a predicted frame.

For example, in FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. The encoder outputs information specifying the motion vector (entropy coded) for the matching macroblock. The motion vector is differentially coded with respect to a motion vector predictor.

After reconstructing the motion vector by adding the differential to the motion vector predictor, a decoder uses the motion vector to compute a prediction macroblock for the macroblock 215 using information from the reference frame 230, which is a previously reconstructed frame available at the encoder and the decoder. The prediction is rarely perfect, so the encoder usually encodes blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The encoder scans 360 the 8×8 block 355 into a one-dimensional array 365 such that coefficients are generally ordered from lowest frequency to highest frequency. The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425, storing the entropy-decoded information into a two-dimensional block 435. The decoder inverse quantizes and inverse DCTs (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475. An encoder also performs the inverse quantization, inverse DCT, motion compensation and combining to reconstruct frames for use as reference frames.

III. Lossy Compression and Quantization

The preceding section mentioned quantization, a mechanism for lossy compression, and entropy coding, also called lossless compression. Lossless compression reduces the bit rate of information by removing redundancy from the information without any reduction in fidelity. For example, a series of ten consecutive pixels that are all exactly the same shade of red could be represented as a code for the particular shade of red and the number ten as a "run length" of consecutive pixels, and this series can be perfectly reconstructed by decompression from the code for the shade of red and the indicated number (ten) of consecutive pixels having that shade of red. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, the quality suffers somewhat but the achievable decrease in bit rate is more dramatic. For example, a series of ten pixels, each being a slightly different shade of red, can be approximated as ten pixels with exactly the same particular approximate red color. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—in a system design in which the lossy compression establishes an approximation of the information and lossless compression techniques are applied to represent the approximation. For example, the series of ten pixels, each a slightly different shade of red, can be represented as a code for one particular shade of red and the number ten as a run-length of consecutive pixels. In general, an encoder varies quantization to trade off quality and bit rate. Coarser quantization results in greater quality reduction but allows for greater bit rate reduction. In decompression, the original series would then be reconstructed as ten pixels with the same approximated red color.

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers

According to one possible definition, a scalar quantizer is an approximating functional mapping $x \rightarrow Q[x]$ of an input value x to a quantized value $Q[x]$, sometimes called a reconstructed value. FIG. 5 shows a "staircase" I/O function 500 for a scalar quantizer. The horizontal axis is a number line for a real number input variable x, and the vertical axis indicates the corresponding quantized values $Q[x]$. The number line is partitioned by thresholds such as the threshold 510. Each value of x within a given range between a pair of adjacent thresholds is assigned the same quantized value $Q[x]$. For example, each value of x within the range 520 is assigned the same quantized value 530. (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 5) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 6A shows a generalized classifier 600 and thresholds for a scalar quantizer. As in FIG. 5, a number line for a real number variable x is segmented by thresholds such as the threshold 610. Each value of x within a given range such as the range 620 is assigned the same quantized value Q[x]. FIG. 6B shows a numerical example of a classifier 650 and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x] = \beta[A[x]] \quad (1).$$

In common usage, the term "quantization" is often used to describe the classifier stage, which is performed during encoding. The term "inverse quantization" is similarly used to describe the reconstructor stage, whether performed during encoding or decoding.

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 5) and therefore Q[Q[x]] will typically be equal to Q[x]. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\overline{D} = E_X\{d(X-Q[X])\}$ is lower for an equal or lower entropy H of A[X]. The most commonly-used distortion measure is the squared error distortion measure, for which $d(|x-y|) = |x-y|^2$. When the squared error distortion measure is used, the expected value of the distortion measure ($\overline{D}$) is referred to as the mean squared error.

B. Dead Zone+Uniform Threshold Quantizers

A non-uniform quantizer has threshold values that are not uniformly spaced for all classifier regions. According to one possible definition, a dead zone plus uniform threshold quantizer ["DZ+UTQ"] is a quantizer with uniformly spaced threshold values for all classifier regions except the one containing the zero input value (which is called the dead zone ["DZ"]). In a general sense, a DZ+UTQ is a non-uniform quantizer, since the DZ size is different than the other classifier regions.

A DZ+UTQ has a classifier index mapping rule x→A[x] that can be expressed based on two parameters. FIG. 7 shows a staircase I/O function 700 for a DZ+UTQ, and FIG. 8A shows a generalized classifier 800 and thresholds for a DZ+UTQ. The parameter s, which is greater than 0, indicates the step size for all steps other than the DZ. Mathematically, all $s_i$ are equal to s for i≠0. The parameter z, which is greater than or equal to 0, indicates the ratio of the DZ size to the size of the other steps. Mathematically, $s_0 = z \cdot s$. In FIG. 8A, z is 2, so the DZ is twice as wide as the other classification zones. The index mapping rule x→A[x] for a DZ+UTQ can be expressed as:

$$A[x] = \text{sign}(x) * \max\left(0, \left\lfloor \frac{|x|}{s} - \frac{z}{2} + 1 \right\rfloor\right), \quad (2)$$

where $\lfloor . \rfloor$ denotes the smallest integer less than or equal to the argument and where sign(x) is the function defined as:

$$\text{sign}(x) = \begin{cases} +1, & \text{for } x \geq 0 \\ -1, & \text{for } x < 0. \end{cases} \quad (3)$$

FIG. 8B shows a numerical example of a classifier 850 and thresholds for a DZ+UTQ with s=1 and z=2. FIGS. 5, 6A, and 6B show a special case DZ+UTQ with z=1. Quantizers of the UTQ form have good performance for a variety of statistical sources. In particular, the DZ+UTQ form is optimal for the statistical random variable source known as the Laplacian source.

In some system designs (not shown), an additional consideration may be necessary to fully characterize a DZ+UTQ classification rule. For practical reasons there may be a need to limit the range of values that can result from the classification function A[x] to some reasonable finite range. This limitation is referred to as clipping. For example, in some such systems the classification rule could more precisely be defined as:

$$A[x] = \text{sign}(x) * \min\left[g, \max\left(0, \left\lfloor \frac{|x|}{s} - \frac{z}{2} + 1 \right\rfloor\right)\right], \quad (4)$$

where g is a limit on the absolute value of A[x].

Different reconstruction rules may be used to determine the reconstruction value for each quantization index. Standards and product specifications that focus only on achieving interoperability will often specify reconstruction values without necessarily specifying the classification rule. In other words, some specifications may define the functional mapping k→β[k] without defining the functional mapping x→A[x]. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal.

In many systems, the extent of quantization is measured in terms of quantization step size. Coarser quantization uses larger quantization step sizes, corresponding to wider ranges of input values. Finer quantization uses smaller quantization step sizes. Often, for purposes of signaling and reconstruction, quantization step sizes are parameterized as multiples of a smallest quantization step size.

C. Quantization Artifacts

As mentioned above, lossy compression tends to cause a decrease in quality. For example, a series of ten samples of slightly different values can be approximated using quantization as ten samples with exactly the same particular approximate value. This kind of quantization can reduce the bit rate of encoding the series of ten samples, but at the cost of lost detail in the original ten samples.

In some cases, quantization produces visible artifacts that tend to be more artificial-looking and visually distracting than simple loss of fine detail. For example, smooth, un-textured content is susceptible to contouring artifacts—artifacts that appear between regions of two different quantization output values—because the human visual system is sensitive to subtle variations (particularly luma differences) in smooth content. Using the above example, consider a case where the luma values of the series of ten samples change gradually and consistently from the first sample to the tenth sample. Quantization may approximate the first five sample values as one value and the last five sample values as another value. While this kind of quantization may not create visible artifacts in textured areas due to masking effects, in smooth regions it can create a visible line or step in the reconstructed image between the two sets of five samples.

IV. Differential Quantization in VC-1

In differential quantization, an encoder varies quantization step sizes (also referred to herein as quantization parameters or QPs in some implementations) for different parts of a picture. Typically, this involves varying QPs on a macroblock level or other sub-picture level. The encoder makes decisions on how to vary the QPs, and signals those decisions, as appropriate, to a decoder.

For example, a VC-1 encoder optionally chooses differential quantization for compression. The encoder sends a bitstream element (DQUANT) at a syntax level above picture level to indicate whether or not the QP can vary among the macroblocks in individual pictures. The encoder sends a picture-level bitstream element, PQINDEX, to indicate a picture QP. If DQUANT=0, the QP indicated by PQINDEX is used for all macroblocks in the picture. If DQUANT=1 or 2, different macroblocks in the same picture can use different QPs.

The VC-1 encoder can use more than one approach to differential quantization. In one approach, only two different QPs are used for a picture. This is referred to as bi-level differential quantization. For example, one QP is used for macroblocks at picture edges and another QP is used for macroblocks in the rest of the picture. This can be useful for saving bits at picture edges, where fine detail is less important for maintaining overall visual quality. Or, a 1-bit value signaled per macroblock indicates which of two available QP values to use for the macroblock. In another approach, referred to as multi-level differential quantization, a larger number of different QPs can be used for individual macroblocks in a picture.

The encoder sends a picture-level bitstream element, VOP-DQUANT, when DQUANT is non-zero. VOPDQUANT is composed of other elements, potentially including DQPROFILE, which indicates which parts of the picture can use QPs other than the picture QP. When DQPROFILE indicates that arbitrary, different macroblocks can use QPs other than the picture QP, the bitstream element DQBILEVEL is present. If DQBILEVEL=1, each macroblock uses one of two QPs (bi-level quantization). If DQBILEVEL=0, each macroblock can use any QP (multi-level quantization).

The bitstream element MQDIFF is sent at macroblock level to signal a 1-bit selector for a macroblock for bi-level quantization. For multi-level quantization, MQDIFF indicates a differential between the picture QP and the macroblock QP or escape-coded absolute QP for a macroblock.

V. Other Standards and Products

Numerous international standards specify aspects of video decoders and formats for compressed video information. Directly or by implication, these standards also specify certain encoder details, but other encoder details are not specified. Some standards address still image compression/decompression, and other standards address audio compression/decompression. Numerous companies have produced encoders and decoders for audio, still images, and video. Various other kinds of signals (for example, hyperspectral imagery, graphics, text, financial information, etc.) are also commonly represented and stored or transmitted using compression techniques.

Various video standards allow the use of different quantization step sizes for different picture types, and allow variation of quantization step sizes for rate and quality control.

Standards typically do not fully specify the quantizer design. Most allow some variation in the encoder classification rule $x \rightarrow A[x]$ and/or the decoder reconstruction rule $k \rightarrow \beta[k]$. The use of a DZ ratio $z=2$ or greater has been implicit in a number of encoding designs. For example, the spacing of reconstruction values for predicted regions in some standards implies use of $z \geq 2$. Reconstruction values in these examples from standards are spaced appropriately for use of DZ+UTQ classification with $z=2$. Designs based on $z=1$ (or at least $z<2$) have been used for quantization in several standards. In these cases, reconstruction values are equally spaced around zero and away from zero.

Given the critical importance of video compression to digital video, it is not surprising that video compression is a richly developed field. Whatever the benefits of previous video compression techniques, however, they do not have the advantages of the following techniques and tools.

SUMMARY

The present application describes techniques and tools for adaptively adjusting quantization to account for DC shift artifacts. For example, a video encoder adjusts quantization for a smooth region of a video picture to reduce contouring artifacts caused by shifts in DC coefficient values from quantization. This can improve perceptual quality at a small bit rate cost.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a video encoder identifies one or more portions of a video picture that contain DC shift blocks and adjusts quantization (e.g., by reducing a quantization step size for macroblocks containing DC shift blocks) for the picture to reduce contouring artifacts when the picture is reconstructed.

The encoder can identify the portion(s) of the picture that contain DC shift blocks by identifying one or more gradient slope regions (e.g., by analyzing a texture map) in the picture and analyzing quantization effects on DC coefficients in the gradient slope region(s). The encoder can check a list of DC coefficient values with associated DC shift artifacts at a given quantization step size. The encoder can check neighbor blocks of DC shift blocks for DC shift artifacts. The encoder can identify the DC shift blocks using DC coefficients or mean sample values. The quantization can be bi-level or multi-level differential quantization and can use a uniform or non-uniform quantizer. The encoder can increase quantization for a high-texture portion of the picture.

In another aspect, a video encoder detects one or more blocks having a DC coefficient that changes value after quantization and inverse quantization at a first quantization step size (e.g., a picture quantization step size). The encoder selects a second quantization step size for at least one macroblock comprising at least one of the block(s) having a DC coefficient that changes value after quantization and inverse quantization at the first quantization step size. The encoder uses the second quantization step size (smaller than the first quantization step size) in quantization for the at least one macroblock. The second quantization step size can be smaller than a quantization step size used for smooth regions in the picture.

In another aspect, a video encoder detects a gradient slope region comprising one or more DC shift blocks in a video picture. Each of the DC shift blocks has a DC coefficient that changes value after quantization and inverse quantization at a first quantization step size. The encoder selects a second quantization step size (smaller than the first quantization step size) for at least one picture portion comprising at least one of the DC shift blocks having a DC coefficient that changes value. The encoder uses the second quantization step size in quantization for the picture portion(s). The encoder can select a quantization step size for a high-texture picture portion that is greater than the first quantization step size.

The foregoing and other objects, features, and advantages will become more apparent from the following detailed description, which proceeds with reference to the accompanying figures.

BRIEF DESCRIPTION OF THE DRAWINGS

FIG. 20 is a code diagram showing example pseudo-code for determining an adaptive texture-level threshold.

FIG. 21 is a diagram showing two examples of gradient slope regions.

FIG. 25 is a diagram that depicts 4-to-1 down-sampling of a gradient slope region with film grains that potentially cause anomalous gradient slope directions.

FIG. 26 is an equation diagram for 16×16 compass operators $K_H$ and $K_V$.

FIG. 27 is a code diagram showing example pseudo-code for computing the gradient direction for a region using the compass operators of FIG. 26.

DETAILED DESCRIPTION

The present application relates to techniques and tools for efficient compression of video. In various described embodiments, a video encoder incorporates techniques for encoding video, and corresponding signaling techniques for use with a bitstream format or syntax comprising different layers or levels. Some of the described techniques and tools can be applied to interlaced or progressive frames.

Various alternatives to the implementations described herein are possible. For example, techniques described with reference to flowchart diagrams can be altered by changing the ordering of stages shown in the flowcharts, by repeating or omitting certain stages, etc. For example, initial stages an analysis (e.g., obtaining texture information for a picture or performing texture analysis in detecting smooth regions) can be completed before later stages (e.g., making encoding decisions for the picture or performing temporal analysis in detecting smooth regions) begin, or operations for the different stages can be interleaved on a block-by-block, macroblock-by-macroblock, or other region-by-region basis. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder, or in some other system not specifically limited to video encoding.

I. Computing Environment

Figure 1:
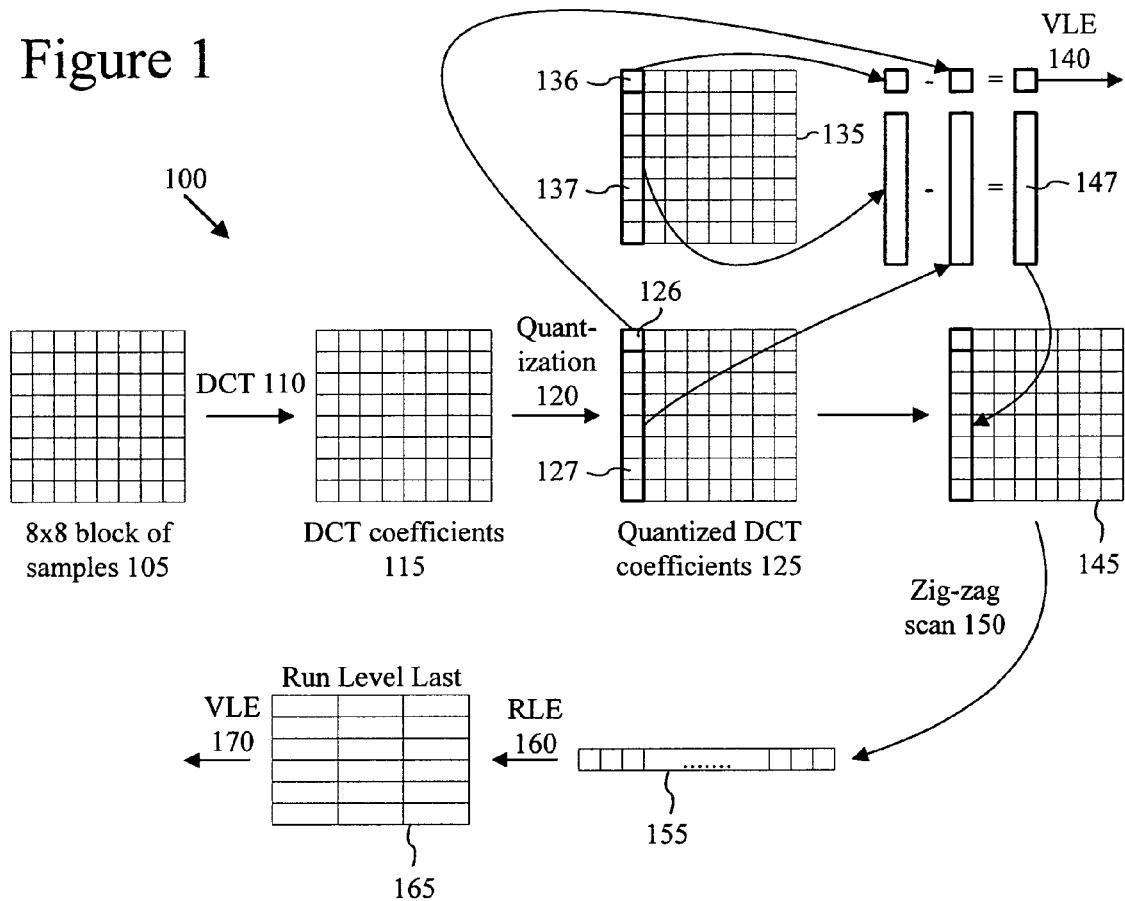
FIG. 1 is a diagram showing block-based intraframe compression of an 8×8 block of samples.
Figure 2:
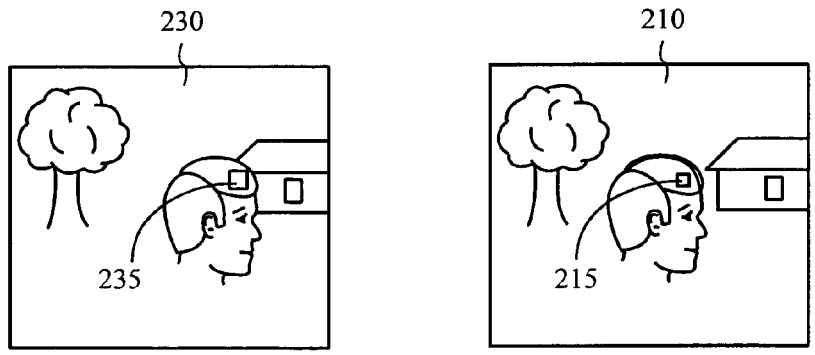
FIG. 2 is a diagram showing motion estimation in a video encoder.
Figure 3:
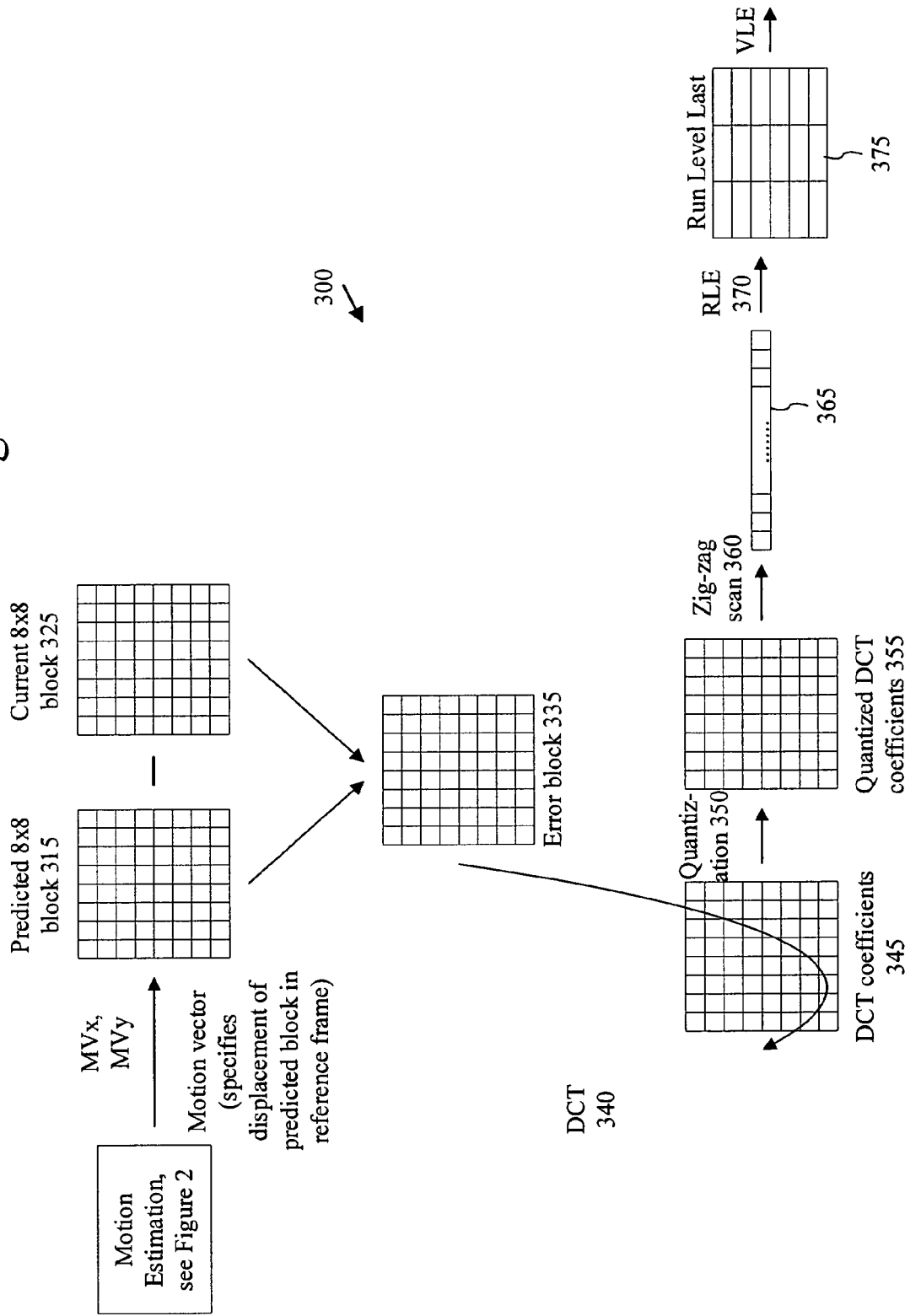
FIG. 3 is a diagram showing block-based compression for an 8×8 block of prediction residuals in a video encoder.
Figure 4:
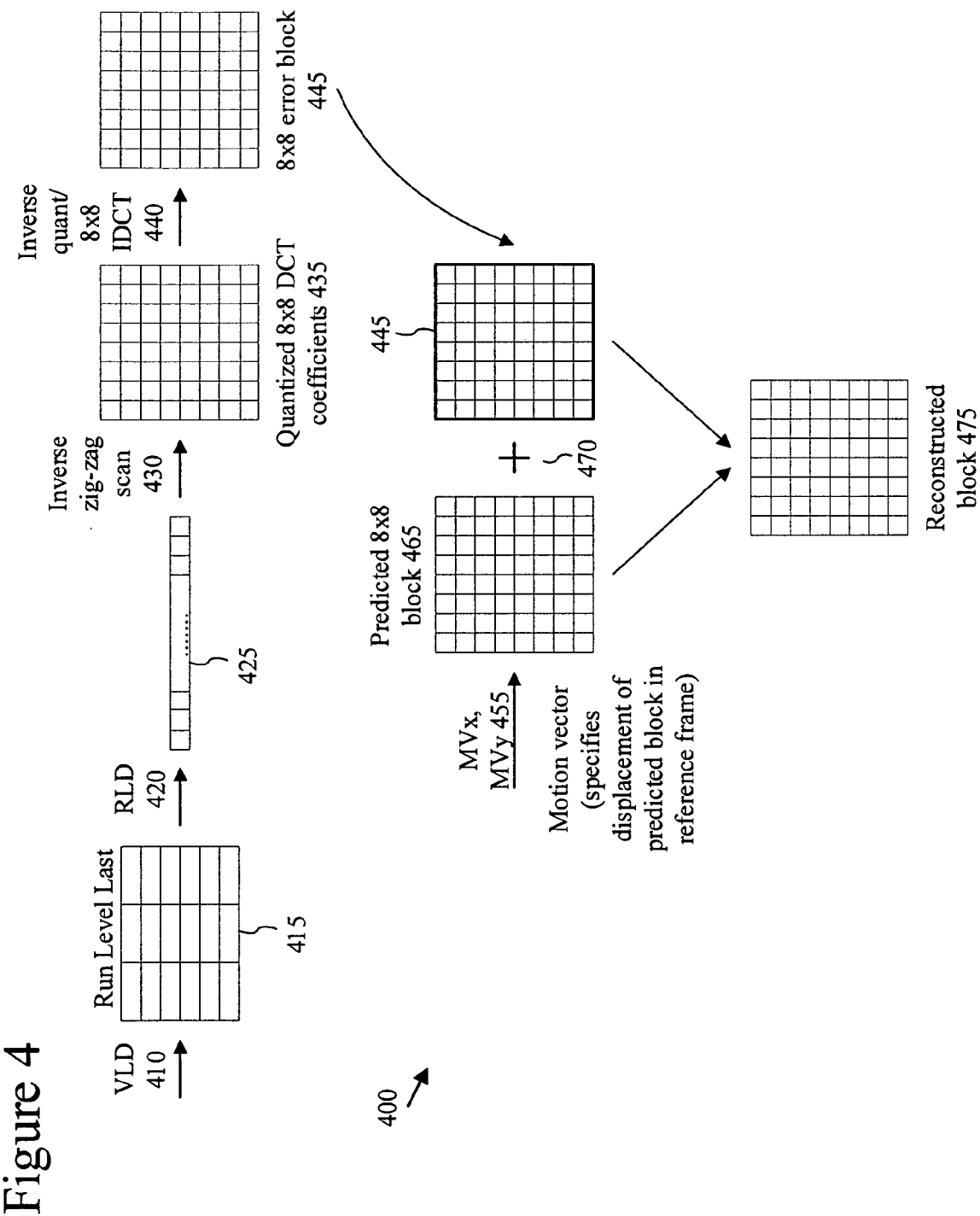
FIG. 4 is a diagram showing block-based decompression for an 8×8 block of prediction residuals in a video decoder.
Figure 5:
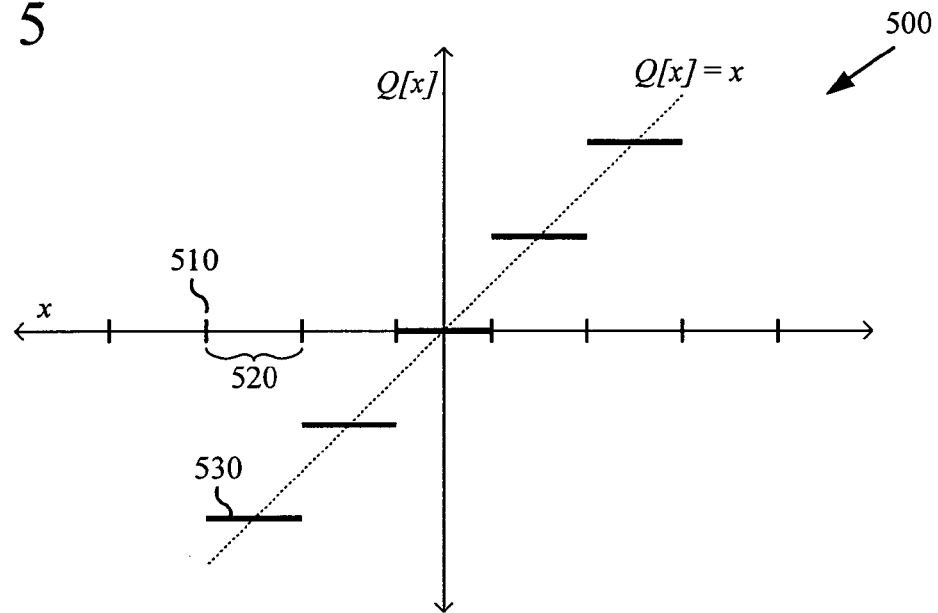
FIG. 5 is a chart showing a staircase I/O function for a scalar quantizer.
Figure 6A:
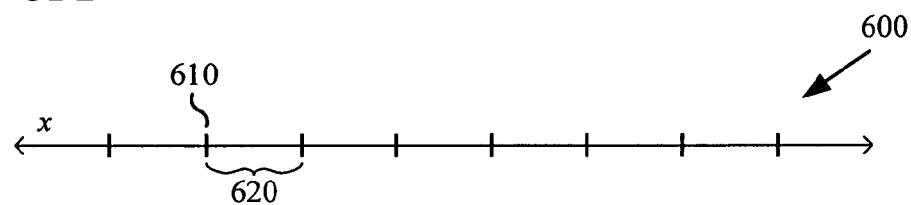
FIGS. 6A and 6B are charts showing classifiers and thresholds for scalar quantizers.
Figure 6B:
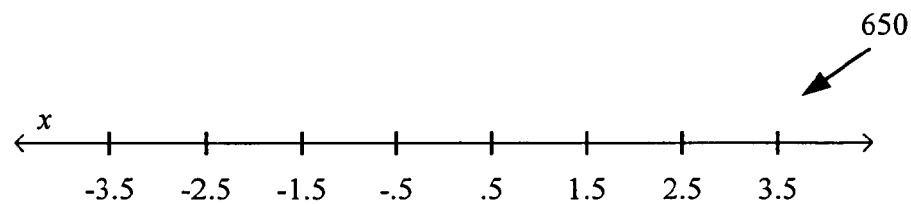
Figure 7:
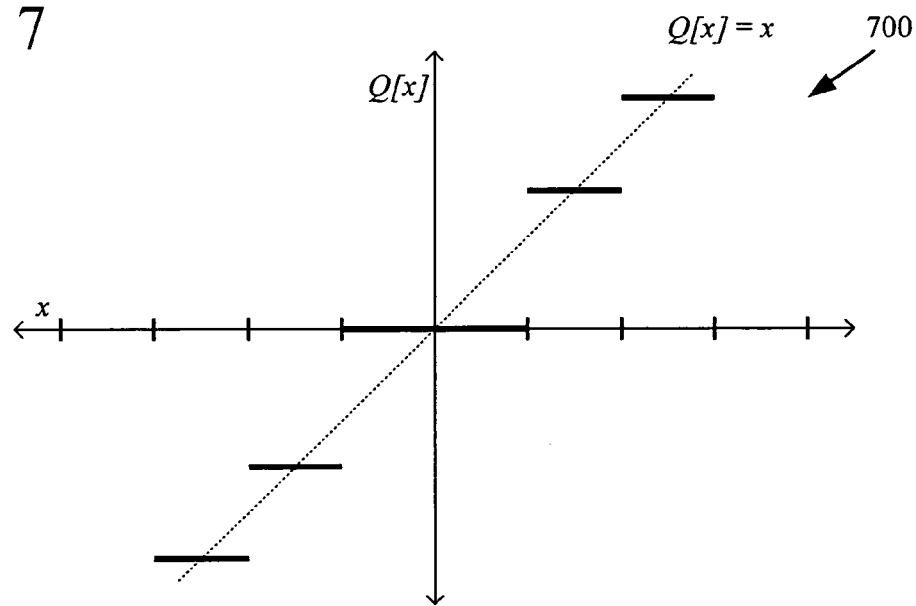
FIG. 7 is a chart showing a staircase I/O function for a DZ+UTQ.
Figure 8A:
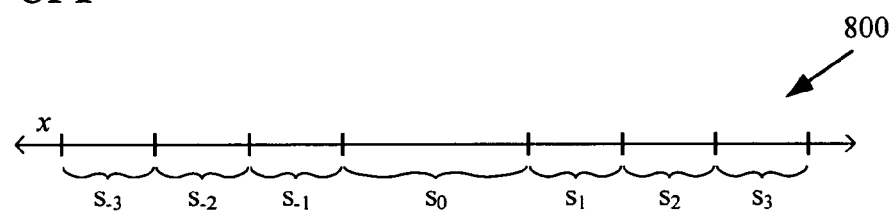
FIGS. 8A and 8B are charts showing classifiers and thresholds for DZ+UTQs.
Figure 8B:
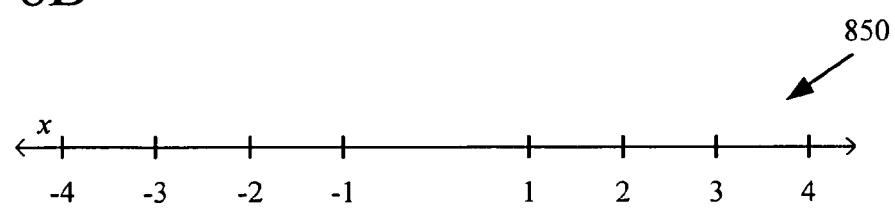
Figure 9:
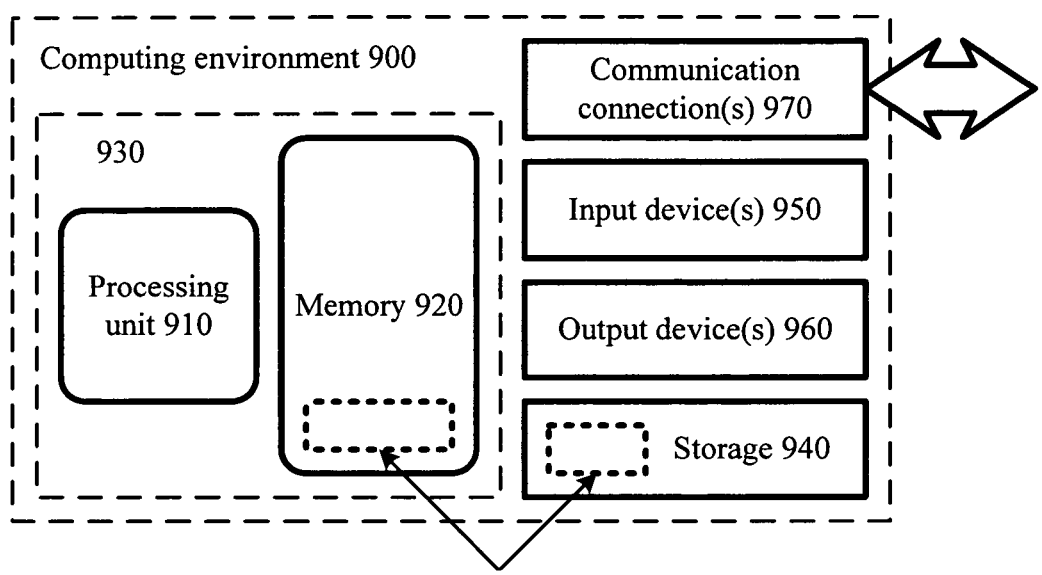
FIG. 9 is a block diagram of a suitable computing environment in conjunction with which several described embodiments may be implemented.

FIG. 9 illustrates a generalized example of a suitable computing environment 900 in which several of the described embodiments may be implemented. The computing environment 900 is not intended to suggest any limitation as to scope of use or functionality, as the techniques and tools may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing a video encoder with one or more of the described techniques and tools.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, DVDs, or any other medium which can be used to store information and which can be accessed within the computing environment 900. The storage 940 stores instructions for the software 980 implementing the video encoder.

The input device(s) 950 may be a touch input device such as a keyboard, mouse, pen, or trackball, a voice input device, a scanning device, or another device that provides input to the computing environment 900. For audio or video encoding, the input device(s) 950 may be a sound card, video card, TV tuner card, or similar device that accepts audio or video input in analog or digital form, or a CD-ROM or CD-RW that reads audio or video samples into the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide" and "analyze" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

Figure 10:
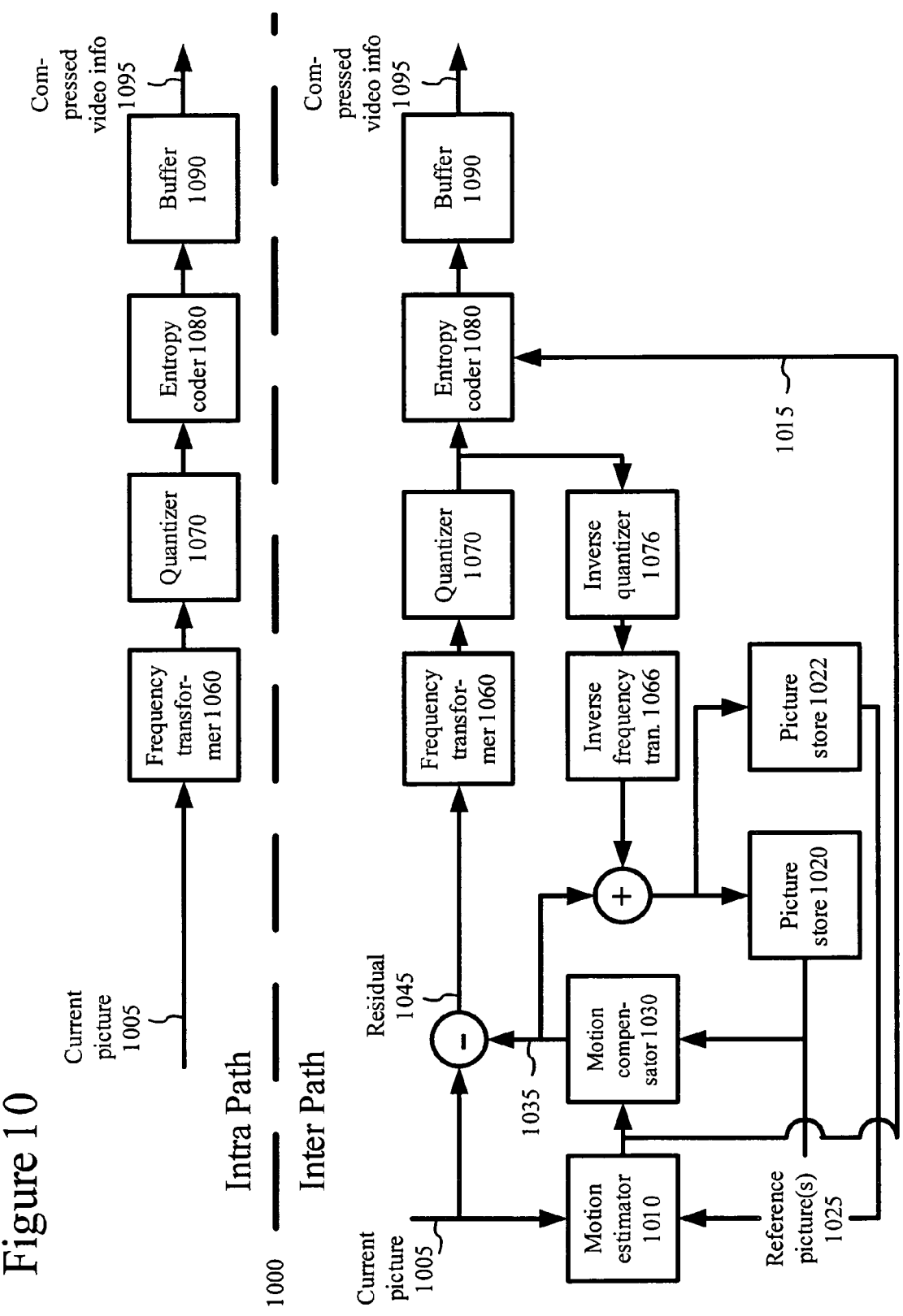
FIG. 10 is a block diagram of a generalized video encoder system in conjunction with which several described embodiments may be implemented.

FIG. 10 is a block diagram of a generalized video encoder 1000 in conjunction with which some described embodiments may be implemented. The encoder 1000 receives a sequence of video pictures including a current picture 1005 and produces compressed video information 1095 as output to storage, a buffer, or a communication connection. The format of an output bitstream can be a Windows Media Video or VC-1 format, MPEG-x format (e.g., MPEG-1, MPEG-2, or MPEG-4), H.26x format (e.g., H.261, H.262, H.263, or H.264), or other format.

Figure 11:
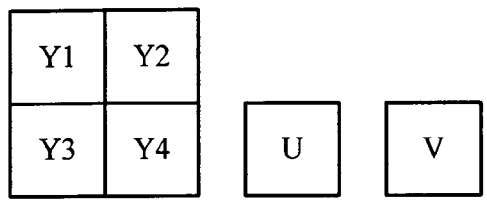
FIG. 11 is a diagram of a macroblock format used in several described embodiments.

The encoder 1000 processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder 1000 is block-based and uses a 4:2:0 macroblock format for frames. As shown in FIG. 11, macroblock 1100 includes four 8×8 luminance (or luma) blocks (Y1 through Y4) and two 8×8 chrominance (or chroma) blocks (U and V) that are co-located with the four luma blocks but half resolution horizontally and vertically, following the conventional 4:2:0 macroblock format. For fields, the same or a different macroblock organization and format may be used. The 8×8 blocks may be further sub-divided at different stages, e.g., at the frequency transform and entropy encoding stages. The encoder 1000 can perform operations on sets of samples of different size or configuration than 8×8 blocks and 16×16 macroblocks. Alternatively, the encoder 1000 is object-based or uses a different macroblock or block format.

Returning to FIG. 10, the encoder system 1000 compresses predicted pictures and intra-coded, key pictures. For the sake of presentation, FIG. 10 shows a path for key pictures through the encoder system 1000 and a path for predicted pictures. Many of the components of the encoder system 1000 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 1005 is a predicted picture, a motion estimator 1010 estimates motion of macroblocks or other sets of samples of the current picture 1005 with respect to one or more reference pictures, for example, the reconstructed previous picture 1025 buffered in the picture store 1020. If the current picture 1005 is a bi-predictive picture, a motion estimator 1010 estimates motion in the current picture 1005 with respect to up to four reconstructed reference pictures (for an interlaced B-field, for example). Typically, a motion estimator estimates motion in a B-picture with respect to one or more temporally previous reference pictures and one or more temporally future reference pictures, but B-pictures need not be predicted from different temporal directions. The encoder system 1000 can use the separate stores 1020 and 1022 for multiple reference pictures.

The motion estimator 1010 can estimate motion by full-sample, ½-sample, ¼-sample, or other increments, and can switch the precision of the motion estimation on a picture-by-picture basis or other basis. The motion estimator 1010 (and compensator 1030) also can switch between types of reference picture sample interpolation (e.g., between bicubic and bilinear) on a per-frame or other basis. The precision of the motion estimation can be the same or different horizontally and vertically. The motion estimator 1010 outputs as side information motion information 1015 such as differential motion vector information. The encoder 1000 encodes the motion information 1015 by, for example, computing one or more predictors for motion vectors, computing differentials between the motion vectors and predictors, and entropy coding the differentials. To reconstruct a motion vector, a motion compensator 1030 combines a predictor with differential motion vector information.

The motion compensator 1030 applies the reconstructed motion vector to the reconstructed picture(s) 1025 to form a motion-compensated current picture 1035. The prediction is rarely perfect, however, and the difference between the motion-compensated current picture 1035 and the original current picture 1005 is the prediction residual 1045. During later reconstruction of the picture, the prediction residual 1045 is added to the motion compensated current picture 1035 to obtain a reconstructed picture that is closer to the original current picture 1005. In lossy compression, however, some information is still lost from the original current picture 1005. Alternatively, a motion estimator and motion compensator apply another type of motion estimation/compensation.

A frequency transformer 1060 converts the spatial domain video information into frequency domain (i.e., spectral) data. For block-based video pictures, the frequency transformer 1060 applies a DCT, variant of DCT, or other block transform to blocks of the sample data or prediction residual data, producing blocks of frequency transform coefficients. Alternatively, the frequency transformer 1060 applies another conventional frequency transform such as a Fourier transform or uses wavelet or sub-band analysis. The frequency transformer 1060 may apply an 8×8, 8×4, 4×8, 4×4 or other size frequency transform.

A quantizer 1070 then quantizes the blocks of spectral data coefficients. The quantizer applies uniform, scalar quantization to the spectral data with a step-size that varies on a picture-by-picture basis or other basis (e.g., a macroblock-by-macroblock basis). Alternatively, the quantizer applies another type of quantization to the spectral data coefficients, for example, a non-uniform, vector, or non-adaptive quantization, or directly quantizes spatial domain data in an encoder system that does not use frequency transformations. Techniques and tools relating to quantization in some implementations are described in detail below.

In addition to adaptive quantization, the encoder 1000 can use frame dropping, adaptive filtering, or other techniques for rate control.

The encoder 1000 may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer 1076 performs inverse quantization on the quantized spectral data coefficients. An inverse frequency transformer 1066 then performs the inverse of the operations of the frequency transformer 1060, producing a reconstructed prediction residual (for a predicted picture) or a reconstructed key picture. If the current picture 1005 was a key picture, the reconstructed key picture is taken as the reconstructed current picture (not shown). If the current picture 1005 was a predicted picture, the reconstructed prediction residual is added to the motion-compensated current picture 1035 to form the reconstructed current picture. One or both of the picture stores 1020, 1022 buffers the reconstructed current picture for use in motion compensated prediction. In some embodiments, the encoder applies a de-blocking filter to the reconstructed frame to adaptively smooth discontinuities and other artifacts in the picture.

The entropy coder 1080 compresses the output of the quantizer 1070 as well as certain side information (e.g., motion information 1015, quantization step size (QP)). Typical entropy coding techniques include arithmetic coding, differential coding, Huffman coding, run length coding, LZ coding, dictionary coding, and combinations of the above. The entropy coder 1080 typically uses different coding techniques for different kinds of information (e.g., DC coefficients, AC coefficients, different kinds of side information), and can choose from among multiple code tables within a particular coding technique.

The entropy coder 1080 provides compressed video information 1095 to the multiplexer ("MUX") 1090. The MUX 1090 may include a buffer, and a buffer level indicator may be fed back to a controller. Before or after the MUX 1090, the compressed video information 1095 can be channel coded for transmission over the network. The channel coding can apply error detection and correction data to the compressed video information 1095.

A controller (not shown) receives inputs from various modules such as the motion estimator 1010, frequency transformer 1060, quantizer 1070, inverse quantizer 1076, entropy coder 1080, and buffer 1090. The controller evaluates intermediate results during encoding, for example, estimating distortion and performing other rate-distortion analysis. The controller works with modules such as the motion estimator 1010, frequency transformer 1060, quantizer 1070, and entropy coder 1080 to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder 1000 indicate general flows of information in the encoder; other relationships are not shown for the sake of simplicity. In particular, FIG. 10 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder 1000. Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Characterization of Video Content Using a Perceptual Model

Video content can be characterized using a perceptual model. This can help an encoder to make appropriate encoding decisions for different kinds of video content. An encoder can analyze a picture before encoding to provide characterizations for the content in different parts of the picture (e.g., blocks, macroblocks, etc.). For example, relatively smooth parts of a video picture, such as a blue sky, may be characterized as less acceptable for introducing distortion because certain kinds of quality degradation (e.g., quantization artifacts) are more easily perceived by humans in smooth regions. In contrast, distortion is generally less noticeable (and thus more acceptable) in texture regions.

Figure 12:
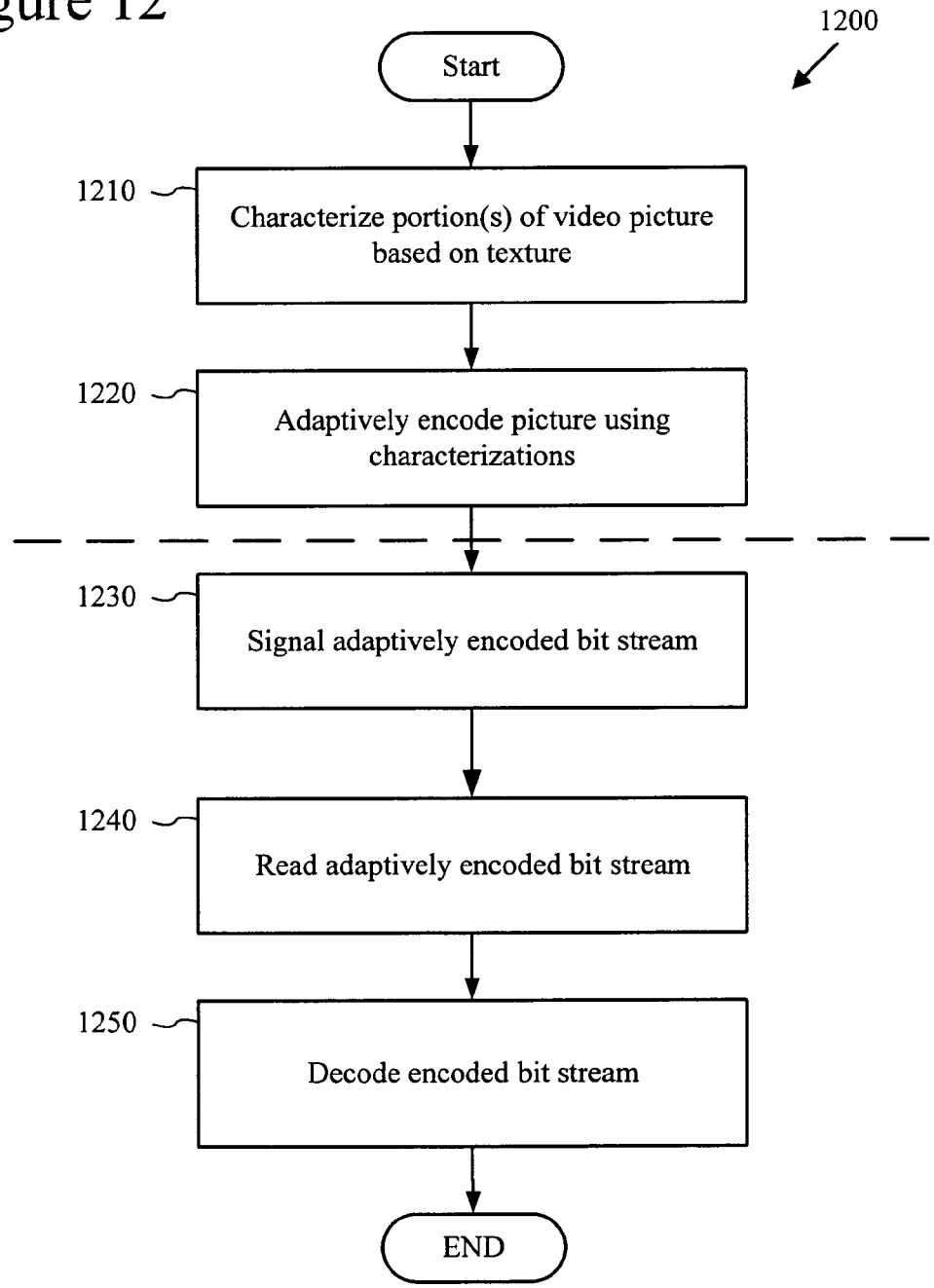
FIG. 12 is a flow chart of an adaptive video encoding method.

With reference to FIG. 12, a video encoder such as one described above with reference to FIG. 10 implements adaptive encoding techniques in a process 1200 that characterizes portions (e.g., blocks of macroblocks, macroblocks, or other regions) of a video picture (e.g., as a smooth region, edge region, texture region, etc.) and adapts one or more encoding techniques according to the characterization. Many of the described techniques provide adaptive encoding within a picture, such as on a block, macroblock or other region. The techniques use information to classify different parts of the image and to encode them accordingly. More particularly, a video encoder characterizes portions of the picture to classify content based on its perceptual characteristics.

At 1210, the video encoder characterizes one or more portions of a video picture. For example, the encoder characterizes a block of the video picture based on intensity variance within the block. In one implementation, the encoder computes a sum of the differences between a pixel and its adjacent pixels for the pixels in the block or a down-sampled version of the block. This sum of differences value measures intensity variance between a pixel and its surrounding pixels. For example, surrounding pixels comprise two or more other pixels adjacent to or nearly adjacent to a pixel, such as above or below, to the left or right, or diagonal to a pixel. The difference between a pixel's intensity and the intensities of its surrounding pixels is computed based on differences in luma and/or chroma data. In other words, the differences are computed with luma samples and/or chroma samples. An average computed difference value is assigned to the pixel (e.g., a pixel gradient). A difference value is computed in this way for pixels in a block (e.g., a block gradient), or for some sub-sampled set thereof. The difference values assigned to pixels in a block are evaluated to determine a characterization or classification (e.g., smooth, edge, or texture; texture or non-texture; smooth or non-smooth; etc.) for the block, which can be expressed a block value. In one example, the pixel gradients for pixels in a block are evaluated to determine a median difference value for the block gradient (e.g., a block median). Thus, intensity differences between pixels within a block provide a measure of intensity variance for a block, macroblock, or other video picture region.

A block median is not required to determine a block value. An intensity variance or block characterization may also be based on an average value for difference values assigned to pixels in the block (e.g., a block average). The block median or average can be used to classify the block and/or can be used as input to a finer-grained control function. The characterization or control function adaptively varies one or more aspects of encoding.

Alternatively, instead of computing an intensity variance to characterize a block, the encoder uses another metric.

At 1220, the encoder adaptively encodes the video picture based on the characterizations. In one implementation, encoding techniques for removal or reduction of contouring artifacts are performed based on block characterization. For example, gradient slope detection, DC shift detection, AC coefficient preservation, and adaptive differential quantization are performed for certain smooth regions, and textured regions are quantized more strongly to conserve bit rate.

Although FIG. 12 shows the characterizing stage 1210 preceding the adaptive encoding stage 1220 for multiple portions of a picture, these stages may also occur iteratively on a block-by-block basis in the picture or be ordered on some other basis.

At 1230, the encoder signals the adaptively encoded bit stream. When differential quantization is used by the encoder to encode based on block characterization, for example, the video encoder encodes information in the compressed bit stream using a signaling scheme for signaling the differential quantization to a video decoder.

At 1240, a corresponding video decoder reads the adaptively encoded bit stream, including the encoded data for the video picture. For example, the video decoder reads signaled differential quantization information. At 1250, the decoder decodes the compressed bit stream, for example, dequantizing blocks according to signaled differential quantization information.

A. Example Block-based Characterization

Figure 13:
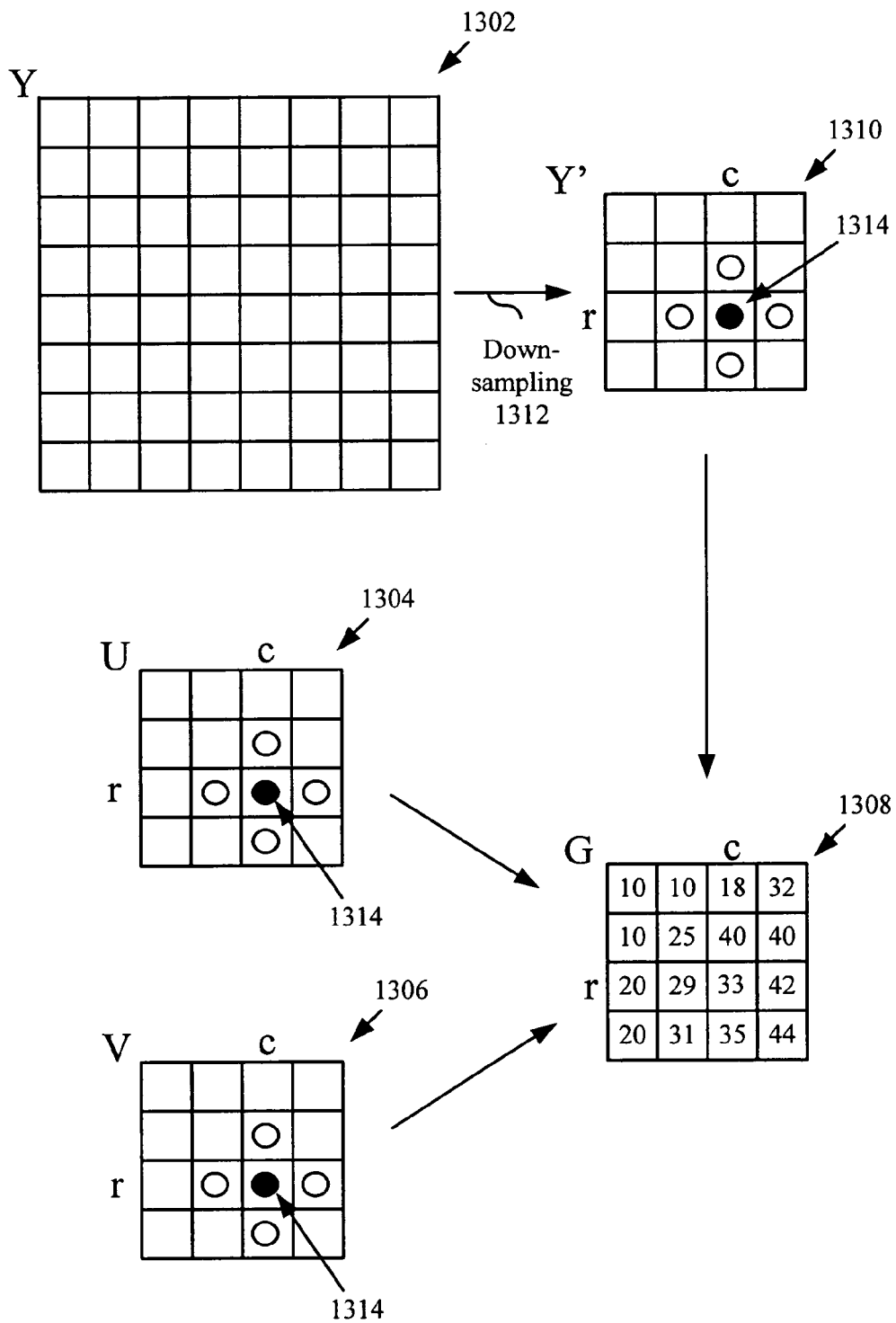
FIG. 13 is a diagram showing computation of a pixel gradient using luminance and chrominance data for a block.

FIG. 13 is a diagram showing block-based operations for characterizing blocks using luma and/or chroma data. The luma block "Y" (1302) is an 8×8 block of a macroblock in a 4:2:0 macroblock format. Although not required, in this example, corresponding chroma blocks 1304, 1306 for the pixel block are also used in computing a gradient block 1308. Although not required, as shown in this example, the luma block 1302 is down-sampled 1312 by a factor of 2 horizontally and vertically (e.g., by simple averaging of pairs of samples) to create a luma block 1310 that matches the 4×4 dimensions of the chroma blocks.

As shown in the down-sampled luma block 1310, the intensity value of a luma sample for a pixel 1314 is compared to samples for four pixels near it in the down-sampled luma block 1310, and an average sum of the difference between the sample for the pixel 1314 and the samples for its surrounding vertical and horizontal pixels is computed. In this example, the pixel 1314 is located at position Y'(r, c). The average sum of the differences for the luma intensity value for this pixel 1314 as compared to its surrounding pixels is:

$$L_I(r,c) = [|Y'(r,c) - Y'(r,c-1)| + |Y'(r,c) - Y'(r-1,c)| + |Y'(r,c) - Y'(r,c+1)| + |Y'(r,c) - Y'(r+1,c)|]/4 \quad (5)$$

As shown, Y'(r, c) is the luma component of the pixel 1314 at row r and column c in the down-sampled block Y'. $L_I(r, c)$ provides an indication of how the pixel 1314 differs in luma intensity from its neighbors within the block Y'. This luma intensity difference measurement is an example of a pixel gradient.

Optionally, chroma data 1304, 1306 may be considered alone instead of luma data, or may be considered together with luma data to determine intensity differences. The average sum of the differences for luma intensity values and chroma intensity values for pixel 1314 can be represented as the average of the differences in intensity values of samples for the surrounding pixels as shown in the following equation:

$$G_I(r,c) = \{[|Y'(r,c) - Y'(r,c-1)| + |Y'(r,c) - Y'(r-1,c)| + |Y'(r,c) - Y'(r,c+1)| + |Y'(r,c) - Y'(r+1,c)|] + [|U(r,c) - U(r,c-1)| + |U(r,c) - U(r-1,c)| + |U(r,c) - U(r,c+1)| + |U(r,c) - U(r+1,c)|] + [|V(r,c) - V(r,c-1)| + |V(r,c) - V(r-1,c)| + |V(r,c) - V(r,c+1)| + |V(r,c) - V(r+1,c)|]\}/12 \quad (6)$$

$G_I(r, c)$ is an example of a pixel gradient for the pixel located at (r, c) in the down-sampled block, and the pixel gradient provides an indication of how the pixel 1314 differs in luma and chroma intensity from its surrounding pixel neighbors. In this example, the pixel gradient value $G_I(r, c)$ is based on pixels that are immediately vertical or horizontal, but does not consider other pixels in the neighborhood. It is contemplated that other pixel data may also be considered in creation of a pixel gradient in other variations. For example, diagonal pixels could be considered as part of, or instead of the provided arrangement. Or, intensity differences across a longer stretch (e.g., 2 or 3 pixels) could be considered.

$G_I(r, c)$ provides an indication of how a single pixel differs from its neighbors in luma and chroma intensity. In order to characterize the intensity variance for an entire block, the same analysis is performed on plural or all pixels within the block. In one such example, a block 1308 of pixel gradients is created, and a block gradient is derived therefrom. As noted, computing a pixel gradient or a block gradient may include luma comparisons alone, chroma comparisons alone, or both luma and chroma comparisons together.

If desirable, the above equation for finding $G_I(r, c)$ may be varied to account for missing block boundary values. For example, samples outside the block may be extrapolated or assumed to be the same as other adjacent samples within the block when adapting the equation $G_I(r, c)$ to account for boundary values. Or, the denominator of the equations may be reduced and surrounding samples in certain directions ignored in the comparisons, for example, where those surrounding samples are outside of the block. As shown, a block 1308 of pixel gradients may provide pixel gradient data for all pixels in the block. Or, a block 1308 of pixel gradients may include pixel gradient data for less than all pixels in the block.

Figure 14:
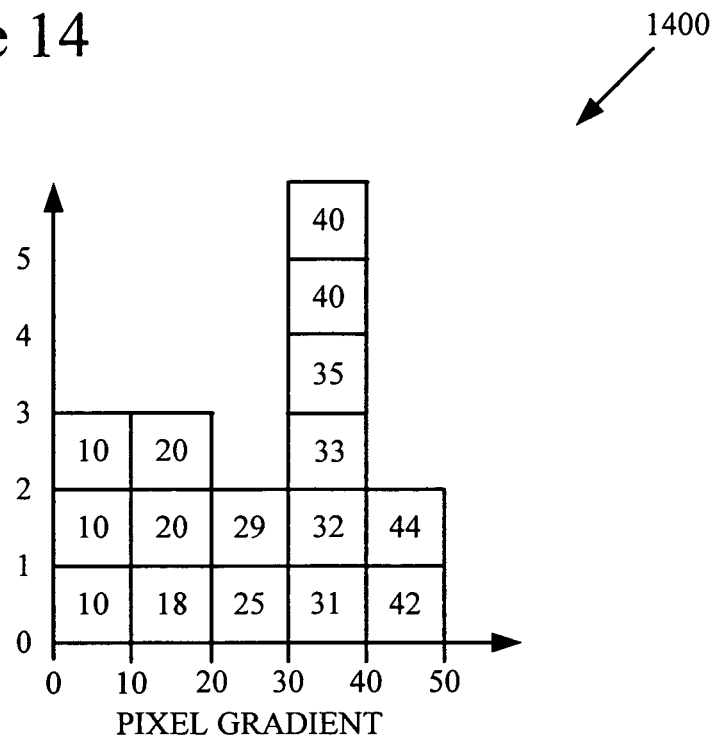
FIG. 14 is a histogram graph of plural pixel gradients for the block of FIG. 13.

FIG. 14 is a histogram of plural pixel gradients in the block 1308 of FIG. 13. More specifically, the histogram 1400 provides a visualization of how the block is characterized or valued. In this example, there are eight pixel gradient values below 30, and eight pixel gradient values above 30. Thus, a median value for this block gradient is 30. (For an even number of candidates, the median can be computed as the average of the two middle candidate values, or as one or the other of the two middle candidate values.) The median value may be used to characterize the block as smooth, texture, or edge. Of course, other metrics may be used to characterize blocks once the pixel gradients or blocks of pixel gradients are obtained. For example, blocks may be characterized according to an average of pixel gradient values. Once a block value is assigned it can be used in a characterization scheme (e.g., smooth or non-smooth; smooth, texture, edge; etc.) or in a finer grained control function. The block value can be used to determine how the block is treated in an adaptive encoding strategy.

A block value may be selected by ordering plural pixel gradients and selecting a median gradient value from the ordered values. For example, a set of pixel gradients within a block, such as {10, 14, 28, 36, 38}, has a block value assigned equal to the median pixel gradient in the set, or 28. In another example, a block value is determined based on the average gradient in the set, or 25.2 for the preceding numerical example. Of course, the set may be obtained from a complete block gradient, or a subset thereof.

C. Example Use of Characterization Information

Figure 15:
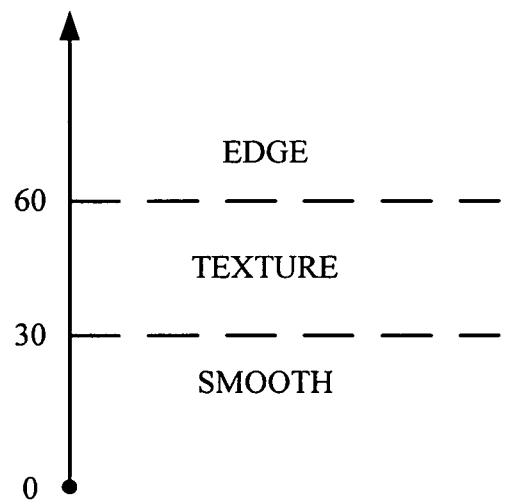
FIG. 15 is a graph of an example block value characterization framework.

FIG. 15 is a graph of an example block characterization framework, continuing the example of FIGS. 13 and 14. As shown, a block with a block value in the range from 0 up to and including 30 will be characterized as a smooth block. A block with a block value in the range of greater than 30 but less than or equal to 60 will be characterized as a texture block, and a block with a block value greater than 60 will be characterized as an edge block.

Alternatively, an encoder uses another characterization framework, for example, one including other and/or additional characterizations for blocks or other portions of video pictures. For different gradients and metrics, the framework can change in scale and/or number of dimensions.

An encoder can use the characterizations of the blocks or other portions of video pictures when making encoding decisions. Table 2 relates features of an example adaptive coding scheme to block characterizations as described with reference to FIG. 15. As shown, differently characterized blocks are treated differently in terms of one or more adaptive features.

TABLE 2

| Adaptive Encoding Features | | | |
|---|---|---|---|
| Characterization | DC Shift Detection | Gradient Slope Detection | Quantization |
| Smooth | Yes | Yes | Lower QP |
| Edge | No | No | Higher QP |
| Texture | No | No | Higher QP |

The various adaptive features shown in Table 2 are discussed throughout this document and will be further discussed below. Alternatively, an encoder uses another mapping of adaptive feature decisions to block characterizations. Moreover, some features described herein need not take into account characterizations of video content.

IV. Differential Quantization Based on Texture Level

In differential quantization, an encoder varies quantization step sizes (also referred to herein as quantization parameters or QPs in some implementations) for different parts of a picture. Typically, this involves varying QPs on a macroblock or other sub-picture level. An encoder makes decisions on how to vary the QPs and can signal those decisions, as appropriate, to a decoder.

Previous encoders have used bi-level differential quantization (varying between two QPs) and multi-level differential quantization (varying between three or more QPs). For example, in one bi-level differential quantization approach, one QP is used for macroblocks at picture edges and another QP is used for macroblocks in the rest of the picture. This can be useful for saving bits at picture edges, where fine detail is less important for maintaining overall visual quality. In a multi-level differential quantization approach, a larger number of different QPs can be used for individual macroblocks in a picture. For example, an encoder can choose a QP for a macroblock and signal a differential between the QP for the current picture and the QP for the macroblock.

Perceptual sensitivity to quantization artifacts is highly related to the texture level of the video in both the spatial and temporal domain. High texture levels often result in masking effects that can hide quality degradation and quantization artifacts. However, in regions with lower texture levels (e.g., smooth regions), degradation and quantization artifacts are more visible. Although previous encoders have made quantization adjustments for some parts of video pictures (e.g., picture edges), a more comprehensive content-based differential quantization strategy as described herein provides improved rate-distortion performance in many scenarios.

Accordingly, many of the described techniques and tools use texture-based differential quantization (referred to herein as texture DQ) to allocate bits based on various texture levels to achieve better perceptual quality. In texture DQ, different QPs are chosen to code video based on texture information and, in some cases, based on other information such as temporal analysis information. An encoder analyzes texture information (and possibly other information) and applies texture DQ to appropriate regions (texture DQ regions), such as 8×8 blocks or macroblocks in a picture. Many of the described techniques and tools focus on smooth regions as potential texture DQ regions. Smooth regions include flat regions (areas of constant or nearly constant color) and gradient slope regions (areas of color that vary at a constant or nearly constant rate across the region). Smooth regions may be considered smooth even when interrupted by small areas of noise, film grains, or other color variations.

Figure 16:
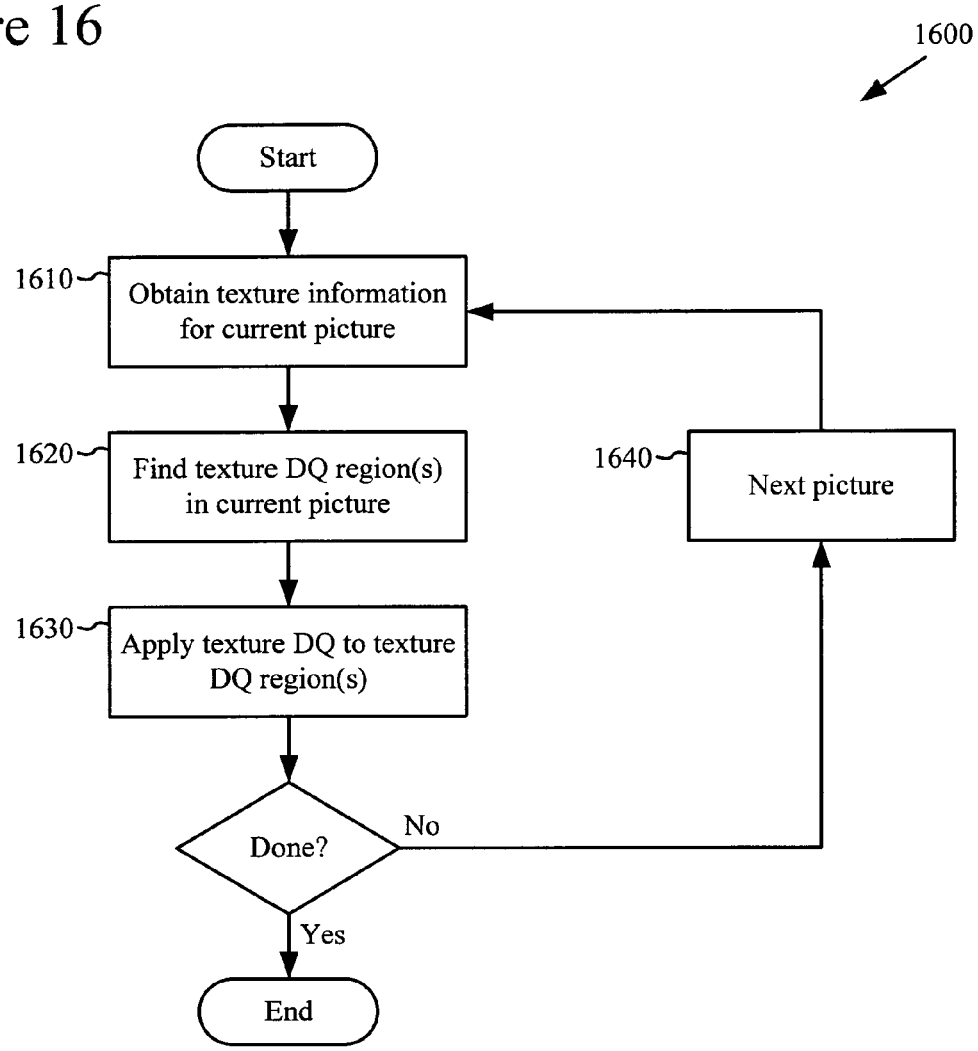
FIG. 16 is a flow chart showing a generalized technique for applying differential quantization based on texture information.

FIG. 16 is a flow chart showing a generalized technique 1600 for applying differential quantization based on texture information. An encoder such as the encoder 1000 of FIG. 10 or other tool performs the technique 1600.

At 1610, an encoder obtains texture information (e.g., characterizations or block values that indicate whether different regions are smooth, edge, or texture regions) for a current picture. At 1620, the encoder finds a texture DQ region (e.g., a smooth region in which contouring artifacts may be present) or texture DQ regions in the current picture. At 1630, the encoder applies texture DQ to the texture DQ region(s) and encodes the picture. For example, smooth regions are coded with smaller QPs than high texture regions. If there are more pictures to encode, the encoder takes the next picture at 1640 and selectively applies texture DQ to the next picture, as appropriate. The encoder outputs encoded data for the video picture, for example, to storage, a communication connection, or a buffer.

Different texture DQ region detection techniques can be used to determine whether a region should be treated as a smooth region. For example, an encoder can use different texture metrics and/or different texture thresholds (and can adjust thresholds adaptively) to determine whether a particular region should be considered a texture DQ region. Adaptive quantization value mapping can be used to allocate bits for better perceptual video quality. Differential quantization decisions also can be based on temporal analysis (i.e., looking at future pictures to make decisions based on characteristics of a region over time).

Differential quantization decisions can be made for both intra pictures and predicted pictures. For predicted pictures, P- and B-picture differential quantization intervals between differentially quantized pictures can be controlled. Further, by observing the texture of a picture when dominant high texture areas are present, the smooth region texture threshold can be relaxed to code a relatively smooth region (compared to the dominant high texture areas) with a smaller QP.

Techniques similar to those described with reference to FIGS. 12-15 in Section III, above, can be used to generate a texture map for a current picture. For example, the encoder calculates gradients for the texture levels for the picture as the first derivatives (differences) in the Y, U and V channels for the picture, as described in section III. When the macroblock format is 4:2:0, to speed up the calculation process, the encoder can downsample the Y channel by a factor of 2:1 horizontally and vertically. The encoder sums the gradients of Y, U and V for each pixel in both horizontal and vertical direction. For an 8×8 block in full resolution, the encoder computes the mean of the sum of the gradients in the corresponding 4×4 block in the downsampled picture to use as the block gradient value. Computing the mean of the gradients has a lower computational complexity than computing the median as described in section III.

Alternatively, an encoder obtains texture information for the picture in some other way. For example, an encoder chooses different gradient directions for calculating gradients, calculates gradients only for the luma channel, etc. However the texture information is obtained or calculated, it can then be used to make texture DQ decisions.

The texture map indicates the texture levels of the different parts of the picture. For example, the texture map can be used to identify smooth regions (e.g., blocks, macroblocks, edges, or other areas) and textured regions in the picture. Described differential quantization techniques can be performed on appropriate parts of the picture based on the information in the texture map. Alternatively, an encoder use texture information without first creating a texture map.

A. Temporal Analysis

In addition to texture information from a current video picture, temporal analysis can be used to make accurate differential quantization decisions. One reason for using temporal analysis is that the impact of using a smaller QP on a smooth region will be greater if the smooth region remains smooth over several pictures, especially when the other pictures reference the smooth region in motion compensation. Conversely, one benefit of using a smaller QP will be lost if smooth blocks are replaced with high texture or edge blocks in future pictures. Accordingly, an encoder looks at future pictures after finding a smooth region in a current picture and makes differential quantization decisions based on how smoothness of the region changes in the future pictures. The encoder can also look at previous pictures, for example, B-pictures that precede a current video picture in display order but reference the current video picture in motion compensation.

Figure 17:
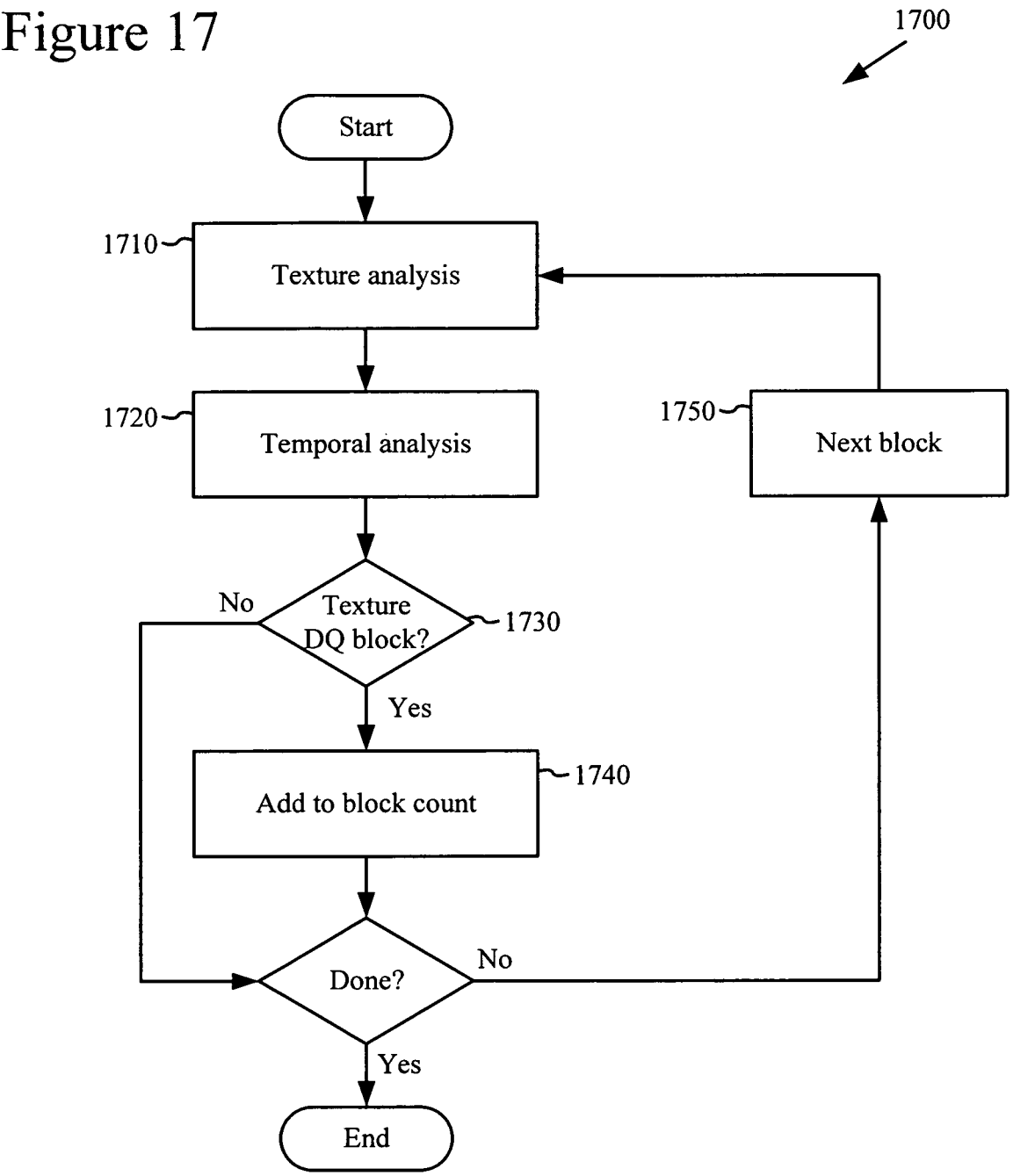
FIG. 17 is a flow chart showing a technique for using temporal analysis to make texture DQ decisions.

FIG. 17 shows an example technique 1700 for using temporal analysis to make texture DQ decisions. An encoder such as the encoder 1000 of FIG. 10 or other tool performs the technique 1700.

At 1710, an encoder performs texture analysis on a current block in a current picture in a video sequence. For example, the encoder looks at gradient information for the block. The encoder can compare the gradient information to a gradient threshold for the block and classify the block as smooth or non-smooth (e.g., texture, edge), where the gradient threshold is fixed or set dynamically for the current picture or other part of the video sequence. Alternatively, the encoder performs texture analysis for some other portion in the current picture.

At 1720, the encoder performs temporal analysis. The encoder can perform the temporal analysis automatically or only if the current block is classified as a smooth block. For example, the encoder determines if a smooth block in a current picture stays smooth in future pictures. If so, the smooth region in the current picture is later coded with a smaller QP. Or, the encoder determines if a smooth block in the current picture was also smooth in previous pictures, or in both previous and future pictures.

The number of previous and/or future pictures that the encoder analyzes can vary depending on implementation. If the smooth region is replaced in a future picture (e.g., the next picture or some other temporally close picture) by a textured region, the smooth region in the current picture might be coded with a larger QP, since the advantages of using a smaller QP are likely not as persistent. In one implementation, temporally closer pictures are weighted more heavily than more distant pictures in making the differential quantization decision. The weighting and the number of previous and/or future pictures that the encoder looks at can vary depending on implementation.

To simplify the calculations, the encoder can find a single value to compare the current block and the corresponding block in a future picture. For example, since luma values are fairly consistent within smooth blocks, the mean of the luma values for the block is calculated to measure the similarity of corresponding blocks in future pictures. In the following example equation, the "strength" S(t) of the future smoothness of corresponding blocks in a future picture is calculated by a sum of the weighted absolute difference between the mean luma values of the current block and the corresponding block in the future picture, the mean luma values of the corresponding blocks in the two future pictures, and so on.

$$S(t) = C(n) * \sum_{i=1}^{n} (n - i + 1) * |(M(t + i) - M(t + i - 1)|  \quad (7)$$

where n is the total number of temporal "look-ahead" pictures, C(n) is normalization factor, which is defined to be 2/(n*(n+1)), and M(t) is the mean of luma values for the block (or corresponding block) in the picture at time t. The encoder can also measure past smoothness instead of or in addition to future smoothness. Alternatively, the encoder uses another weighting system and/or smoothness metric in the temporal analysis of smoothness.

Referring again to FIG. 17, at 1730 the encoder uses results of the texture analysis and the temporal analysis to determine whether to classify the block as a texture DQ block. For example, the encoder computes a smoothness strength S(t) for a smooth block (but not other blocks) and compares the smoothness strength S(t) to a temporal smoothness threshold. The temporal smoothness threshold can be fixed or dynamically set.

In FIG. 17, if the encoder finds that the current block is a smooth block and that the corresponding block in previous and/or future pictures is also smooth, the encoder adds the current block to a count of texture DQ blocks at 1740. The encoder can use the count of texture DQ blocks to determine whether to perform texture DQ on the picture. Alternatively, an encoder uses temporal analysis in some other way to make a texture DQ decision.

If there are more blocks to analyze, the encoder takes the next block at 1750 and repeats the process shown in FIG. 17. This continues until the encoder has evaluated the blocks of the current video picture. At that point, the encoder uses the count of smooth blocks or other results of the temporal analysis in an encoding decision.

Although FIG. 17 shows an encoder performing temporal analysis on a block-by-block, alternatively, the encoder performs temporal analysis on a macroblock-by-macroblock basis or some other region-by-region basis.

B. Texture DQ Thresholds and Isolated Smooth Block Filtering

Whether or not the encoder uses temporal analysis, the encoder can use several other mechanisms in deciding when to apply texture DQ. An encoder can use one or more prevalence thresholds (e.g., percentages of smooth blocks in the picture) to make decisions on whether to perform DQ and, if so, how fine the QPs for texture DQ regions should be. For example, if the number or percentage of smooth blocks in a picture is above a threshold, the encoder can choose a coarser step size in order to avoid spending too many bits encoding smooth content with small QPs. The encoder also may have a lower threshold to determine whether the number or percentage of smooth blocks is enough to use texture DQ in the picture at all.

Another way to reduce bit rate is to treat certain smooth blocks as texture blocks when the smooth blocks are in predominantly textured regions. This can be referred to as isolated smooth block filtering (although a smooth block need not be completely "isolated" to be filtered in this way). For example, a smooth block surrounded by textured blocks need not be coded with a smaller QP than the textured blocks, since quantization artifacts in the smooth block are likely to be masked by the surrounding textured content. As a result, an encoder can choose not to perform texture DQ on isolated smooth blocks. The encoder also can disregard isolated smooth blocks when calculating the number or percentage of smooth blocks in a picture.

Figure 18:
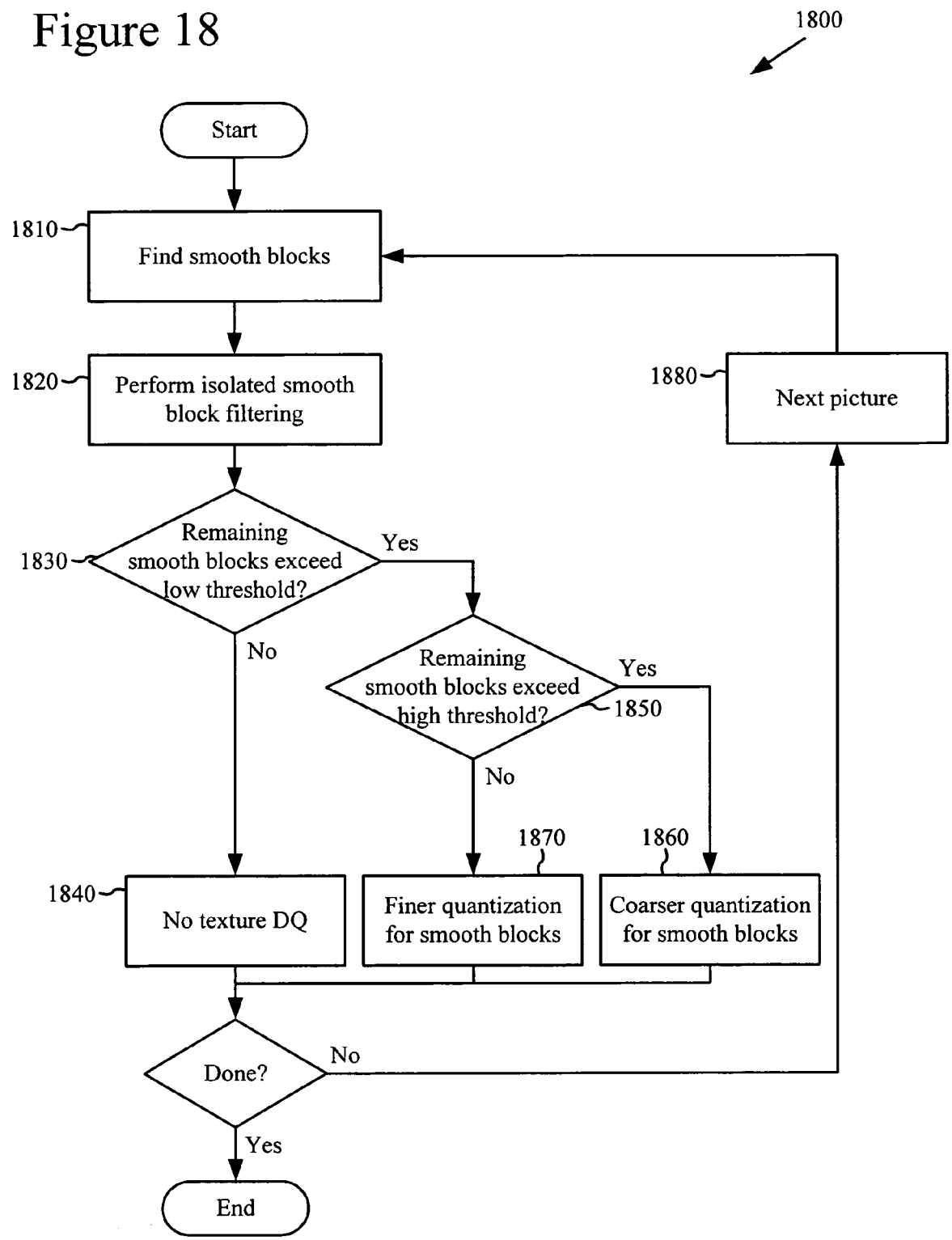
FIG. 18 is a flow chart showing a technique for making a texture DQ decision using percentage thresholds and isolated smooth block filtering.

FIG. 18 shows an example technique 1800 for making a texture DQ decision using thresholds and isolated smooth block filtering. An encoder such as the encoder 1000 of FIG. 10 or other tool performs the technique 1800.

At 1810, the encoder finds smooth blocks in the current picture. For example, the encoder performs texture analysis and temporal analysis as described with reference to FIG. 17. Alternatively, the encoder finds the smooth blocks in the current picture in some other way.

At 1820, the encoder performs isolated smooth block filtering. For example, the encoder removes single smooth blocks that are surrounded in the current picture by non-smooth blocks. An encoder can use many different decision models to perform isolated smooth block filtering. For example, an encoder can choose to treat a smooth block as a textured block only when all its neighboring blocks are textured blocks. Or, an encoder can choose to treat a smooth block as a textured block if a certain number of its neighboring blocks are textured. Or, the encoder removes isolated smooth blocks in larger groups (e.g., 2 or 3) and/or using some other test for whether block(s) are isolated.

At 1830, the encoder checks the percentage of smooth blocks in the picture against a low threshold (e.g., 1-2% of the total blocks in the picture). If the percentage of smooth blocks falls below the low threshold, the encoder determines that texture DQ will not be used for this picture (1840). If the percentage of smooth blocks is above the low threshold, the encoder checks the percentage against a high threshold at 1850. This higher threshold is used to pick a QP for the smooth blocks. If the percentage is higher than the high threshold, the encoder performs texture DQ but chooses a coarser QP (1860) for the smooth blocks to reduce bit rate. Otherwise, the encoder chooses a finer QP (1870) for the smooth blocks. If there are more pictures to analyze (1880), the encoder can repeat the process for other pictures. The number of thresholds and the threshold percentage values can vary depending on implementation.

Alternatively, an encoder performs isolated smooth block filtering without using texture DQ thresholds, or uses texture DQ thresholds without isolated smooth block filtering. Or, an encoder performs texture DQ without isolated smooth block filtering or using DQ thresholds.

C. Adaptive Texture Level Threshold

An encoder can use a fixed texture-level or smoothness threshold to determine whether a given block should be considered a texture DQ block (e.g., a smooth block). Taking into account the bit rate cost of DQ signaling (e.g., one bit per macroblock in an "all macroblock" bi-level DQ signaling scenario) and the bit rate cost of quantizing some parts of a picture at a smaller QP, the threshold acts as a check on the costs of texture DQ. For example, an encoder obtains a block value (using a technique described with reference to FIGS. 13 and 14 or some other technique) for a block and compares the block value to a fixed texture-level/smoothness threshold value (e.g., a threshold value described with reference to FIG. 15).

An encoder also can adaptively change texture-level/smoothness threshold values. For example, since the perceptibility of smooth blocks may change in pictures with a lot of high-texture content, the texture-level threshold for classifying a block as a smooth block can be relaxed in a medium-texture or high-texture picture. This is an example of an adaptive texture-level threshold. An encoder may allow several different thresholds to be selected within a range of thresholds. In one implementation, an adaptive texture-level threshold for smooth blocks can be varied between a block value of 14 and a block value of 30. Different differential quantization mappings can be used for different texture-level thresholds. An adaptive texture level threshold can be useful for allocating bits to smoother regions in higher-texture frames to improve quality in the smoother regions.

Figure 19:
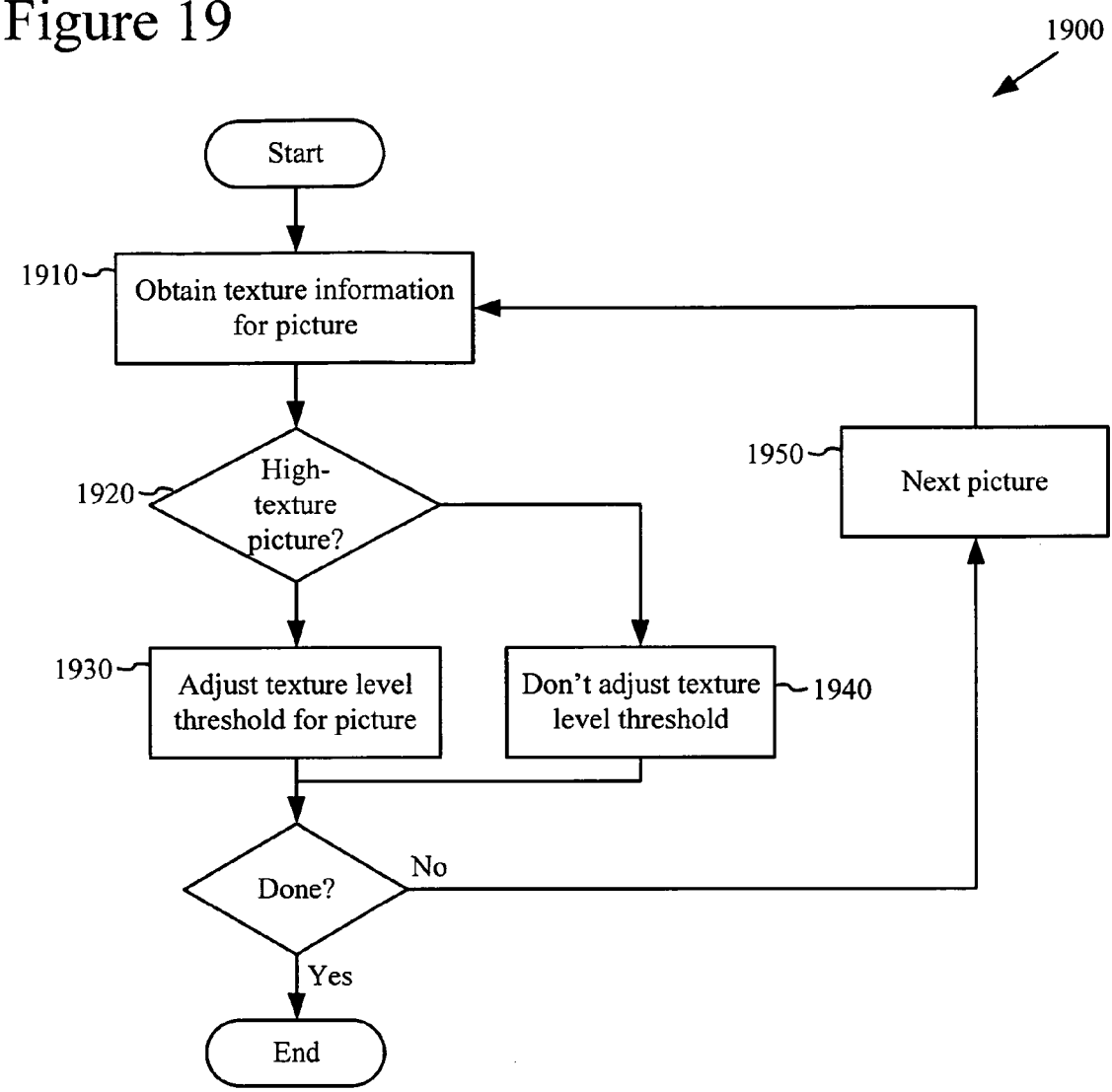
FIG. 19 is a flow chart showing a technique for selectively adjusting texture level thresholds for high-texture pictures.

FIG. 19 shows a technique 19 for selectively adjusting texture level thresholds for high-texture pictures. An encoder such as the encoder 1000 of FIG. 10 or other tool performs the technique 1900. The encoder determines whether to adjust texture level thresholds by detecting the presence of dominant high-texture content in a picture. In one implementation, the detection of high-texture content is implemented by calculating the texture "energy" in a sliding window with size of 10 in a texture histogram.

Referring to FIG. 19, an encoder obtains a texture information (e.g., a texture level histogram) for a picture at 1910 in an adaptive texture-level threshold technique 1900. For example, the encoder obtains a texture map as described above and creates a texture level histogram from the information.

At 1920, the encoder checks whether the picture is a high-texture picture. If the picture is a high-texture picture, the encoder adjusts the texture level threshold for the picture at 1930. If the picture is not a high-texture picture, the encoder processes the picture without adjusting the texture level threshold (1940). The encoder then can analyze and choose texture level thresholds for other pictures (1950). Alternatively, the encoder applies a sliding scale of different texture level thresholds for different levels of high-texture content in the picture.

For example, to check the extent of dominant high-texture content in a picture, an encoder computes a texture histogram for the picture. The encoder applies a sliding window in the texture histogram to calculate texture energy and determine a peak or prominent high-texture band. Equation (8) shows one way for the encoder to calculate the texture energy in the window. The sliding window starts sliding from the minimum texture level threshold g0 (which is by default 30), and the encoder computes the window value W(g) at g0. The sliding window shifts 1 to the right after calculation of texture energy for that window, and the encoder computes the next window value W(g) starting at the new value of g0. This continues until the encoder reaches the maximum of the texture levels represented in the histogram.

Let F(g) be the histogram of texture level per pixel. Let E(g) be the texture energy for the texture level, where E(g)=F(g)*g. The encoder calculates the texture energy of the sliding window W(g) as follows:

$$W(g) = \sum_{g=g0}^{g0+10} (F(g) * g). \tag{8}$$

If the maximum sliding window energy W(g) exceeds a certain percentage threshold of overall picture energy, g0 for that maximum sliding window energy W(g) is used to adjust the threshold for smooth regions.

FIG. 20 shows pseudo-code 2000 used to determine a new adaptive smooth region threshold from g0. If g0 is over 100, the adaptive threshold is set to 30. The encoder also checks if g0 is less than 30 and, if so, sets the adaptive threshold to 14. Otherwise, if 30≦g0<100, the adaptive threshold is set to a value from the table g_iFlatThTable. To help maintain video quality, the maximum difference of a new adaptive threshold from the last adaptive threshold is capped at +/−4 for all pictures except scene change key pictures. The adaptive smooth threshold should not exceed the threshold used to identify textured blocks—for example, in FIG. 20 the highest adaptive threshold value is 30.

Alternatively, an encoder adaptively adjusts texture level thresholds in some other way (e.g., with a different texture strength or energy metric, without a sliding window, with a differently configured sliding window, with different threshold values in a table or other data structure, without capping differences between adaptive thresholds, capping differences in adaptive thresholds in some other way, etc.).

D. I-Picture and P-Picture Differential Quantization

Described differential quantization techniques and tools can be used separately or in combination on intra pictures and predicted pictures. The term I-picture differential quantization (I-picture DQ) refers to application of differential quantization to I-pictures, and the term P-picture differential quantization (P-picture DQ) refers to application of differential quantization to P-pictures. The use of I-picture DQ results in higher quality I-pictures, and the quality improvement can be maintained longer for predicted pictures that depend from those I-pictures. P-picture DQ can further improve P-picture quality in both intra and inter blocks, but the quality of those P-pictures will also depend on the quality of the pictures from which they are predicted. Similarly, the impact of P-picture DQ on the quality of later predicted pictures will depend the similarity of the later predicted pictures to the pictures from which they are predicted.

E. Differential Quantization Intervals

Both I-picture DQ and P-picture DQ use one or more of the techniques described herein to decide whether to apply different QPs for different texture-level blocks. To balance quality and bit usage, a P-picture DQ interval can be used to control the amount of bits that are spent on P-picture DQ. For example, an encoder chooses to use P-picture DQ on one in every n P-pictures, where $n \geq 1$, but skips P-picture DQ for pictures in the interval between differentially quantized P-pictures. The encoder spends bits on differential quantization to improve the perceptual quality of some P-pictures, and those quality improvements carry over into other predicted pictures. At the same time, the DQ interval helps constrain the overall number of bits the encoder spends on differential quantization of predicted pictures.

Alternatively, the encoder selects another interval. For example, the encoder may choose to use P-picture DQ on only one P-picture per I-picture, or choose some other interval. The interval may be fixed or adaptive. For example, the encoder may adaptively adjust the P-picture DQ interval based on the type of content being encoded.

V. Gradient Slope Detection

Among various visual artifacts introduced in video compression, contouring is one particular artifact that can be caused by quantization. Contouring artifacts are perceived by human eyes as structured, gradient discontinuities in what are otherwise continuous, very smooth regions such as sky, water, etc. Such discontinuities can be very distracting and may lead a human observer to conclude that a whole picture is badly distorted even if other parts of the picture are coded with little visual distortion.

Gradient slope regions can give rise to contouring artifacts. According to one definition, a region is considered to be a gradient slope region if the region is smooth or relatively smooth but pixel values change gradually within the region. Thus, while both gradient slope regions and flat regions are considered to be smooth regions, gradient slope regions differ from flat regions. According to one definition, a flat region is characterized by constant or relatively constant pixel values throughout the flat region. Gradient slope regions typically lack strong edges and extensive texture detail.

FIG. 21 shows two examples of gradient slope regions. The gradient slope direction in each region is represented by arrows. In gradient slope region 2100, luma values increase gradually from the top to the bottom of the region. The direction of the slope in gradient slope region 2100 is the same in each part of the region. In gradient slope region 2110, luma values increase gradually from the center to the edges of the region. The direction of the gradient slope varies within the gradient slope region 2110. However, within small neighborhoods, the gradient slope direction at each point is within a small angle $\theta$ of the gradient slope direction at other points in the neighborhood, except for the neighborhood that includes the center point. As shown in FIG. 21, gradient slope regions include regions where the gradient slope direction is constant throughout the region, and regions where the gradient slope direction has small variations within a neighborhood.

Figure 22A:
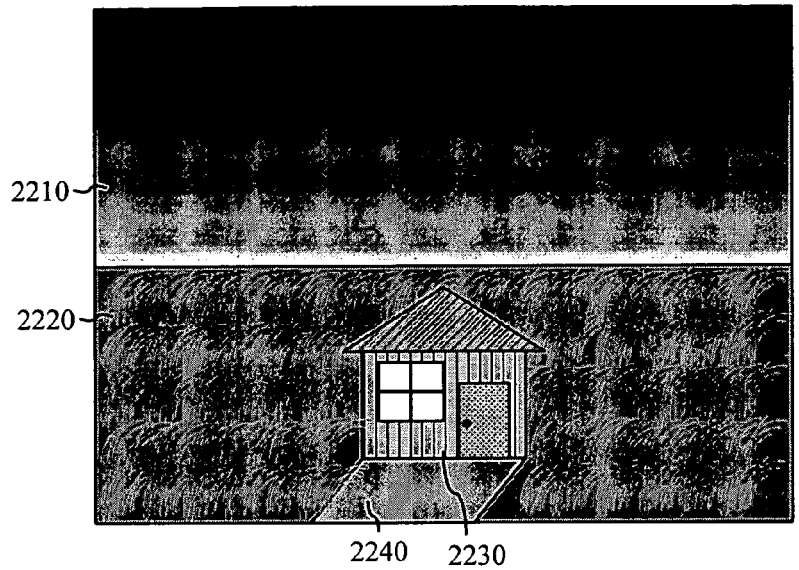
FIG. 22A is a diagram showing an example frame with a gradient slope region, a textured region, a sharp-edge region and a flat region.
Figure 22B:
FIG. 22B is a diagram showing a contouring artifact in the gradient slope region of FIG. 22A.
Figure 22C:
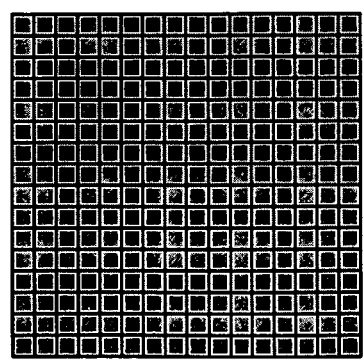
FIG. 22C shows macroblock-level detail of a contouring artifact of FIG. 22B.

FIG. 22A is a diagram showing an example picture 2200 with a gradient slope region 2210, a textured region 2220, a sharp-edge region 2230 and a flat region 2240. FIG. 22B is a diagram showing results of quantization in the gradient slope region 2210. The banding effect that is now visible (e.g., within macroblock 2250) is a contour artifact. FIG. 22C shows detail of the macroblock 2250. Quantization of transform coefficients for the top half of the luma samples in macroblock 2250 results in uniform values stemming from a DC value of 68. Quantization of transform coefficients for the bottom half of the luma samples in macroblock 2250 results in uniform values stemming from the DC value of 70. Thus, the quantization of the transform coefficients for the luma samples has created a visible contour artifact between the top-half 8×8 blocks and the bottom-half 8×8 blocks in macroblock 2250.

Many existing video encoders use techniques that are applied to a whole video picture in an attempt to reduce contouring artifacts in the picture. Such techniques may result in over-spending bits, especially in regions that contain little or no contouring artifacts. Accordingly, several described techniques and tools allow an encoder to detect gradient slope regions, where contouring artifacts are likely to happen. When gradient slope regions are detected, an encoder can make coding decisions that reduce or avoid introduction of contouring artifacts (e.g., adjustments of QPs) in the gradient slope regions. By doing so, an encoder can allocate bits more effectively and achieve better visual quality.

To detect gradient slope regions, an encoder can implement one or more of the following techniques:

1. Gradient slope region detection with coding decisions focused on reducing or removing introduction of contouring artifacts in the detected region(s).
 2. Region-based gradient estimation and down-sampling to reduce computational cost and/or allow accurate gradient slope region detection despite the presence of anomalies such as film grains.
 3. A gradient consistency check to detect gradual gradient change in local neighborhoods.
 4. Bucket voting to make a binary decision regarding the presence of gradient slope region(s) in a picture.
 5. The generation of a gradient slope mask (e.g., at macroblock-level) and gradient direction map to help an encoder to make appropriate coding decisions.

Figure 23:
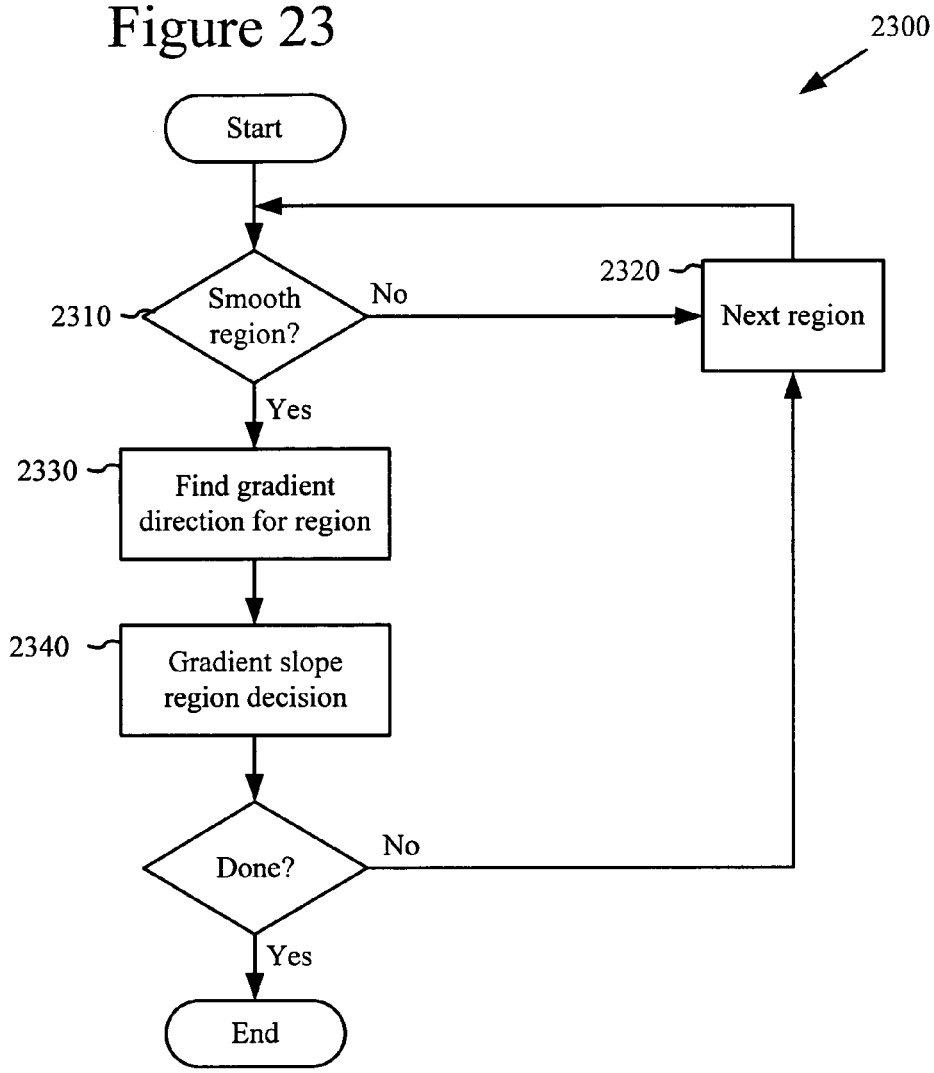
FIG. 23 is a flow chart showing a generalized region-based gradient slope detection technique.

FIG. 23 shows a generalized region-based gradient slope detection technique 2300. An encoder such as the encoder 1000 of FIG. 10 or other tool performs the technique 2300. In some cases, the region-based gradient slope detection technique 2300 allows faster detection of gradient slope content by eliminating the need to find gradient slope directions for each pixel in a picture. For example, the picture is divided into non-overlapping rectangular regions of the same size. The size of the regions can vary depending on implementation. In one implementation, a region is a 16×16 macroblock (four 8×8 blocks). Preferably, the region is of a size that allows macroblock alignment.

At 2310, an encoder checks whether a current region is a smooth region. For example, the encoder uses a texture map of the picture in which an 8×8 block is characterized as smooth if its assigned block gradient value is less than 30, or the encoder uses checks whether the current region is smooth using another technique described in section III or IV. When a region includes multiple blocks, the region is considered to be a smooth region if all blocks contained in the region are smooth (or, alternatively, if some minimum number of the blocks are smooth). Different implementations can use different criteria for determining whether a particular region or block is smooth. For example, the criteria for determining whether a region is smooth may be different if the picture is down-sampled.

If a region is not smooth, the next region is processed (2320). For a smooth region, the encoder finds a gradient direction at 2330. For example, the encoder finds a gradient direction using a technique such as the one described with reference to FIGS. 26 and 27. Alternatively, the encoder finds the gradient direction with some other technique.

At 2340, the encoder makes a gradient slope decision for the region, using thresholds and/or decision-making logic that depend on the technique and metrics used to find the gradient direction for the region. If there are more regions to be processed, the encoder processes the next region (2320). In one implementation, after computing initial gradient directions for different regions in a picture, the encoder generates a binary mask that indicates whether gradient slope is present in different regions by applying a sliding window in the picture. The information in the binary mask allows the encoder to make accurate gradient slope decisions.

Figure 24:
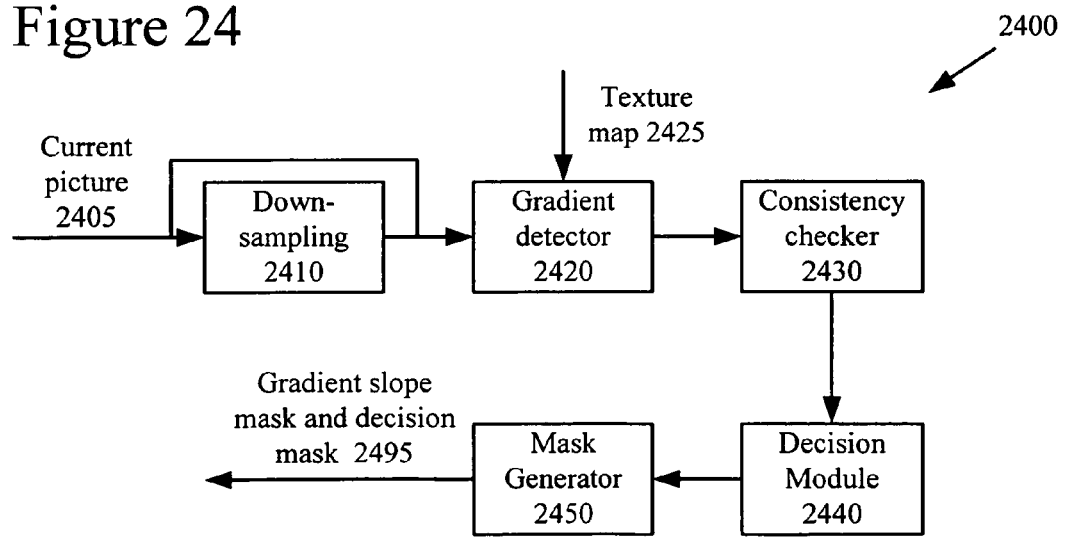
FIG. 24 is a block diagram of an example gradient slope detector according to one implementation.

FIG. 24 is a block diagram of an example gradient slope region detector (GSR detector) 2400 in a video encoder such as the one shown in FIG. 10. The GSR detector 2400 takes pixel data from a current picture 2405 as input.

Depending on picture size and potentially other factors, the GSR detector 2400 determines whether to perform down-sampling in down-sampling module 2410. Example down-sampling techniques are described below.

The gradient calculator 2420 takes (possibly down-sampled) pixel data and a texture map 2425 as input and calculates gradients for smooth regions. For example, the gradient calculator uses a technique such as the one described with reference to FIGS. 26 and 27 or uses some other technique. An example region size in the gradient calculation is 16×16, but the size of regions can vary depending on implementation. Depending on whether and how much down-sampling is applied, the region for which a gradient is calculated can represent different amounts of area in the original picture 2405. The gradient calculator 2420 outputs a map or other data structure indicating the gradient directions for smooth regions.

The consistency checker 2430 takes the calculated gradients for smooth regions and checks the angular consistency of those gradients, for example, as described below. The consistency checker 24 produces a consistency map or other data structure indicating consistency information for the calculated gradients.

The decision module 2440 uses additional decision rules (after consistency checking) to determine whether smooth regions should be considered gradient slope regions. Example decision rules and criteria are described below. The decision module 2440 considers the consistency map or other data structure indicating consistency information, and can also consider the calculated gradient directions or other information. The decision module 2440 outputs decision information in a map or other data structure for regions of the same or different size than the region size used in the gradient calculation.

The decision for each region is provided to mask generator 2450 which produces a gradient slope mask and/or a binary gradient slope decision mask 2495 that indicates gradient slope decisions for regions in the picture. For example, a mask 2495 comprises a bit equal to "1" for each gradient slope region and a bit equal to "0" for other regions. Accepting calculated gradients as input, the mask generator 2450 can produce another mask 2495 that indicates final gradient slopes for different regions of the original picture, accounting for down-sampling and mask decisions. When the GSR detector 2400 performs down-sampling before gradient calculation, the mask generator 2450 can assign gradient slopes for down-sampled regions to corresponding regions of the original picture.

The components of the GSR detector 2400 are shown as separate modules in FIG. 24, but the functions of these components can be rearranged, combined or split into different modules depending on implementation. Furthermore, components of gradient slop detector 2400 can be omitted in other implementations. For example, down-sampling is not required. A GSR detector need not take a texture map as input, and can instead get an indication of whether a region is smooth or not from some other source. A GSR detector need not use a consistency checker. Although a GSR detector will make some kind of decision as to whether a region is a gradient slope region, the specifics of how decisions are made (including decision rules in the decision module) can vary depending implementation. Gradient slope decisions need not be included in a binary mask and may be communicated to other parts of the encoder in some other way.

A. Region-Based Gradient Direction Estimation with Down-Sampling

Down-sampling can be used prior to finding gradient directions for regions in order to reduce computational cost. In one implementation, if the original picture width is greater than 1280 and the height is greater than 720, the original picture is 4-to-1 down-sampled. For example, in a 1080p arrangement with a picture width of 1920 pixels and a picture height of 1080 pixels, a decoder produces a down-sampled picture with a width of 480 pixels and a height of 270 pixels.

Typically, a down-sampled picture is divided into non-overlapping rectangular regions of the same size. For example, after downsampling, each 16×16 region corresponds to 4 macroblocks (16 blocks) of the original, full resolution picture. A region in the down-sampled picture is considered to be a smooth region if at least 12 blocks to which the region corresponds are smooth. Region sizes depend on implementation, and the relation between regions in gradient estimation and regions in original pictures varies depending on down-sampling ratio.

Down-sampling also is useful for improving accuracy of gradient slope region detection despite the presence of anomalies such as film grains. For example, consider a portion of a picture 2500 with DC values of blocks as shown in FIG. 25. The majority of the picture portion 2500 has consistent gradient slope directions, as shown by the gradually increasing DC values from the top to the bottom of the picture portion. However, the white sample values represent DC values affected by film grains that create anomalous gradient slope directions at full resolution. With simple 2-to-1 down-sampling horizontally and vertically, the dark-bordered sample values are used to calculate the gradient slope direction. Because the down-sampled values maintain a consistent gradient slope, the film grains do not affect detection of the gradient slope.

Down-sampling can be used for other picture resolutions, and other down-sampling ratios also can be used.

B. Calculating Gradient Slope Direction

In one implementation, to calculate gradient slope direction for a smooth region, two 16×16 compass operators $K_H$ and $K_V$ (defined in FIG. 26) are applied to the region. This produces two gradients $g_X$, $g_Y$ for the region, one for the horizontal direction and one for the vertical direction. For a 16×16 region, the compass operators give positive weights to some values of the region and negative weight to other values of the region. Alternatively, the compass operators compute gradients in some other way.

An angular representation of the gradient direction, denoted as θ, is derived from the two gradients and mapped to an integer in [0, 255]. The pseudo-code 2700 in FIG. 27 shows an example routing for computing the gradient direction for a region (⊗ denotes a per-element product) using the compass operators of FIG. 26. If the region is a textured region or edge region, the routine returns −2. If the region is smooth but flat (indicated by low absolute values for the gradients $g_X$ and $g_Y$ for the region, the routine returns −1. Otherwise, the routine computes the gradient slope as the arctangent of the vertical gradient $g_Y$ over the horizontal gradient $g_X$, using offsets to differentiate between slope directions for same arctangent values (e.g., whether a positive arctangent value indicates an above, right slope or a below, left slope) and represent the range of slope values as positive numbers.

Alternatively, the gradient direction is computed in some other way. For example, the encoder uses different compass operators, different thresholds for slope regions, different logic to compute the slope, and/or a different representation for slope information.

C. Neighborhood Gradient Consistency Check

An encoder can perform a gradient consistency check for regions in order to help make an accurate decision about whether a region should be considered a gradient slope region. The gradient consistency check helps to avoid "false alarms" in gradient slope content detection. In one implementation, the gradient slope consistency check involves using a 3×3 sliding window (three regions by three regions) to determine gradient slope consistency.

Figures 28, 29:
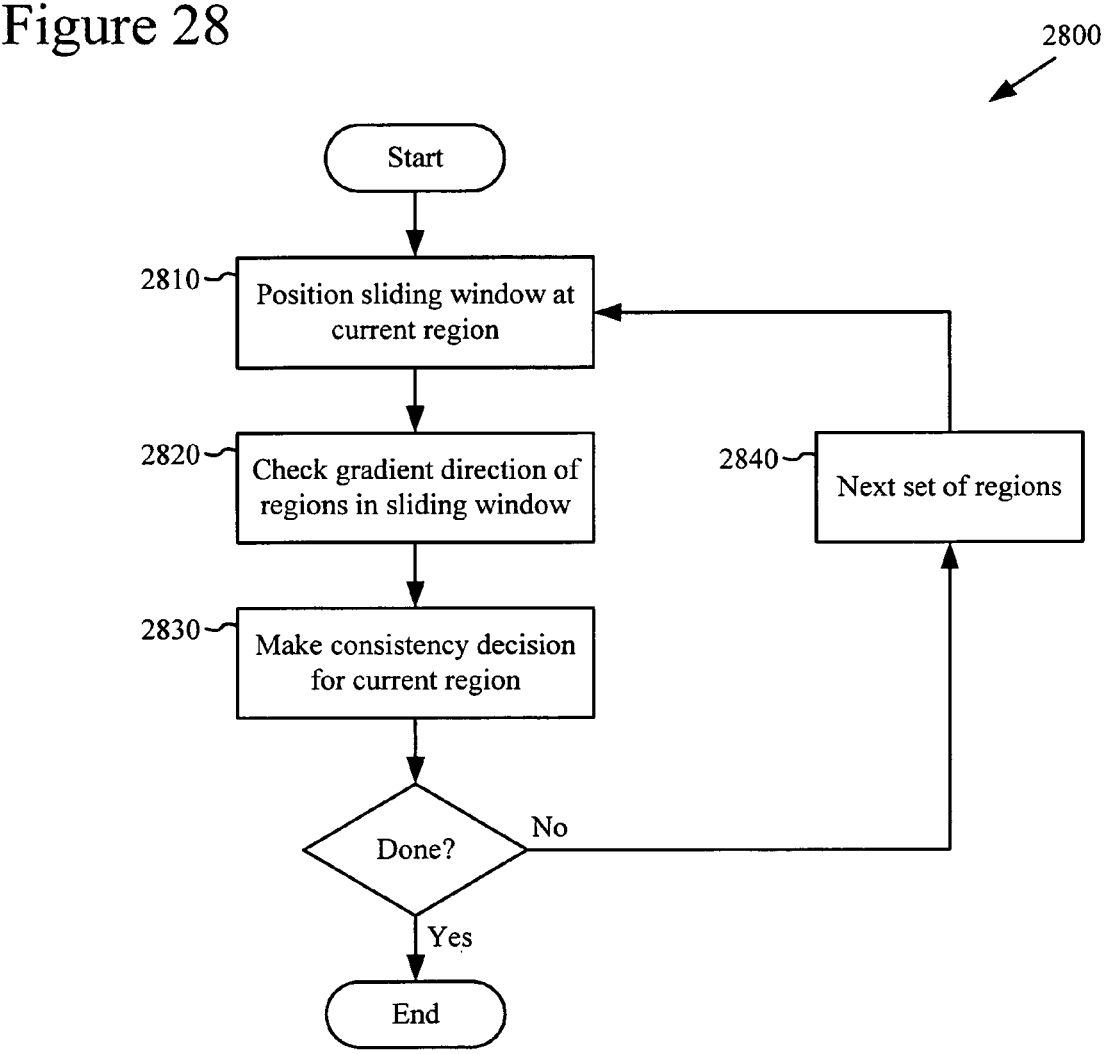
FIG. 28 is a flow chart showing a technique for performing consistency checking for gradient slope regions.
FIG. 29 is a diagram that depicts buckets in a bucket voting technique.

FIG. 28 shows a technique for performing consistency checking for gradient slope regions. An encoder such as the encoder 1000 of FIG. 10 or other tool performs the technique 2800.

At 2810, the encoder positions a sliding window at a current region in the picture. At 2820, the encoder checks the gradient directions of regions in the sliding window. Then, at 2830, the encoder makes a consistency decision for the current region. For example, given the gradient directions of detected smooth regions in a picture (potentially down-sampled), a gradient consistency check is performed with the sliding window containing 3×3 neighboring regions. The window is moved in raster scan order, positioning the window on a region in the picture (e.g., by centering the window on the region, performing the consistency check, then moving the window from left to right across the picture). For a given window value, the consistency check requires the difference between the maximum and the minimum gradientDirection (see, e.g., FIG. 27) of all 9 regions within the window to be less than 32 (equivalent to 45 degrees when slopes are represented by numbers from 0 to 255). If this condition is satisfied, the moving window value for the 3×3 set of regions is 1; otherwise it is 0. Alternatively, the encoder uses a different mechanism to check consistency of slope directions, for example, using a different size sliding window, different slope range threshold for maximum slope—minimum slope, different measure such as variance for slope consistency, and/or different checking pattern, or computes a sliding window value for each region as opposed to sets of regions. The consistency check varies for different representations of slope information.

The encoder can then process the next set of regions (2840). As output, the encoder produces a mask or other data structure indicating decision information. For example, the encoder produces a binary consistency mask (referred to herein as consistencyMask) obtained by positioning the sliding window and performing the consistency check on sets of regions in the picture, and assigning each set of regions a decision of 1 (consistent slope) or 0.

Optionally, the encoder performs further processing on the decision information. In some implementations, an encoder performs morphological operations on a consistency mask to help refine gradient consistency decisions for a picture. Two possible morphological operations are Erode and Dilate.

For example, an Erode operation is performed on every bit in the consistencyMask, followed by a Dilate operation. In the Erode operation, a bit initially marked as 1 is marked as 0 if in the four closest pixels (here, values in the consistencyMask), more than one was initially marked as 0. In the Dilate operation, a bit initially marked as 0 is marked 1 if in the four closest pixels, more than one were initially marked as 1.

Alternatively, an encoder generates masks without using morphological operations or other post-processing of the decision information.

D. Decision Rules and Bucket Voting

Even after performing consistency checking, the incidence of smooth regions may be so low, or the smooth regions may be so isolated, that they would be inefficient to encode specially. For example, even after applying morphological operations, there may still be gradient slope regions represented in consistencyMask that are isolated enough to not need differential quantization. In some implementations, an encoder uses decision rules (including, for example, bucket voting) to help decide whether DQ should be applied to gradient slope regions in the picture. In the GSR detector 2400 of FIG. 24, decision module 2440 makes such decisions.

In one implementation, the encoder makes one or more binary decisions regarding whether the current picture contains significant gradient slope based on consistencyMask. The mask consistencyMask is divided into 25 rectangular regions of the same size (called buckets) with 5 buckets in each row and 5 in each column. (The "bucket" regions are hence larger than the regions used for decisions and regions used for gradient calculations.) The 1s within each bucket are counted. Let Buckets[i][j] be the number of 1s contained in the bucket at location (i,j), where $0 \leq i,j \leq 4$. Horizontal and vertical bucket projections—the number of 1s in each column of buckets and the number of 1s in each row of buckets, respectively—also are calculated according to the following relationship:

$$\text{BucketProjection\_H}[i] = \sum_{0 \leq j \leq 4} \text{Buckets}[i][j] \qquad (9)$$

$$\text{BucketProjection\_V}[j] = \sum_{0 \leq i \leq 4} \text{Buckets}[i][j]$$

In this implementation, the picture is considered to contain significant gradient slope if any of the following conditions are satisfied:
1. At least 6% of the pixels in consistencyMask (regardless of bucket distribution) are marked as 1, OR
2. In one or more of the buckets, at least 75% of the pixels are marked as 1, OR
3. In one or more of the bucket projections, at least 20% of the pixels are marked as 1.

For example, 16×16 regions for a down-sampled picture of size 960×1440 are represented with a mask of size 20×30 (each value for a 3×3 set of regions of the down-sampled picture), which is in turn divided into 25 buckets, each bucket corresponding to a 24 regions of the consistency mask. Each bucket includes 24 bits from consistencyMask, for a total of 25×24=600 bits. The encoder counts the number of 1s in each bucket, with a distribution as shown in FIG. 29. The encoder checks whether the total number of 1s is more than 6% of all bits. In this case, the total number of 1s (as shown in FIG. 29) is 83, which is more than 6% of all bits. Thus, the encoder in the case would skip bucket projection, due to satisfaction of condition 1, above. If the total number of 1s were below the threshold for condition 1, the encoder would whether 75% of the bits in any bucket were 1s (condition 2), and, if necessary, check horizontal and vertical bucket projections (condition 3) to determine whether the regions indicated as being gradient slope regions are such that a gradient slope mask and decision mask should be generated, such as the macroblock-level gradient slope masks described below.

Alternatively, an encoder uses other decision rules for processing consistency information in a mask consistencyMask or other representation. For example, the percentage thresholds shown in conditions 1, 2 and 3 can vary depending on implementation. Or, one or more of the conditions is omitted, or the conditions are reordered, replaced or supplemented by other conditions (e.g., different directions for bucket projections, etc.). Aside from checking consistency information, the encoder can also consider gradient values and/or other information when deciding whether or how much DQ should be applied to gradient slope regions in the picture. As another alternative, an encoder can omit these decision rules altogether, and simply use the consistencyMask when generating a gradient slope mask.

E. Macroblock-Level Gradient Slope Mask Generation

To provide gradient slope information in a form useful for later encoder decision-making, the encoder puts the information in maps, masks, or other data structures. The information can include gradient slope region presence/absence information as well as actual gradient direction values for gradient slope regions.

For gradient slope presence/absence information, if gradient slope regions are detected, the encoder produces a gradient slope mask. For example, an encoder produces a macroblock-level gradient slope mask (referred to herein as MBSlopeMask) by converting a region-level mask (such as consistencyMask) back to macroblock-level for the original picture, considering possible down-sampling. Note that each value in consistencyMask corresponds to 9 macroblocks in the original picture, or 36 macroblocks if the picture is 4-to-1 down-sampled. For each bit with value 1 in consistencyMask, the encoder marks corresponding macroblocks as 1 in MBSlopeMask except for macroblock that are not smooth. Checking for smoothness again helps to avoid false alarms in gradient slope detection. For example, in one implementation an encoder uses a texture map to obtain texture information for blocks in a macroblock, and the macroblock is considered smooth only if all four blocks within the macroblock are smooth.

Alternatively, the encoder provides gradient decision information in some other form and/or uses some other decision for macroblock smoothness.

For gradient direction information, a gradient direction map is generated by assigning each region's gradient direction to all its corresponding macroblocks that are smooth. In doing so, the encoder accounts for possible size differences between macroblocks of the original picture and gradient regions due to down-sampling before gradient calculation.

The generated gradient slope mask and gradient direction map are then used in the encoder to make better coding decisions. Generally speaking, the results generated by a gradient slope region detector can be used by an encoder to make other coding decisions. For example, an encoder can make quantization decisions based on a generated gradient slope mask and/or gradient direction map. Some of the possible encoder decisions are described below.

VI. Adjusting Quantization to Preserve Non-zero AC Coefficients

Typically, a picture is assigned a picture-level quantization parameter by a rate control unit in an encoder. Using the same picture-level QP, the amount of bits used to represent a highly textured macroblock is typically much greater (as much as 10 to 50 times greater) than the amount of bits used to represent a low textured macroblock. Since the human visual system is less sensitive to distortion in a busy, highly textured area than in a smooth, low-textured area, however, it makes sense to use a smaller QP for low textured macroblocks and a larger QP for highly textured macroblocks.

This leads to the often-used strategy of classifying macroblocks according to human visual importance (usually using variance of the blocks or the strength of the gradients inside the blocks) and assigning a target number of bits proportional to some perceptual weighting. The quantization parameter for each macroblock to be modified is selected by modifying the picture level quantizer according to the weighting.

Experiments have shown that in smooth regions of very low variation, blocks are often quantized to have energy only in DC coefficients (with no non-zero AC coefficients remaining) even at a reasonably low QP. Surprisingly, when DC values in adjacent blocks in extremely smooth regions vary by only 1 from block-to-block, the perceived blocky, contouring artifact are a lot more severe than one would expect with such a small difference in absolute terms. The occurrence of this type of artifact in relatively small regions inside an otherwise well-coded picture can cause the overall perceived quality for the entire picture to be lowered.

Traditional rate-distortion-based and perceptual-based macroblock QP selection techniques do not handle this situation well. With rate-distortion optimization, the smooth blocks would be considered well-coded because of the small distortion in absolute terms, and thus no further bits would be spent for these blocks. On the other hand, typical perceptual-based methods classify macroblocks into perceptual classes and assign a quantization parameter to each macroblock by adding or subtracting a pre-defined offset to the picture-level quantization parameter according to the perceptual class of the macroblock. Unless the pre-defined offset is very aggressive (e.g., reducing QP for smooth regions to 1), such methods cannot guarantee that smooth blocks with small variations will not be quantized to a single non-zero DC coefficient, with all AC coefficients quantized to zero. But setting a very aggressive offset can increase bits spent in macroblocks that may not need them to improve perceptual quality, raising bit rate inefficiently and conflicting with the picture-level quantization parameter selected by the encoder for rate control.

Accordingly, several techniques and tools described below selectively and judiciously allocate bits within pictures such that enough bits are allocated to smooth regions to reduce or remove introduction of blocking or contour artifacts.

For example, an encoder calculates QPs and selects a quantization parameter for each macroblock within an I-picture to allocate enough bits to smooth blocks, thereby reducing perceived blocking artifacts in the I-picture. For each macroblock with one or more smooth blocks, a QP is selected such that there are at least N non-zero quantized AC coefficients per block of the macroblock, where N is an integer greater than or equal to 1. Often, the preserved AC coefficients are coefficients for the lowest frequency AC basis functions of the transform, which characterize gradual value changes horizontally and/or vertically across a block. This tends to help perceived visual quality for each block, especially for smooth regions with low variation. In one implementation, an encoder selects the largest QP, not exceeding the picture QP, that still preserves AC coefficients as desired. There may be situations (e.g., very flat blocks) that non-zero AC coefficients are not preserved. In general, however, in this way, the encoder is not overly aggressive in spending bits with smaller QPs and reduces or avoids conflict with the picture QP.

With reasonable values of N, the selected QP does not change for most macroblocks; it is the same as the picture QP for most macroblocks, and only a few smooth blocks are affected. Reasonable values of N are 1, 2, 3 or 4. The selected QP is more likely to change for macroblocks with low texture. In one implementation, N=1 or 2 improves perceived quality without too much increase in the picture's bit rate.

Figure 30:
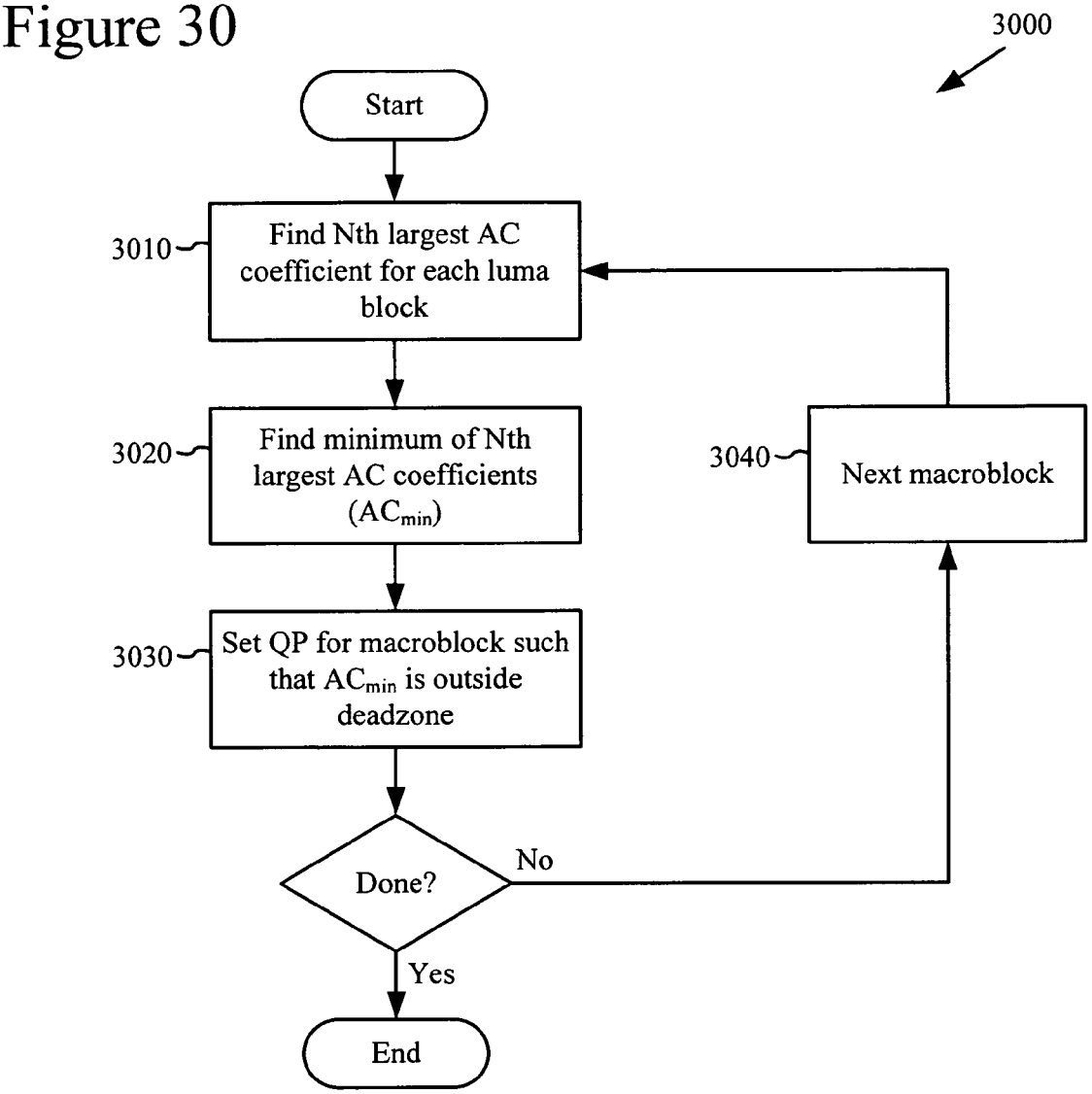
FIG. 30 is a flow chart showing an example technique for selecting a macroblock QP to help preserve one or more non-zero AC coefficients.

FIG. 30 shows an example technique 3000 for selecting a macroblock QP to help preserve one or more non-zero AC coefficients. An encoder such as the encoder 1000 of FIG. 10 or other tool performs the technique 3000.

At 3010, the encoder finds the $N^{th}$ largest AC coefficients of each luma block of the macroblock. For example, the encoder finds the second largest AC coefficient of each of the four 8×8 blocks of a 16×16 macroblock, if N=2. Let AC (0), AC (1), AC (2), AC (3) be the $N^{th}$ largest coefficients for the four luma blocks 0, 1, 2 and 3, respectively. For different block organizations in a macroblock, the $N^{th}$ coefficients can come from more or fewer blocks in the macroblock.

At 3020, the encoder finds the minimum of these $N^{th}$ coefficient values. For the $N^{th}$ coefficients of four blocks, $AC_{min}$=min (AC (0), AC (1), AC (2), AC (3)). For other numbers of blocks, $AC_{min}$ is computed differently.

At 3030, the encoder sets a QP for the macroblock such that $AC_{min}$ is outside the dead zone threshold for that QP. The dead zone threshold is a "cut-off" threshold for quantizing an AC coefficient to zero when the value of QP is used for quantization. The dead zone threshold is usually predetermined for, and proportional to, a given QP. The dead zone threshold is selected at some point between 0 and the first reconstruction point. When the encoder uses either a uniform quantizer or non-uniform quantizer, the first reconstruction point depends on the QP value and whether uniform or non-uniform quantization is used. In one implementation, the first reconstruction point is the reconstructed value of quantized coefficient level=1, which for uniform quantization is 2*QP and for non-uniform quantization is 3*QP. For uniform quantization, the cut-off threshold thus lies between 0 and 2*QP. For non-uniform quantization, the cut-off threshold thus lies between 0 and 3*QP. For example, the dead zone threshold Z(QP) is selected as Z(QP)=6*QP/5 for uniform quantization, and Z(QP)=2*QP for non-uniform quantization. Alternatively, other cut-off thresholds can be used.

An AC coefficient AC will be quantized to zero if: Abs(AC) <Z(QP). To set (3030) the QP for a macroblock, an encoder can find the QP for the macroblock ($QP_m$) that will preserve at least N AC coefficients by comparing $AC_{min}$ with Z(QP) for candidate values of QP, starting with the picture QP and decreasing QP until a minimum QP for the quantizer is reached (e.g., QP=1) or the inequality Abs($AC_{min}$)>=Z(QP) is satisfied. If the inequality Abs($AC_{min}$)>=Z(QP) is satisfied, the encoder sets the threshold QP for the macroblock to be the first QP (i.e., highest qualifying QP) that satisfies the inequality. Alternatively, the encoder uses other logic to compute the QP for the macroblock, for example, starting from the lowest QP or using a binary search of QP values.

The process of using $QP_m$ to quantize all blocks in the macroblock can be referred to as unconstrained bit rate quantization. In a constrained bit rate quantization technique, an encoder determines the maximum QP (not greater than the picture QP) needed to produce the desired number of non-zero AC coefficients for each of the luma blocks of the macroblock separately (e.g., $QP_0$, $QP_1$, $QP_2$, and $QP_3$ for blocks 0, 1, 2 and 3, respectively) as described above. It follows that $QP_m$ equals the minimum of $QP_0$, $QP_1$, $QP_2$, and $QP_3$. To reduce bit usage, an encoder could use $QP_i$ to quantize block i (where i=0, 1, 2, 3, etc.) in place of $QP_m$. In an encoder that specifies a single QP for an entire macroblock, the encoder can instead keep only those AC coefficients that are non-zero when quantized using $QP_i$ for each block i when quantizing the block using $QP_m$, preserving only the top N non-zero AC coefficients in a given block even if other AC coefficients in the block would be preserved with quantization by $QP_m$. For the quantization process shown in FIG. 30, the quantization process for each luma block can be performed as a two-pass process. In the first pass, the encoder "thresholds" DCT coefficients to zero if the coefficient is less than Z($QP_i$), and otherwise keeps the same DCT coefficients. Then, the "thresholded" DCT coefficients are quantized in the same manner using $QP_m$.

Alternatively, an encoder preserves non-zero AC coefficients in some other way. For example, an encoder can select a QP on a basis other than a macroblock-by-macroblock basis (e.g., block-by-block basis). The encoder can preserve AC coefficient for I-pictures, P-pictures, or B-pictures, or combinations thereof.

If at the minimum possible QP the number of non-zero quantized coefficients is less than N, N can be adjusted accordingly.

VII. Differential Quantization on DC Shift

In a typical lossy encoding scenario, not all quantized DC and AC coefficients can be recovered exactly after inverse quantization. For example, in some video codecs, DC coefficient values shift by one (i.e., increase or decrease by one relative to their pre-quantization value) for some QPs and DC coefficient values. This phenomenon is an example of DC shift. Representations of some DC coefficient values are lossless through quantization and inverse quantization at one or more lower QPs, but lossy in other, higher QPs.

Figure 31:
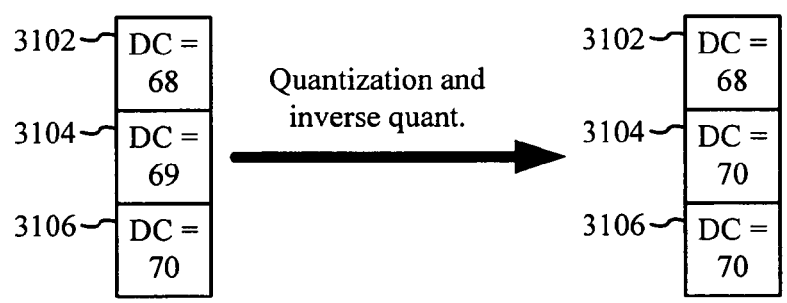
FIG. 31 is a diagram showing a DC shift in three neighboring blocks in a gradient slope region after quantization and inverse quantization.

A region with several blocks in which all the AC coefficients are quantized to 0 and the DC coefficients cannot be recovered exactly can exhibit visible contouring artifacts in DC shift areas. Such regions with contouring artifacts are often smooth, gradient slope regions, such as sky, water or light rays. FIG. 31 is a diagram showing a DC shift in three neighboring blocks in a gradient slope region after quantization and inverse quantization. The DC values of three neighboring blocks 3102, 3104, 3106 in a gradient slope region are 68, 69, and 70, respectively, prior to quantization. After quantization and inverse quantization, the DC value of block 3104 is shifted to 70. As shown in FIG. 31, the DC values of the three neighboring blocks are now 68, 70, and 70. When such blocks are in a gradient slope region, the quantized DC values may cause perceptible contouring artifacts. For example, referring again to FIGS. 22A-C, the gradient slope region 2210 has been quantized, resulting in a visible contouring artifact in FIG. 22B. As shown in FIG. 22C, quantization of the DC coefficients for the top-half blocks of macroblock 2250 results in uniform values reconstructed from a DC value of 68, while quantization of DC coefficients for the bottom-half blocks results in uniform values reconstructed from a DC value of 70.

Accordingly, several techniques and tools described below are used by a video encoder to detect DC shift areas and adjust quantization to reduce or avoid introduction of contouring artifacts in the DC shift areas.

Figure 32:
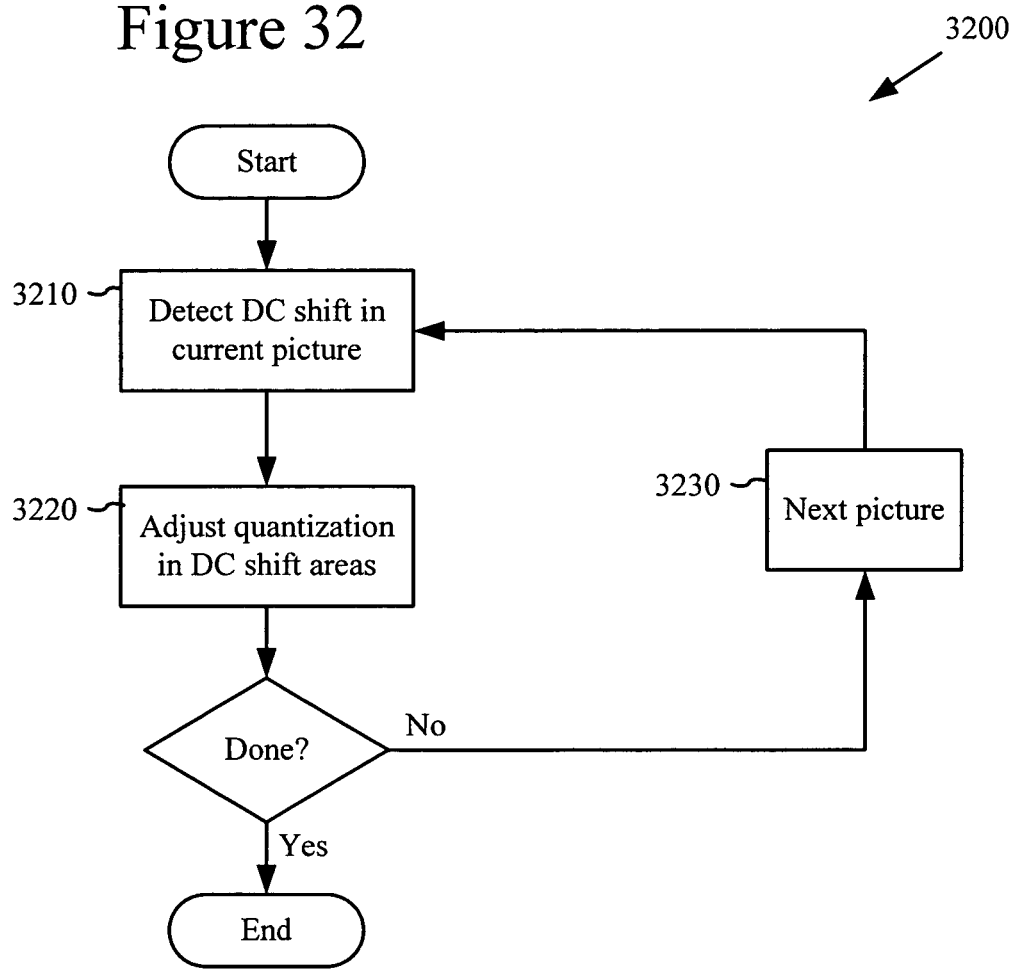
FIG. 32 is a flow chart showing a generalized technique for adjusting quantization to reduce or avoid introduction of contouring artifacts in DC shift areas.

FIG. 32 is a flow chart showing a generalized technique 3200 for adjusting quantization to reduce or avoid introduction of contouring artifacts in DC shift areas. An encoder such as the encoder 1000 of FIG. 10 or other tool performs the technique 3200.

At 3210, an encoder detects a shift area. The search for DC shift areas can be aided by previous gradient slope detection. For example, the encoder detects DC shift areas by detecting one or more gradient slope regions (or using previously computed gradient slope detection information) then identifying DC shift blocks in the gradient slope region(s), as described below.

At 3220, the encoder adjusts quantization in the DC shift area. For example, an encoder can use differential quantization (DQ) to code DC shift blocks in order to reduce or avoid introduction of contouring artifacts caused by DC shift. The encoder reduces QP for some macroblocks (those with DC shift blocks) but does not change QP for other blocks. Reducing QP for macroblocks having DC shift blocks can help keep DC values lossless for the macroblocks, thereby reducing or avoiding introduction of contouring artifacts. An encoder can use bi-level DQ or multi-level DQ to resolve DC shift problems and thereby improve visual quality while controlling bit usage. If there are more pictures to analyze, the encoder processes the next picture (3230).

Alternatively, the encoder adjusts quantization for DC shift areas on a macroblock-by-macroblock basis or some other basis.

A. Gradient Slope Detection

Gradient slope detection can be used to identify one or more gradient slope regions in a picture. The gradient slope region(s) tend to exhibit contouring artifacts, especially when blocks in the region(s) have non-zero DC coefficient values and AC coefficients of only zero after quantization. Once found, such region(s) can be checked for DC shift blocks that may contribute to contouring artifacts.

For example, an encoder finds a gradient slope region using a technique described herein (Section V) or some other technique. If the only non-zero coefficients in blocks are DC coefficients after quantization, the encoder treats the blocks as candidates for DC shift area adjustment. Alternatively, the encoder considers additional blocks as candidates for DC shift area adjustment.

B. Identifying DC-shift blocks

The encoder identifies certain candidate blocks as DC shift blocks. The identification of DC shift blocks depends on details of the quantizer and QPs used to compress the blocks. For example, some reconstructed DC coefficients will not shift from their original value at one QP, but will shift at a coarser QP.

Examples of DC shift coefficients for different QPs in one encoder are provided in the following table. The table indicates DC coefficient values exhibiting DC shift for different values of QP, where QP is derived explicitly from the parameter PQIndex (and, potentially, a half step parameter) or implicitly from the parameter PQIndex (and, potentially, a half step parameter). DC values not listed in the table are lossless for the indicated QP in the example encoder; DC values for QPs under 3 (which are not shown in the table) are all lossless. The example encoder does not perform DC shift adjustment for QPs higher than those shown in the table. In the example encoder, quantization of DC coefficients is the same for different quantizers (e.g., uniform, non-uniform). Which DC coefficient values are DC shift coefficients will differ in different video codecs. Different quantizers (e.g., uniform, non-uniform) can result in different shift patterns if quantization of DZ coefficients is different in the different quantizers.

TABLE 3

Example DC-shift Coefficients

| PQIndex (Implicit QP) | PQIndex (Explicit QP) | Original DC | Shifted DC | Original DC | Shifted DC | Original DC | Shifted DC |
|---|---|---|---|---|---|---|---|
| 3-5.5 | 3-5.5 | 6 | 7 | 96 | 97 | 186 | 187 |
| | | 15 | 16 | 105 | 106 | 195 | 196 |
| | | 24 | 25 | 114 | 115 | 204 | 205 |
| | | 33 | 34 | 123 | 124 | 213 | 214 |
| | | 42 | 43 | 132 | 133 | 222 | 223 |
| | | 51 | 52 | 141 | 142 | 231 | 232 |
| | | 60 | 61 | 150 | 151 | 240 | 241 |
| | | 69 | 70 | 159 | 160 | 249 | 250 |
| | | 78 | 79 | 168 | 169 | | |
| | | 87 | 88 | 177 | 178 | | |
| 6-7.5, 9-10.5 | 6-7.5 | 2 | 1 | 92 | 93 | 178 | 177 |
| | | 6 | 7 | 97 | 96 | 183 | 182 |
| | | 11 | 12 | 102 | 101 | 187 | 188 |
| | | 16 | 15 | 106 | 107 | 192 | 193 |
| | | 21 | 20 | 111 | 112 | 197 | 196 |
| | | 25 | 26 | 116 | 115 | 202 | 201 |
| | | 30 | 31 | 121 | 120 | 207 | 206 |
| | | 35 | 34 | 126 | 125 | 211 | 212 |
| | | 40 | 39 | 158 | 157 | 216 | 217 |
| | | 45 | 44 | 130 | 131 | 221 | 220 |
| | | 49 | 50 | 135 | 136 | 225 | 226 |
| | | 54 | 53 | 140 | 139 | 230 | 231 |
| | | 59 | 58 | 144 | 145 | 235 | 236 |
| | | 63 | 64 | 149 | 150 | 240 | 239 |
| | | 68 | 69 | 154 | 155 | 245 | 244 |
| | | 73 | 74 | 159 | 158 | 249 | 250 |
| | | 78 | 77 | 164 | 163 | 254 | 255 |
| | | 83 | 82 | 168 | 169 | | |
| | | 87 | 88 | 173 | 174 | | |
| 8, 11-12 | 8-9 | 2 | 1 | 88 | 89 | 171 | 172 |
| | | 5 | 6 | 92 | 91 | 175 | 174 |
| | | 9 | 8 | 95 | 96 | 178 | 179 |
| | | 12 | 11 | 99 | 98 | 182 | 181 |
| | | 15 | 16 | 102 | 101 | 185 | 186 |
| | | 19 | 18 | 105 | 106 | 189 | 188 |
| | | 22 | 23 | 109 | 108 | 192 | 191 |
| | | 26 | 25 | 112 | 113 | 195 | 196 |
| | | 29 | 30 | 116 | 115 | 199 | 198 |
| | | 33 | 32 | 119 | 120 | 202 | 203 |
| | | 36 | 37 | 123 | 122 | 206 | 205 |
| | | 40 | 39 | 126 | 127 | 209 | 210 |
| | | 43 | 44 | 158 | 156 | 213 | 212 |
| | | 47 | 46 | 130 | 129 | 216 | 217 |
| | | 50 | 51 | 133 | 134 | 220 | 219 |
| | | 54 | 53 | 137 | 136 | 223 | 224 |
| | | 57 | 56 | 140 | 141 | 227 | 226 |
| | | 60 | 61 | 144 | 143 | 230 | 231 |
| | | 64 | 63 | 147 | 146 | 234 | 233 |
| | | 67 | 68 | 150 | 151 | 237 | 236 |
| | | 71 | 70 | 154 | 153 | 240 | 241 |
| | | 74 | 75 | 157 | 158 | 244 | 243 |
| | | 78 | 77 | 161 | 160 | 247 | 248 |
| | | 81 | 82 | 164 | 165 | 251 | 250 |
| | | 85 | 84 | 168 | 167 | 254 | 255 |
| 13-14 | 10-11 | 2 | 3 | 90 | 89 | 175 | 174 |
| | | 5 | 4 | 93 | 92 | 177 | 178 |
| | | 8 | 7 | 95 | 96 | 180 | 181 |
| | | 11 | 10 | 98 | 99 | 183 | 184 |
| | | 13 | 14 | 101 | 102 | 186 | 185 |
| | | 16 | 17 | 104 | 103 | 189 | 188 |
| | | 19 | 20 | 107 | 106 | 192 | 191 |
| | | 22 | 21 | 110 | 109 | 194 | 195 |
| | | 25 | 24 | 112 | 113 | 197 | 198 |

TABLE 3-continued

Example DC-shift Coefficients

| PQIndex (Implicit QP) | PQIndex (Explicit QP) | Original DC | Shifted DC | Original DC | Shifted DC | Original DC | Shifted DC |
|---|---|---|---|---|---|---|---|
| | | 27 | 28 | 115 | 116 | 200 | 201 |
| | | 30 | 31 | 118 | 119 | 203 | 202 |
| | | 33 | 34 | 121 | 120 | 206 | 205 |
| | | 36 | 35 | 124 | 123 | 209 | 208 |
| | | 39 | 38 | 126 | 127 | 211 | 212 |
| | | 42 | 41 | 158 | 157 | 214 | 215 |
| | | 45 | 44 | 129 | 130 | 217 | 218 |
| | | 47 | 48 | 132 | 133 | 220 | 219 |
| | | 50 | 51 | 135 | 136 | 223 | 222 |
| | | 53 | 52 | 138 | 137 | 225 | 226 |
| | | 56 | 55 | 141 | 140 | 228 | 229 |
| | | 59 | 58 | 144 | 143 | 231 | 232 |
| | | 61 | 62 | 146 | 147 | 234 | 235 |
| | | 64 | 65 | 149 | 150 | 237 | 236 |
| | | 67 | 68 | 152 | 151 | 240 | 239 |
| | | 70 | 69 | 155 | 154 | 243 | 242 |
| | | 73 | 72 | 158 | 157 | 245 | 246 |
| | | 76 | 75 | 160 | 161 | 248 | 249 |
| | | 78 | 79 | 163 | 164 | 251 | 250 |
| | | 81 | 82 | 166 | 167 | 254 | 253 |
| | | 84 | 85 | 169 | 168 | | |
| | | 87 | 86 | 172 | 171 | | |
| 15-16 | 12-13 | 2 | 1 | 87 | 88 | 171 | 170 |
| | | 4 | 3 | 90 | 89 | 173 | 174 |
| | | 6 | 7 | 92 | 93 | 176 | 175 |
| | | 9 | 8 | 95 | 94 | 178 | 179 |
| | | 11 | 12 | 97 | 98 | 181 | 180 |
| | | 14 | 13 | 100 | 99 | 183 | 184 |
| | | 16 | 17 | 102 | 103 | 186 | 185 |
| | | 19 | 18 | 105 | 104 | 188 | 189 |
| | | 21 | 22 | 107 | 108 | 191 | 190 |
| | | 24 | 23 | 110 | 109 | 193 | 194 |
| | | 26 | 27 | 112 | 111 | 195 | 196 |
| | | 29 | 28 | 114 | 115 | 198 | 197 |
| | | 31 | 30 | 117 | 116 | 200 | 201 |
| | | 33 | 34 | 119 | 120 | 203 | 202 |
| | | 36 | 35 | 122 | 121 | 205 | 206 |
| | | 38 | 39 | 124 | 125 | 208 | 207 |
| | | 41 | 40 | 127 | 126 | 210 | 211 |
| | | 43 | 44 | 158 | 157 | 213 | 212 |
| | | 46 | 45 | 129 | 130 | 215 | 216 |
| | | 48 | 49 | 132 | 131 | 218 | 217 |
| | | 51 | 50 | 134 | 135 | 220 | 221 |
| | | 53 | 54 | 137 | 136 | 222 | 223 |
| | | 56 | 55 | 139 | 140 | 225 | 224 |
| | | 58 | 57 | 141 | 142 | 227 | 228 |
| | | 60 | 61 | 144 | 143 | 230 | 229 |
| | | 63 | 62 | 146 | 147 | 232 | 233 |
| | | 65 | 66 | 149 | 148 | 235 | 234 |
| | | 68 | 67 | 151 | 152 | 237 | 238 |
| | | 70 | 71 | 154 | 153 | 240 | 239 |
| | | 73 | 72 | 156 | 157 | 242 | 243 |
| | | 75 | 76 | 159 | 158 | 245 | 244 |
| | | 78 | 77 | 161 | 162 | 247 | 248 |
| | | 80 | 81 | 164 | 163 | 249 | 250 |
| | | 83 | 82 | 166 | 167 | 252 | 251 |
| | | 85 | 84 | 168 | 169 | 254 | 255 |
| 17-18 | 14-15 | 1 | 2 | 87 | 88 | 171 | 172 |
| | | 3 | 4 | 89 | 90 | 173 | 174 |
| | | 5 | 6 | 92 | 91 | 175 | 176 |
| | | 8 | 7 | 94 | 93 | 178 | 177 |
| | | 10 | 9 | 96 | 95 | 180 | 179 |
| | | 12 | 13 | 98 | 99 | 182 | 183 |
| | | 14 | 15 | 100 | 101 | 184 | 185 |
| | | 16 | 17 | 103 | 102 | 186 | 187 |
| | | 19 | 18 | 105 | 104 | 189 | 188 |
| | | 21 | 20 | 107 | 106 | 191 | 190 |
| | | 23 | 24 | 109 | 110 | 193 | 194 |
| | | 25 | 26 | 111 | 112 | 195 | 196 |
| | | 27 | 28 | 114 | 113 | 198 | 197 |
| | | 30 | 29 | 116 | 115 | 200 | 199 |
| | | 32 | 31 | 118 | 119 | 202 | 201 |
| | | 34 | 35 | 120 | 121 | 204 | 205 |
| | | 36 | 37 | 122 | 123 | 206 | 207 |
| | | 39 | 38 | 125 | 124 | 209 | 208 |
| | | 41 | 40 | 127 | 126 | 211 | 210 |
| | | 43 | 42 | 158 | 157 | 213 | 212 |
| | | 45 | 46 | 129 | 130 | 215 | 216 |
| | | 47 | 48 | 131 | 132 | 217 | 218 |
| | | 50 | 49 | 133 | 134 | 220 | 219 |
| | | 52 | 51 | 136 | 135 | 222 | 221 |
| | | 54 | 53 | 138 | 137 | 224 | 223 |
| | | 56 | 57 | 140 | 141 | 226 | 227 |
| | | 58 | 59 | 142 | 143 | 228 | 229 |
| | | 61 | 60 | 144 | 145 | 231 | 230 |
| | | 63 | 62 | 147 | 146 | 233 | 232 |
| | | 65 | 66 | 149 | 148 | 235 | 236 |
| | | 67 | 68 | 151 | 152 | 237 | 238 |
| | | 69 | 70 | 153 | 154 | 239 | 240 |
| | | 72 | 71 | 156 | 155 | 242 | 241 |
| | | 74 | 73 | 158 | 157 | 244 | 243 |
| | | 76 | 77 | 160 | 159 | 246 | 247 |
| | | 78 | 79 | 162 | 163 | 248 | 249 |
| | | 81 | 80 | 164 | 165 | 250 | 251 |
| | | 83 | 82 | 167 | 166 | 253 | 252 |
| | | 85 | 84 | 169 | 168 | 255 | 254 |

The example encoder with the DC shift coefficients shown in Table 3 generally uses different QPs for textured regions than for smooth regions. The example encoder typically uses a QP in the range of 3-5 to encode smooth regions. As shown in Table 3, above, for QP 3-5, all the shifted DC values are 1 more than the original DC value. Other encoders may use different QPs for smooth regions versus texture regions.

To help reduce or avoid introduction of contouring artifacts when DC shift blocks are detected, the example encoder changes the QP for macroblocks containing DC shift blocks to keep the DC values lossless in those macroblocks. In particular, the example encoder reduces the QP for macroblocks containing DC shift blocks to QP=2. (Other encoders may use some other QP for DC shift areas.) In general, an encoder can select the largest available QP that results in lossless treatment of the DC coefficients of the blocks of the macroblock.

An encoder calculates a mean luma value per block to determine DC shift blocks in the gradient slope region(s), since the mean luma value corresponds to the DC shift value (after compensating for expansion in the transform). The mean luma value allows the encoder to estimate or predict which blocks have DC shifts. Alternatively, an encoder calculates real DC values and looks them up in the DC shift table to identify exactly which blocks will have shifts.

The encoder can perform additional processing to exclude certain isolated DC shift blocks in the gradient slope region(s). In the example encoder, once a current block is identified as a DC shift block located in a gradient slope region, the surrounding four neighboring blocks are checked. If any of the surrounding four neighboring blocks is a smooth block and has a DC value lower than the shifted DC value of the current block, the encoder uses QP=2 to for the macroblock containing the current block in order to keep the DC values lossless. Alternatively, an encoder does not do a check of neighboring blocks, or checks some other arrangement of neighboring blocks to determine whether to make a change in the QP for the DC shift area.

C. Multi-Level Differential Quantization Cost Model

Bi-level DQ and multi-level DQ typically have different bit rate costs. In one implementation, 1 bit per macroblock is used to signal a picture QP or alternative QP in "all macroblock" bi-level DQ, and at least 3 bits per macroblock are used to signal a picture QP or alternative QPs in multi-level DQ.

Although an encoder can use multi-level DQ to allow for reducing QP in a smooth region that contains DC shift blocks, an encoder instead can choose to adjust the QP for all smooth regions (e.g., to QP=2) and use a coarser picture QP for the rest of the picture in a bi-level DQ scenario. For example, an encoder may do this where the signaling costs of multi-level DQ are found to be too expensive relative to the costs of bi-level DQ.

In one implementation, the following table is used to calculate the cost of smooth blocks that going from QP=3, 4, 5, and 6, respectively, to QP=2.

g_iSmoothBlockDiffQPCost[4]={18, 22, 28, 36}.

This table is used in the following example of bi-level DQ cost B(QP) cost calculation.

$$B(QP)=\text{counts\_of\_total\_}MBs+(\text{counts\_of\_biLevel\_}Dquan\_MBs-\text{counts\_of\_}DC\_\text{Shift\_Blocks})*g\_iSmoothBlockDiffQPCost[QP-3];$$

The cost B(QP) accounts for the costs of per-macroblock bi-level cost signaling and estimates the increased bit cost of using QP=2 instead of a 3, 4, 5, or 6 for a block. Multi-level DQ cost M(QP) is calculated as:

$$M(QP)=(\text{counts\_of\_frame}QP\_MBs*3)+(\text{counts\_of\_biLevel\_}Dquan\_MBs-\text{counts\_of\_}DC\_\text{Shift\_Blocks})*8+(\text{counts\_of\_}DC\_\text{Shift\_Blocks}*3);$$

The cost M(QP) accounts for signaling costs of multi-level DQ, assuming escape coding for some macroblock quantization parameters. If B(qp)<M(qp), then bi-level DQ will be used and QP=2 will be used for all smooth blocks. Otherwise, multi-level DQ will be used.

Alternatively, an encoder uses other costs models for different types or configurations of DQ. Or, an encoder reduces QP for the entire picture when DC shift blocks are detected, or uses some other technique to change quantization to reduce or avoid introduction contouring artifacts when DC shift blocks are detected.

D. Picture QP switching

In one example encoder, multi-level DQ requires 3 bits to signal any QP from picture QP to picture QP+6. Any QP outside of this range will be signaled with 8 bits through escape coding. Alternative QPs that are used for smooth regions are normally smaller than the picture QP, and hence require escape coding.

Switching picture QPs can thus save coding overhead for multi-level DQ. For example, an encoder can choose a picture QP using the multi-level DQ cost model described above. For example, for a three-level scenario (e.g., a picture QP, a smooth region QP, and a DC shift QP), multi-level DQ cost is computed for different candidate values for a picture QP. An encoder can select the picture QP with minimum overhead cost.

Alternatively, an encoder uses other criteria to switch picture QPs, or does not perform picture QP switching.

E. Coarse Quantization for High-texture Macroblocks

If a decision is made to use multi-level DQ, coarse quantization can be used for high-texture macroblocks by assigning them a higher (coarser) QP than the picture QP. The decision to use multi-level DQ for the picture (e.g., in order to use smaller QP for DC shift macroblocks) means there is no additional overhead cost to signal a per macroblock coarse QP that is higher than the picture QP. For example, picture QP+1 can used as the coarse QP to avoid noticeable differences in the quantization level, or some other QP can be used. A texture threshold can be used to determine which macroblocks will be quantized with the coarse QP, after the encoder has decided to use multi-level DQ for the current picture.

Alternatively, an encoder uses other criteria to determine whether certain regions (e.g., macroblocks) should use a coarse QP, or does not use coarse QPs.

F. Example Technique for DC Shift Quantization

Figure 33:
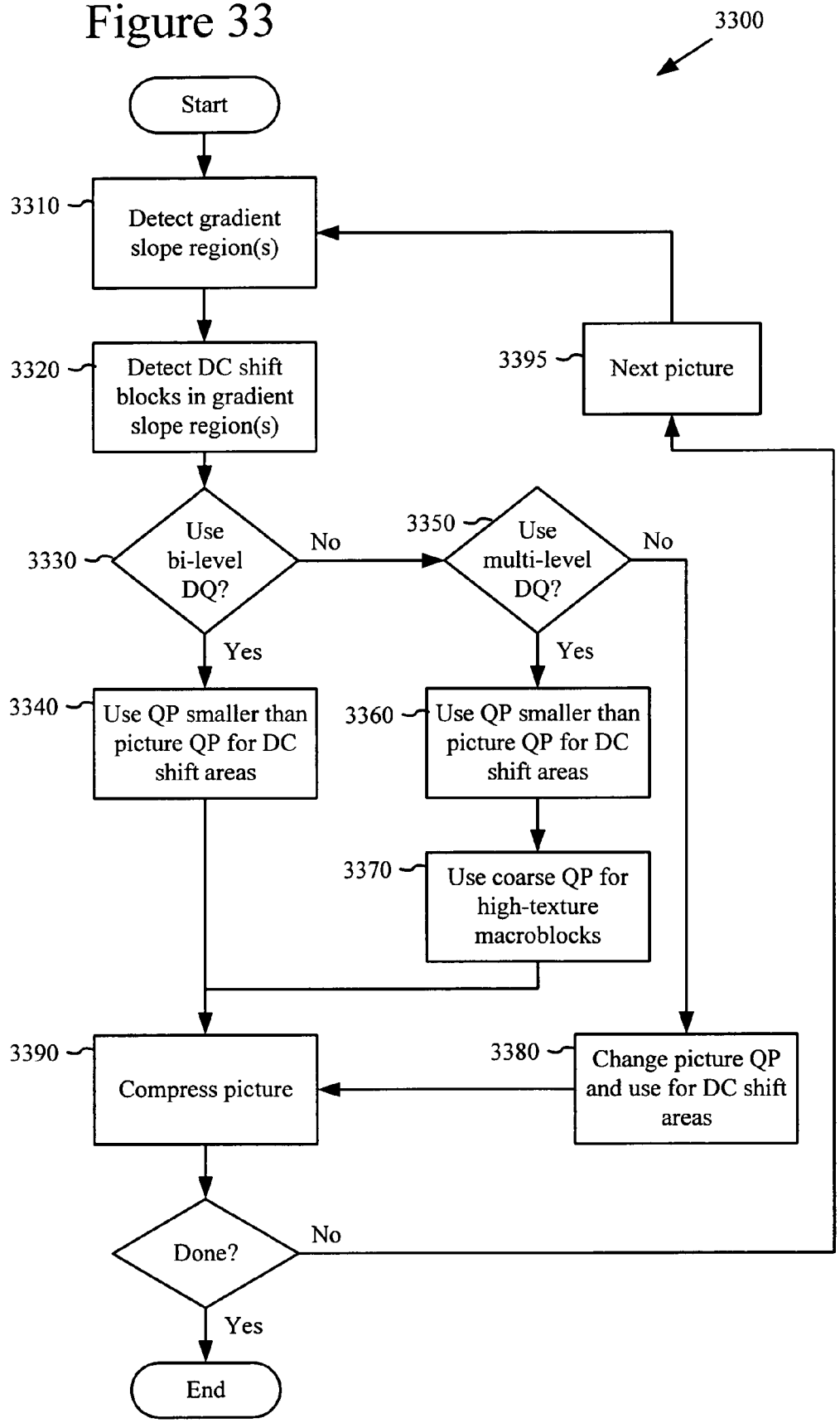
FIG. 33 is a flow chart showing a combined technique for tailoring quantization in DC shift areas to reduce or avoid introduction of quantization artifacts.

FIG. 33 is a flow chart showing a combined technique 3300 for tailoring quantization in DC shift areas to reduce or avoid introduction of quantization artifacts. An encoder such as the encoder 1000 of FIG. 10 or other tool performs the technique 3300. This combined technique is an example that combines several of the aspects described above. Other techniques will not use all of the aspects described with reference to this example, or will perform them in a different order or in alternative ways.

At 3310, an encoder detects one or more gradient slope regions in a current picture, for example, as described in Section V. At 3320, the encoder detects DC shift blocks in the gradient slope region(s), for example, using a DC shift table.

The encoder then decides how to quantize the picture. At 3330, the encoder decides whether to use bi-level DQ for the picture. If it does, the encoder uses a QP smaller than the picture QP for DC shift areas (3340) and other smooth areas. Otherwise, at 3350, the encoder decides whether to use multi-level DQ for the picture. If it does, the encoder uses a QP smaller than the picture QP for DC shift areas (3360), can use a different QP for other smooth areas, and, if high-texture macroblocks are present, uses a coarse QP (such as one that is larger than the picture QP) for the high-texture macroblocks (3370). If the encoder does not choose bi-level or multi-level DQ, the encoder reduces the picture QP and uses the reduced picture QP for DC shift areas (3380) as well as other areas. Or, the encoder skips QP reduction for the DC shift areas if the costs of bi-level DQ and multi-level DQ are both too high. When the encoder has chosen a quantization scheme, the encoder compress the picture at 3390, and process the next picture if any pictures remain to be processed (3395).

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a video encoder, a method comprising:
computing plural transform coefficients for each of plural blocks in a video picture;
identifying one or more portions of the video picture that contain DC shift blocks by identifying one or more gradient slope regions in the video picture and analyzing quantization effects on DC coefficients for one or more of the plural blocks in the one or more gradient slope regions;
adjusting quantization for the video picture to reduce contouring artifacts when the video picture is reconstructed; and outputting encoded data for the video picture, wherein the identifying the one or more portions of the video picture that contain DC shift blocks includes checking a predetermined list of DC coefficient values exhibiting DC shift artifacts at a given quantization step size.

2. The method of claim 1 wherein the video encoder analyzes a texture map to identify the one or more gradient slope regions in the video picture.

3. The method of claim 1 wherein the adjusting quantization for the video picture comprises reducing a quantization step size for one or more macroblocks containing one or more of the DC shift blocks.

4. The method of claim 1 wherein the quantization comprises bi-level differential quantization.

5. The method of claim 1 wherein the quantization comprises multi-level differential quantization.

6. The method of claim 1 wherein the identifying the one or more portions of the video picture that contain DC shift blocks includes identifying the DC shift blocks using DC coefficients of the plural blocks or mean sample values of the plural blocks, and wherein the quantization uses a uniform quantizer or a non-uniform quantizer.

7. The method of claim 1 wherein the identifying the one or more portions of the video picture that contain DC shift blocks includes:
    identifying the DC shift blocks;
    identifying one or more gradient slope regions; and
    for one of the DC shift blocks in one of the one or more gradient slope regions, checking if any neighbor block both is smooth and has a lower or higher DC coefficient value.

8. The method of claim 1 wherein the adjusting quantization further comprises increasing quantization for a high-texture portion of the video picture.

9. One or more computer-readable memory media having stored thereon computer executable instructions to cause a computer to perform the method of claim 1.

10. The method of claim 1, wherein the identifying one or more gradient slope regions includes using a gradient slope mask that indicates gradient slope decisions for regions in the video picture.

11. In a video encoder, a method comprising:
    computing plural transform coefficients for each of plural blocks in a video picture;
    identifying one or more portions of the video picture that contain DC shift blocks by identifying one or more gradient slope regions in the video picture and analyzing quantization effects on DC coefficients for one or more of the plural blocks in the one or more gradient slope regions;
    adjusting quantization for the video picture to reduce contouring artifacts when the video picture is reconstructed; and
    outputting encoded data for the video picture, wherein the identifying the one or more portions of the video picture that contain DC shift blocks includes:
        identifying the DC shift blocks;
        identifying one or more gradient slope regions; and
        for one of the DC shift blocks in one of the one or more gradient slope regions, checking if any neighbor block both is smooth and has a lower or higher DC coefficient value.

12. The method of claim 11, wherein the video encoder analyzes a texture map to identify the one or more gradient slope regions in the video picture.

13. The method of claim 11, wherein the adjusting quantization for the video picture comprises reducing a quantization step size for one or more macroblocks containing one or more of the DC shift blocks.

14. The method of claim 11, wherein the quantization comprises bi-level differential quantization.

15. The method of claim 11, wherein the quantization comprises multi-level differential quantization.

16. The method of claim 11, wherein the identifying the one or more portions of the video picture that contain DC shift blocks includes identifying the DC shift blocks using DC coefficients of the plural blocks or mean sample values of the plural blocks, and wherein the quantization uses a uniform quantizer or a non-uniform quantizer.

17. The method of claim 11, wherein the identifying one or more gradient slope regions includes using a gradient slope mask that indicates gradient slope decisions for regions in the video picture.

18. A computer-readable memory device for executing a method, the method comprising:
    computing plural transform coefficients for each of plural blocks in a video picture;
    identifying one or more portions of the video picture that contain DC shift blocks by identifying one or more gradient slope regions in the video picture and analyzing quantization effects on DC coefficients for one or more of the plural blocks in the one or more gradient slope regions;
    adjusting quantization for the video picture to reduce contouring artifacts when the video picture is reconstructed; and
    outputting encoded data for the video picture, wherein the identifying the one or more portions of the video picture that contain DC shift blocks includes checking a predetermined list of DC coefficient values exhibiting DC shift artifacts at a given quantization step size.

19. The computer-readable memory device of claim 18, further including analyzing a texture map to identify the one or more gradient slope regions in the video picture.

20. The computer-readable memory device of claim 18, wherein the adjusting quantization for the video picture comprises reducing a quantization step size for one or more macroblocks containing one or more of the DC shift blocks.

* * * * *